United States Patent [19]
Yolles et al.

[11] Patent Number: 5,619,588
[45] Date of Patent: Apr. 8, 1997

[54] APPARATUS AND METHOD FOR COMPARING AND ALIGNING TWO DIGITAL REPRESENTATIONS OF AN IMAGE

[75] Inventors: Joel Yolles, Rehovot; Meir Aloni, Herzliya; Yair Eran, Rehovot; Haim Kaplan, Ra'anana, all of Israel

[73] Assignee: Orbot Instruments Ltd., Yavne, Israel

[21] Appl. No.: 97,971

[22] Filed: Jul. 26, 1993

[30] Foreign Application Priority Data

Jul. 27, 1992 [IL] Israel .......................................... 102659

[51] Int. Cl.⁶ .................................................. G06K 9/00
[52] U.S. Cl. ............................................ 382/149; 382/209
[58] Field of Search ...................................... 382/8, 30, 34, 382/8.3, 22, 141, 145, 151, 199, 149, 209

[56] References Cited

U.S. PATENT DOCUMENTS

| | | | |
|---|---|---|---|
| 4,345,312 | 8/1982 | Yasuye et al. | 382/34 |
| 4,503,557 | 3/1985 | Maeda | 382/34 |
| 4,532,650 | 7/1985 | Wihl et al. | 382/8 |
| 4,579,455 | 4/1986 | Levy et al. | 356/394 |
| 4,805,123 | 2/1989 | Specht et al. | 382/8 |
| 4,864,629 | 9/1989 | Deering | 382/34 |
| 5,163,101 | 11/1992 | Deering | 382/30 |
| 5,253,306 | 10/1993 | Nishio | 382/22 |

*Primary Examiner*—Leo Boudreau
*Assistant Examiner*—Chris Kelley
*Attorney, Agent, or Firm*—Darby & Darby

[57] ABSTRACT

A method for comparing first and second digital representations of an image, the method comprising the steps of: for each individual translation from among a plurality of translations from the first digital representation to the second digital representation: for each individual image location from among a plurality of image locations within a comparison entity within the first digital representation, determining a binary legitimacy value of the individual translation for the individual image location by comparing the individual image location to a location in the second digital representation defined by operating the individual translation on the individual image location; and combining the binary legitimacy values of image locations within the comparison entity, thereby to generate a comparison entity legitimacy value determining whether the individual translation is legitimate for the comparison entity; and announcing a defect for the comparison entity if none of the plurality of translations are legitimate therefor.

8 Claims, 21 Drawing Sheets

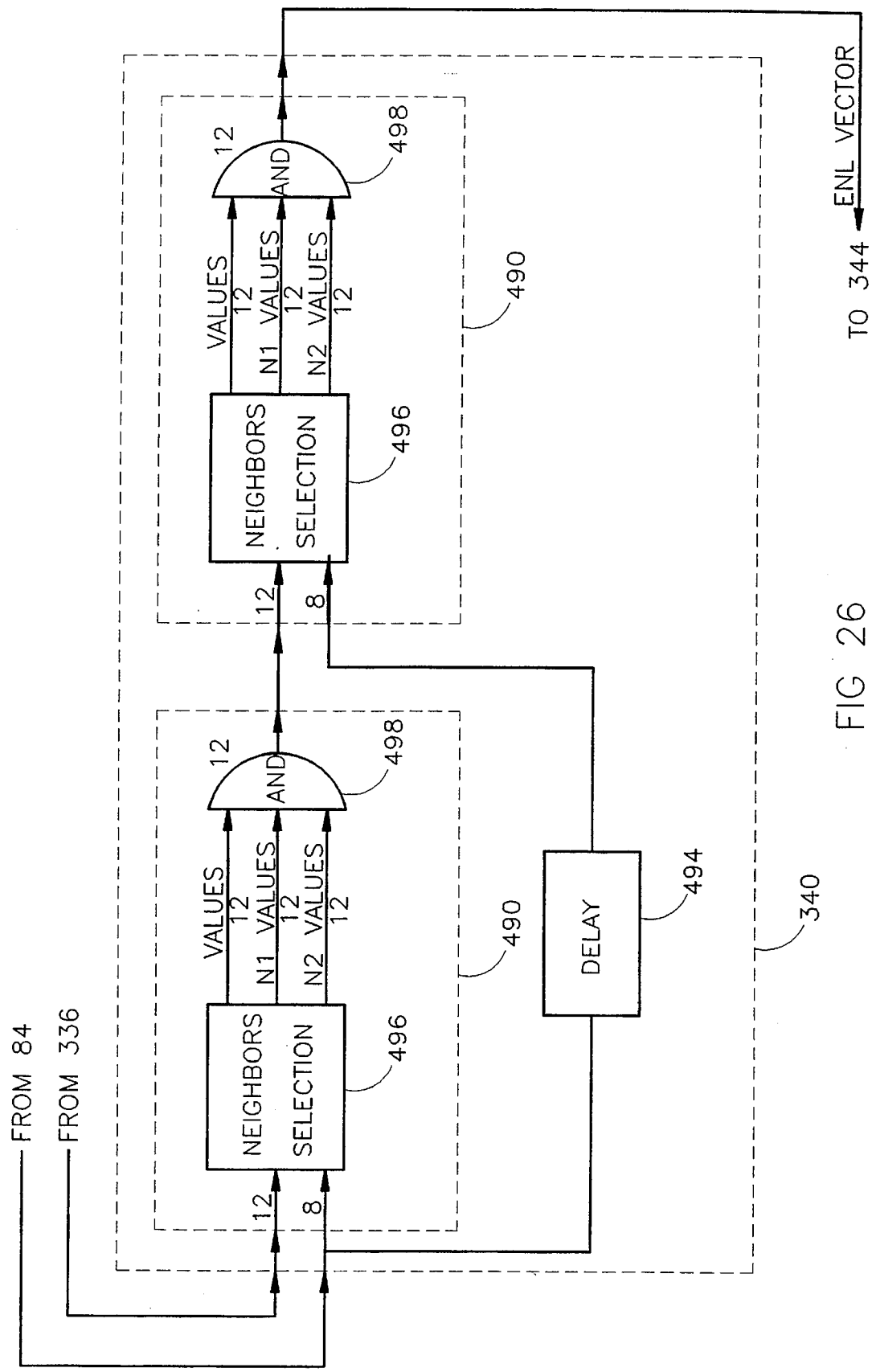

APPARATUS AND METHOD FOR COMPARING AND ALIGNING TWO DIGITAL REPRESENTATIONS OF AN IMAGE

FIELD OF THE INVENTION

The present invention relates to methods and apparatus for comparing two data streams representing respective images of patterned objects, in order to find defects in one or both of the images.

BACKGROUND OF THE INVENTION

Defect detection systems find defects in an image of an object to be inspected, denoted O in the present specification, such as a reticle, wafer, PCB or other patterned object. The patterned object is typically formed in accordance with a digital precursor thereof. Defects in the image are found by comparing the image, denoted I in the present specification, of the object O, to another, reference image, denoted R, DB or "database" in the present specification. The reference image R is sometimes modified, as by translation, scaling and/or rotation, prior to the defect detection process to bring it into accordance with the image I. Alternatively or in addition, the image I may be modified prior to defect detection to bring I into accord with R. Scaling and rotation transformations are typically applied to the image R.

Typically, discrepancies between the image I and the reference image R have more than one origin. Possible origins of discrepancies between the I and R images include the following:

a. Inaccuracies of the apparatus employed to generate the object O to be inspected from its digital precursor.

b. Inaccuracies of the imaging apparatus employed to generate the image I from the object O, such as mechanical vibrations and optical distortions.

c. Inaccuracies in generating the reference image R from a precursor thereof, such as rounding errors.

d. Differences of scale, offset or orientation between image I and reference image R.

e. Defects in the object O.

It is often very difficult to differentiate between discrepancies between the I and R images which are the result of defects in the object O, and discrepancies between the I and R images which have other origins, as detailed in (a)–(d) above. A discrepancy of the second type is also termed herein an "expected difference". In other words, an expected difference is a discrepancy between I and R which falls into one of categories (a) to (d) above. One type of expected difference between I and R images is an expected translation error. An expected translation error occurs when corresponding portions of the I and R images "drift".

State of the art approaches to defect detection may be classified as either "compensate and compare" approaches or "features" approaches. The word "compensate" is intended to refer to a characteristic of "compensate and compare" approaches whereby expected differences between compared objects are anticipated or allowed for and are not considered defects. The two approaches may be employed separately or in combination. The two approaches are now described.

Compensate and compare approach

In the compensate and compare approach, comparison entities are defined in I. Each comparison entity corresponds to an area in I and comparison entities may overlap.

Each comparison entity in a first one of the images, such as I, is compared to a multiplicity of locations in the other one of the images, such as R, each location in R typically having the same dimensions as the comparison entity. From among the multiplicity of R locations, a plurality of locations in R is identified, each of which resembles the comparison location in I in some sense. The relationship between the multiplicity of locations in R and the location of the comparison entity in I defines a multiplicity of translations from I to R.

Alternatively, only a single translation may be defined from I to R by directly computing a translation between I and R which translates the comparison entity under consideration in I to a location in R which is as similar as possible, in some sense, thereto.

A compensate-and-compare type defect detection method comprises the following steps:

I. Computing I-R difference for each translation of each comparison entity: For each comparison entity and for each translation, comparing the comparison entity, and the location in R corresponding to that translation, by obtaining a difference measure. For example, the sum of differences of corresponding pixel values may be used as a difference measure.

II. Computing I-R difference for each comparison entity: Computing a difference measure for each comparison entity by combining the difference measures for each translation considered for that comparison entity. For example, the comparison entity difference measure may be defined as the minimum of all the difference measures corresponding to all translations considered for that comparison entity.

III. Finding defects: Providing an indication of defects using the comparison entity difference measures. For example, a defect may be indicated for a particular comparison entity if its difference measure value exceeds some predetermined threshold.

The quality of performance of a "compensate and compare" detection method is influenced by at least the following factors:

a. Expected differences compensation: If the compensation for expected differences is good, high similarity requirements may be imposed in the comparison stage I, and consequently, sensitive defect detection may be achieved. Various factors affect the quality of expected difference compensation. For example, shape and size of the comparison entities may affect accuracy of compensation for translation errors.

b. Defect compensation: If differences due to defects are compensated for, they may not be identified as defects in the comparison stage. Therefore, a scheme that minimizes defect compensation increases detection sensitivity.

c. Comparison accuracy: If the comparison procedure of step II above is accurate, high-sensitivity defect detection may be achieved. Conversely, if noise accumulates in the course of the comparison step, comparison thresholds must be increased, with consequent reduction in sensitivity.

To summarize, a compensate and compare detection scheme gives good results if it maximizes expected difference compensation and comparison accuracy and minimizes defect compensation.

Features approach

According to the "features" approach to defect detection, predetermined features such as 90 degree corners or grey gradients in some direction are identified in both image I and reference image R. The features employed must remain relatively invariant for all translations between I and R which are considered during the process. A process of comparison at the feature level is employed to identify defects.

The advantage of a "features" approach is that it may not be affected by small expected discrepancies that are difficult to compensate for. However, in order to be used effectively the features need to be chosen such that they can be extracted in a reliable manner, without being dependent on specific sampling grid placement, and such that they reliably describe a variety of image geometries, including dense image geometries.

U.S. Pat. No. 4,805,123 to Specht et al describes a compensate and compare approach to defect detection. The comparison entities are large image regions which have a height of several rows and extend over the entire width of the image. Specht et al employ a direct computation to compute a compensating translation. The computation involves the steps of:

a. Computing a correlation function on large windows in I and R, where the function is computed at whole pixel intervals, thereby to obtain a sampled correlation surface.

b. Finding the minimum point of the sampled correlation surface.

c. Fitting a quadratic surface to points in the neighborhood of the minimum point, in order to compute a subpixel minimum point or line.

d. Using the subpixel location to compute a subpixel translation, to be applied to reference image R.

e. Once the two images are aligned, the two images are compared, using the following substeps:
   summing differences in corresponding 2×2 pixel windows in image I and in transformed reference image R; and
   applying thresholds to the sums.

The approach of Specht et al has several disadvantages, including the following:

a. Errors in computing the translation: The Specht method does not always find the minimum point of the continuous correlation surface. The quadratic surface fitting is done in the neighborhood of the minimum of the sampled correlation surface. However, these two minimum points may not be adjacent. In such cases a false alignment transformation may be chosen, causing false alarms in the comparison step. Therefore, Specht et al cannot reliably handle images which include certain problematic geometries. Sample problematic images are images that contain mostly edges in a first direction and only a small number of short edges in a second perpendicular direction.

b. Insufficient expected difference compensation: The comparison entity is a large region. The same translation is applied to all its points. Hence, some expected discrepancies cannot be compensated for, e.g. edge related discrepancies. This reduces detection sensitivity.

c. Reduced comparison accuracy: If more than one edge falls within the 2×2 comparison window, the magnitude of expected differences is higher and a higher threshold must be used. Therefore, the detection sensitivity for small defects is low for dense images or image portions.

U.S. Pat. No. 4,579,455 to Levy et al and U.S. Pat. No. 4,805,123 to Specht et al describe a compensate and compare approach to defect detection in which the compensation step includes a search step. The comparison entities are 3×3 pixel windows. The comparison step is carried out by summing squared differences or absolute differences of corresponding pixels in the compared I and R entities. Each such sum is then compared to a threshold. The disadvantages of the method disclosed by Levy et al and Specht et al include the following:

a. Existence of defect compensation: Due to the small size of the comparison entity (3×3 window), defects may sometimes be compensated for, with resulting loss of sensitivity. Enlarging the window would not be a satisfactory solution. Since differences are summed over the entire window, the accumulation of inaccuracies over a large window would be too large.

b. Insufficient expected differences compensation: If more than one edge falls within the window, there is no way to compensate for edge related expected discrepancies. As a consequence, the expected difference is relatively large, and larger comparison thresholds are used in such cases. This results in reduced sensitivity for images comprising dense geometries.

U.S. Pat. No. 4,532,650 to Whil et al describes a "features" approach to defect detection. The features employed by Whil et al are the following:

Directional edges: an edge in one of the x, y, 45 and 135 degree directions. In other words, there are four types of directional edges.

Directional toggles: a pixel value sequence of high-low-high or of low-high-low in a specific direction. In other words, there are eight types of directional toggles because there are two toggle types for each of four directions (x, y, 45 degrees and 135 degrees).

Clear field: A location in which there are no directional edges and no directional toggles.

For each location, the above features are detected using a 7×7 window surrounding that location. If a feature is identified in one image without a corresponding canceller feature, located within ±2 pixels, being identified in the other image, a defect is announced.

The disadvantages of the Wihl et al method include the following:

a. The method is not operative to detect defects generally. Only those defects which affect the specific features defined by Whil et al are found.

b. The operators used to compute the features cover a relatively large area of the image. Therefore, the method of Whil et al is not effective for dense images or dense image portions.

c. Feature generation depends on the specific placement of the sampling grid, which may vary when the comparison process is repeated. Therefore, the comparison process is not reliably repeatable.

SUMMARY OF THE INVENTION

The present invention seeks to provide an improved "compensate and compare" system for comparing digital images.

The present invention additionally seeks to provide an improved set of comparison entities.

The present invention further seeks to provide an improved comparison process.

The improved set of comparison entities:

A particular feature of the present invention is that more than one type of comparison entity is used. Two types of comparison entities, termed image regions and image edge neighborhoods, are inspected in parallel by two respective cooperating processes, termed the regional comparison process and the local comparison process. The advantage of using more than one type of comparison entity is that more than one defect type may be detected, each with a relatively high detection sensitivity.

The regional comparison process inspects image regions. The dimensions of the image regions are relatively large and therefore, several or many edges may fall within a single image region. This allows defective positioning of one or a few edges or edge portions to be detected because each defectively positioned edge or edge portion is normally "anchored" by accurately positioned adjacent edges within the same image region. However, the dimensions of each image region are also small enough to ensure that good compensation for I-R misalignment may be provided by operating a single translation on the entire image region. In summary, the size of each image region is selected such that good compensation is achieved for expected differences and compensation for defects is minimal.

In the illustrated embodiment, each image region is a rectangle 30 pixels long and 60 pixels wide. Typically, image regions overlap such that the distance between centers of adjacent regions is half-region lengths along one axis and half-region widths along the other axis.

The local comparison process inspects edge neighborhoods. It is a particular feature of the present invention that compensation is provided not only for global I-R misalignment, in which the entire image I is transformed or translated relative to the entire image R, but also for distortions of single edges in I relative to the corresponding edges in R. Compensation at the level of single edges results in a particularly sensitive comparison of I and R.

The local comparison process is useful in detecting defects which cause local changes in the shape of the I image, relative to the R image. The term local change or local defect refers to a change in the shape of an individual image edge. The local comparison process generally does not detect defects in which an entire edge drifts without causing local changes in the shape of any individual portion of the line.

The length of each individual edge neighborhood is selected to be large relative to the width of defects for which the process is intended. For example, in the illustrated embodiment, each edge neighborhood is 6 pixels long. This keeps defect compensation, which is undesirable, to a minimum, thereby improving detection sensitivity for local defects.

In sum, the image unit in the local comparison process is the edge neighborhood. Each edge neighborhood comprises a plurality of image locations arranged to cover a portion of an image edge. The number of image locations included in each edge neighborhood is determined in accordance with the size of defect which the local detection process is intended to detect. For example, if it is desired to detect defects whose size exceeds 0.8 pixels, each edge neighborhood may comprise a 5×1 pointer-linked array of overlapping image locations, corresponding to a 6×2 array of WP's. The pointer data defining the structure of the edge neighborhood is termed "E-NEIGHBORS data", as explained in detail below. Typically, edge neighborhoods overlap such that an edge neighborhood is centered around each individual image location containing an edge.

The improved comparison process:

The method of the present invention, like other "compensate and compare" methods, includes a comparison process, termed "step I" in the Background section, which is specific to a particular comparison entity in I and a particular translation of that comparison entity from I to R. In the comparison process, the comparison entity in I is compared to a location in R to which the comparison entity corresponds according to the translation. In "compensate and compare" methods, the comparison process of step I typically comprises the following two substeps:

A. Compute numerical image location difference values: Compute an image location difference value for each of a plurality of small units, also termed herein image locations, defined within the comparison entity. The image location difference value of a small unit represents the difference between that small unit in I and a corresponding small unit in R. For example, in conventional defect detection systems, the small unit is a pixel and the image location difference value of each pixel may comprise either the square or the absolute value of the difference between the value of that pixel in the comparison entity and the value of the pixel corresponding thereto in R.

B. Combine image location difference values: The local values computed in the comparison entity are combined over the small units, thereby to obtain a single difference measure for the comparison entity.

Both step A and step B of step I of the method shown and described herein are improved relative to steps A and B respectively of step I in conventional methods. The improved step A of the present invention is described in detail below with reference to box 240 of the flowchart of FIG. 11. The improved step B of the present invention is described in detail below with reference to box 242 of the flowchart of FIG. 11.

It is a particular feature of the present invention that step B employs a non-linear combining function rather than a linear function such as the summing function employed in conventional systems. According to the present invention, step B includes the following substeps:

i. Transform the numerical image location difference values computed in step A to boolean image location difference values by thresholding. Specifically, the boolean image location difference value may be "true" (1) if the numerical image location difference value does not exceed a threshold and the boolean image location difference value may be "false" (0) if the numerical image location difference value is greater than the threshold.

ii. AND the boolean image location difference values, thereby to obtain a single boolean or binary difference measure for the comparison entity.

If the same threshold value is employed for all small units, steps i and ii are equivalent to the steps of:

taking the maximum over all the image location difference values; and applying the threshold to the maximum in order to obtain a single boolean difference measure for the comparison entity.

The image location difference value combining step ii of the present invention has the advantage, relative to conventional systems, that inaccuracies do not accumulate over the comparison entity. Due to the maintenance of a low noise level, small defects may be reliably detected.

Another particular feature of the present invention is improved computation of image location difference values in step A. As explained above, in step A of the method described herein and of conventional methods, a difference measure is computed for each small unit. In conventional systems, a small unit may either be a single pixel or a 2×2 pixel window. In either case, however, the difference measure reflects a difference in the black area included in the entire I window, relative to the black area included in the entire corresponding R window.

In contrast, step A of the method of the present invention employs two computation levels rather than a single computation level. Specifically, in the method shown and described herein, each small unit is further partitioned into components and the difference measure reflects differences in the black areas included in each component of the I window, relative to the black area included in each corresponding component of the corresponding R window. Reference is made briefly to FIGS. 1–5 which conceptually illustrate the advantage of the present method relative to conventional methods.

FIG. 1 illustrates a small unit in I. FIG. 2 illustrates a location in R corresponding to the small unit of FIG. 1. As shown, each of FIGS. 1 and 2 include a top black portion T and a bottom black portion B. However, the top black portion T of FIG. 1 is larger than the top black portion B of FIG. 2 and the bottom black portion B of FIG. 1 is smaller than the bottom black portion B of FIG. 2.

FIGS. 3 and 4 conceptually illustrate first and second components of an image location difference value of the small unit of FIG. 1. The component illustrated in FIG. 3 represents the difference between the top black portions in I and R. The component illustrated in FIG. 4 represents the difference between the bottom black portions in I and R. FIG. 5 conceptually illustrates the image location difference value of the small unit of FIG. 1.

It is appreciated that the image location difference value illustrated in FIG. 5 is greater than the image location difference value which would result if only the top black portions were present in FIGS. 1 and 2, or if only the bottom black portions were present in FIGS. 1 and 2. Some conventional systems would produce a non-zero image location difference value if only the top black portions were present in FIGS. 1 and 2, or if only the bottom black portions were present in FIGS. 1 and 2. However, the image location difference value would be 0 in conventional systems if top and bottom black portions were both present as in FIGS. 1 and 2, because the discrepancy between the areas of the top black portions T is cancelled out by the discrepancy between the areas of the bottom black portions B.

A further particular feature of the compensate-and-compare defect detection method of the present invention is that two computation levels are employed rather than a single computation level. The two computation levels are now described in detail:

Image location level: A plurality of overlapping image locations is defined to cover the image. In the illustrated embodiment, each image location is a 2×2 pixel window, and there is a one-pixel overlap between adjacent image locations in both the horizontal and the vertical directions. For each image location, a plurality of translations are inspected using a local edge related criterion, as explained in more detail herein. Using the local edge related criterion, a translation of a particular image location is assigned an image location difference value (ILDV) of either:

a. 'true' (1), indicating that it is legitimate for an image location, i.e. that it translates the image location to a similar DB location; or a value of b. 'false' (0), indicating that the translation is not legitimate for the particular image location, i.e. that the DB location to which the image location is translated is not similar to the image location.

Comparison entity level: Each comparison entity comprises a plurality of image locations. The ILDV's for the various image locations included in a particular comparison entity are combined by applying a boolean AND operation to obtain the set of translations legitimate for all image locations within the particular comparison entity. If this set is empty, that is, if no single translation is legitimate for all image locations in the comparison entity, a defect is announced.

An advantage of providing two computational levels as described above is that a relatively simple hardware implementation may thereby be provided, as described in detail below. The hardware described herein performs a plurality of comparisons at the image location level. Thereby, a bit map of legitimate translations is formed for each image location. The bitmaps for the various image locations are used more than once in order to perform comparisons at the comparison entity level.

Another advantage of the apparatus shown and described herein is a computational gain resulting from the overlap of comparison entities. Because each individual image location is normally included in several comparison entities which overlap thereat, relatively expensive comparisons may be carried out once for the individual image location stored, and used several times in order to compare the several comparison entities overlapping at that image location.

In summary, the method and apparatus of the present invention enjoy at least the following advantages relative to conventional defect detection systems:

1. Good Compensation for expected differences: The size of regions used as comparison entities in the regional comparison process of the present invention is chosen to enhance compensation for expected differences. The local comparison process further enhances compensation for expected differences by compensating at the level of individual edges.

2. Low level of defect compensation: In the regional process, region size is selected to be large enough to reduce the level of defect compensation, for defects of all types, and also small enough to substantially prevent compensation for misplaced edges. In the local comparison process, the length of edges used as comparison entities is selected to be large enough to reduce the level of compensation for the local-type defects, as defined above, which the local process detects.

3. Processing speed: Due to the accuracy of the comparison step (step I), the system can process images with dense geometries. Also, for images with less dense geometries, pixel size can be enlarged with consequent increase in processing speed.

4. Simple implementation: The two-level apparatus shown and described herein, including a comparison-entity level and an image-location level, provides relatively simple and efficient manipulation of boolean values. For example, the comparison-entity level uses at least some of the boolean values computed at the image-location level at least twice, corresponding to the at least two comparison entities overlapping at an individual image location.

There is thus provided in accordance with a preferred embodiment of the present invention a method for comparing first and second digital representations of an image, the method including the steps of:

for each individual translation from among a plurality of translations from the first digital representation to the second digital representation:

for each individual image location from among a plurality of image locations within a comparison entity within the first digital representation, determining a binary legitimacy value of the individual translation for the individual image location by comparing the individual image location to a location in the second digital representation defined by operating the individual translation on the individual image location, and combining the binary legitimacy values of image locations within the comparison entity, thereby to generate a comparison entity legitimacy value determining whether the individual translation is legitimate for the comparison entity, and announcing a defect for the comparison entity if none of the plurality of translations are legitimate therefor.

Further in accordance with a preferred embodiment of the present invention, the steps of determining, combining and announcing are repeated for each of a plurality of comparison entities defined in the first digital representation.

Still further in accordance with a preferred embodiment of the present invention, the method also includes the step of comparing the binary legitimacy values of the plurality of translations and selecting at least one translation suitable for realignment of the first and second digital representations.

Additionally in accordance with a preferred embodiment of the present invention, the plurality of comparison entities includes a plurality of adjacent image regions.

Further in accordance with a preferred embodiment of the present invention, the step of combining includes the step of ANDing the binary legitimacy values of all image locations within the comparison entity.

Still further in accordance with a preferred embodiment of the present invention, the step of comparing and selecting includes the steps of:

summing the comparison entity legitimacy values of each individual translation from among the plurality of translations, over a plurality of adjacent comparison entities, and selecting at least one translation with a relatively high sum of comparison entity legitimacy values.

There is also provided, in accordance with another preferred embodiment of the present invention, a method for comparing first and second digital representations of an image, the method including the steps of:

for each individual translation from among a plurality of translations from the first digital representation to the second digital representation:

for each individual image location from among a plurality of image locations within a comparison entity within the first digital representation, determining legitimacy of the individual translation for the individual image location by comparing the individual image location to a location in the second digital representation defined by operating the individual translation on the individual image location, and generating a nonlinear combination of the legitimacies of all image locations within the comparison entity, thereby defining the legitimacy of the individual translation for the comparison entity, and announcing a defect for the comparison entity if none of the translations thereof are legitimate.

Further in accordance with a preferred embodiment of the present invention, the legitimacy of an individual translation is a binary value.

There is further provided, in accordance with a further preferred embodiment of the present invention, a method for comparing first and second digital representations of an image, the method including the steps of:

comparing each individual one of a multiplicity of comparison entities of a first type in the first digital representation to at least one corresponding location in the second digital representation, the correspondences between the individual comparison entity of the first type and the at least one locations in the second digital representation respectively defining at least one transformations from the first digital representation to the second digital representation, comparing each individual one of a multiplicity of comparison entities of a second type in the first digital representation to at least one corresponding location in the second digital representation, the at least one locations in the second digital representation corresponding respectively to the at least one transformations applied to the individual comparison entity of the second type, and providing an output indication of differences between the first and second digital representations in accordance with the results of the comparing steps, wherein the two comparing steps are performed in parallel.

There is also provided, in accordance with another preferred embodiment of the present invention, a method for comparing first and second digital representations of an image, the method including the steps of:

I. for each individual translation from among a plurality of translations from the first digital representation to the second digital representation:

A. for each individual image location from among a plurality of image locations within a comparison entity within the first digital representation:

i. comparing the individual image location to a location in the second digital representation defined by operating the individual translation on the individual image location, ii. evaluating the geometrical complexity of the vicinity of the location in the second digital representation, and iii. determining the legitimacy of the individual translation for the individual image location in accordance with the results of the comparing and evaluating steps, and B. combining the legitimacies of all image locations within the comparison entity, thereby defining the legitimacy of the individual translation for the comparison entity, and II. announcing a defect for the comparison entity if none of the translations thereof are legitimate.

Further in accordance with a preferred embodiment of the present invention, the step of evaluating is performed once for all image locations within an individual comparison entity.

There is further provided, in accordance with a further preferred embodiment of the present invention, a method for detecting errors in alignment of first and second digital representations of an image, the method including the steps of:

for each individual location from among a multiplicity of locations within the first digital representation, determining at least one best translation from the first digital representation to the second digital representation for translating the individual location, and announcing an alignment error if the at least one best translations of a plurality of adjacent locations are mutually discrepant.

There is still further provided, in accordance with still a further preferred embodiment of the present invention, a method for aligning first and second digital representations of an image, the method including, for each individual large location from among a plurality of relatively large locations covering the first digital representation, the steps of:

A. for each individual translation from among a plurality of translations from the first digital representation to the second digital representation:
   i. for each individual small location from among a multiplicity of relatively small locations included in the individual large location, determining a binary legitimacy value of the individual translation for the individual small location, and
   ii. combining the binary legitimacy values of the small locations included in the individual large location into a success score representing the success of the individual translation in translating the individual large location, and B. improving the alignment of the first and second digital representations by operating an individual translation on the individual large location, wherein the individual translation is selected from the plurality of translations on the basis of the success score of the individual translation for the individual large location.

There is also provided, in accordance with a preferred embodiment of the present invention, apparatus for comparing first and second digital representations of an image, the apparatus including:

a per-image location translation legitimacy determining unit operative to generate, for each individual translation from among a plurality of translations from the first digital representation to the second digital representation and for each individual image location from among a plurality of image locations within a comparison entity within the first digital representation, a binary legitimacy value of the individual translation for the individual image location, a per-comparison entity translation legitimacy determining unit operative to combine the binary legitimacy values of image locations within the comparison entity, thereby to generate a comparison entity legitimacy value determining whether the individual translation is legitimate for the comparison entity, and a defective comparison entity announcing unit operative to announce a defect for the comparison entity if none of the plurality of translations are legitimate therefor.

Further in accordance with a preferred embodiment of the present invention, the legitimacy determining units and the defective comparison entity announcing unit are operative for each of a plurality of comparison entities defined in the first digital representation.

Still further in accordance with a preferred embodiment of the present invention, the apparatus also includes a realignment unit operative to compare the binary legitimacy values of the plurality of translations and to select at least one translation suitable for realignment of the first and second digital representations.

Still further in accordance with a preferred embodiment of the present invention, the plurality of comparison entities includes a plurality of adjacent image regions.

Additionally in accordance with a preferred embodiment of the present invention, the per-comparison entity translation legitimacy determining unit includes ANDing apparatus operative to AND the binary legitimacy values of all image locations within the comparison entity.

Further in accordance with a preferred embodiment of the present invention, the realignment unit includes a summer operative to sum the comparison entity legitimacy values of each individual translation from among the plurality of translations, over a plurality of adjacent comparison entities, and a selector operative to select at least one translation with a relatively high sum of comparison entity legitimacy values.

In accordance with another preferred embodiment of the present invention, there is provided apparatus for comparing first and second digital representations of an image and including:

a per-image location translation legitimacy determining unit operative, for each individual translation from among a plurality of translations from the first digital representation to the second digital representation and for each individual image location from among a plurality of image locations within a comparison entity within the first digital representation, to determine legitimacy of the individual translation for the individual image location by comparing the individual image location to a location in the second digital representation defined by operating the individual translation on the individual image location, a non-linear legitimacy combining unit operative to generate a nonlinear combination of the legitimacies of all image locations within the comparison entity, thereby defining the legitimacy of the individual translation for the comparison entity, and a defective comparison entity announcing unit operative to announce a defect for the comparison entity if none of the translations thereof are legitimate.

Further in accordance with a preferred embodiment of the present invention, the legitimacy of an individual translation is a binary value.

There is also provided in accordance with another preferred embodiment of the present invention, apparatus for comparing first and second digital representations of an image, the apparatus including:

first-type comparison entity comparing apparatus operative to compare each individual one of a multiplicity of comparison entities of a first type in the first digital representation to at least one corresponding location in the second digital representation, the correspondences between the individual comparison entity of the first type and the at least one locations in the second digital representation respectively defining at least one transformations from the first digital representation to the second digital representation, second-type comparison entity comparing apparatus operative to compare each individual one of a multiplicity of comparison entities of a second type in the first digital representation to at least one corresponding location in the second digital representation, the at least one locations in the second digital representation corresponding respectively to the at least one transformations applied to the individual comparison entity of the second type, and a difference announcer operative to provide an output indication of differences between the first and second digital representations in accordance with output received from the comparing apparatus, wherein the two comparing apparatus operate in parallel.

There is further provided, in accordance with a further preferred embodiment of the present invention, apparatus for comparing first and second digital representations of an image, the apparatus including an image location comparison unit and a geometrical complexity evaluator, wherein, for each individual translation from among a plurality of translations from the first digital representation to the second digital representation and for each individual image location from among a plurality of image locations within a comparison entity within the first digital representation:

the image location comparison unit is operative to compare the individual image location to a location in the second digital representation defined by operating the individual translation on the individual image location and to provide a suitable output, and the geometrical complexity evaluator is operative to evaluate the geometrical complexity of the vicinity of the location in the second digital representation and to provide a suitable output, a per-image location translation legitimacy determining unit operative to determine the legitimacy of an individual translation for an individual image location in accordance with the outputs of the image location comparison unit and of the geometrical complexity evaluator for the individual translation and for the individual image location, a per-comparison entity translation legitimacy determining unit operative to combine the legitimacies of all image locations within an individual comparison entity, thereby defining the legitimacy of the individual translation for the comparison entity, and a defective comparison entity announcer operative to announce a defect for the comparison entity if none of the translations thereof are legitimate.

Further in accordance with a preferred embodiment of the present invention, the geometrical complexity evaluator provides uniform output for all image locations within an individual comparison entity.

There is also provided, in accordance with a preferred embodiment of the present invention, apparatus for detecting errors in alignment of first and second digital representations of an image, the apparatus including a best translation identifier operative to determine, for each individual location from among a multiplicity of locations within the first digital representation, at least one best translation from the first digital representation to the second digital representation for translating the individual location, and a best translation discrepancy analyzer operative to announce an alignment error if the at least one best translations of a plurality of adjacent locations are mutually discrepant.

There is also provided, in accordance with another preferred embodiment of the present invention, apparatus for aligning first and second digital representations of an image, the apparatus including, for each individual large location from among a plurality of relatively large locations covering the first digital representation:

a per-large location success score generator operative to generate a success score for each individual translation from among a plurality of translations from the first digital representation to the second digital representation, the success score representing the success of the individual translation in translating the individual large location, the success score generator including:

a per-small location binary legitimacy value generator operative to generate, for each individual small location from among a multiplicity of relatively small locations included in the individual large location, a binary legitimacy value of the individual translation for the individual small location, and a small-location result combining unit operative to combine the binary legitimacy values of the small locations included in an individual large location into a success score thereof, and an alignment unit operative to improve the alignment of the first and second digital representations by operating an individual translation on an individual large location, wherein the individual translation is selected from the plurality of translations on the basis of the success score of the individual translation for the individual large location.

BRIEF DESCRIPTION OF THE DRAWINGS

The present invention will be understood and appreciated from the following detailed description, taken in conjunction with the drawings in which:

FIG. 26 is a simplified block diagram of a preferred embodiment of a local combining unit forming part of the defect detection unit of FIG. 18.

DETAILED DESCRIPTION OF PREFERRED EMBODIMENTS

Figure 1:
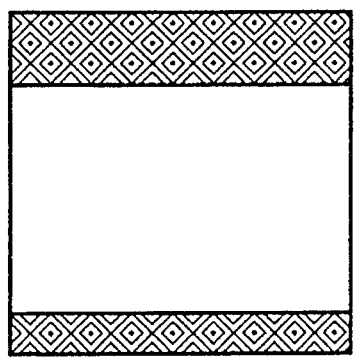
FIGS. 1 and 2 are conceptual illustrations of corresponding small units in image and reference datastreams, respectively.
Figure 2:
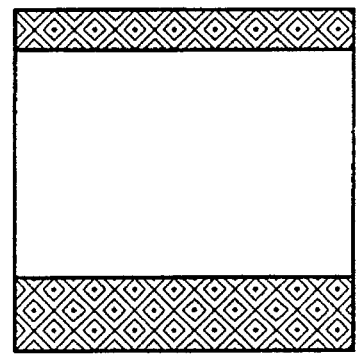
Figure 4:
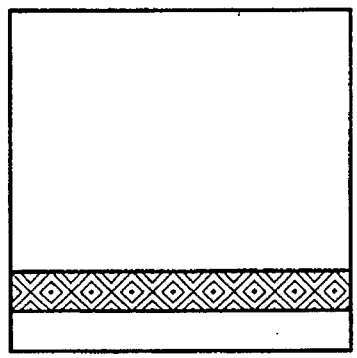
FIGS. 3 and 4 are conceptual illustrations of first and second components of an image location difference value for the small unit of FIG. 1.
Figure 3:
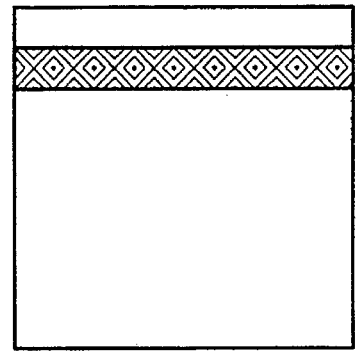
Figure 5:
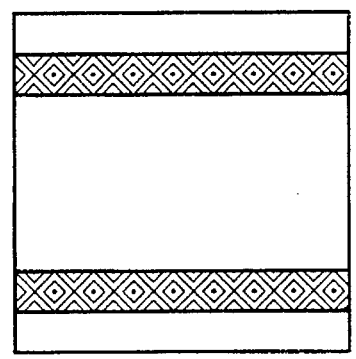
FIG. 5 is a conceptual illustration of both components of an image location difference value for the small unit of FIG. 1.

In the present specification and claims, the term digital representation of an image is intended to refer to any representation of an image which is expressed in discrete symbols, such as numerical symbols. A common digital representation of an image is a digital file or a stream of digital data comprising a plurality of numerical values corresponding to a plurality of pixels into which the image has been divided.

In order to simplify understanding of the present specification and claims, the following data structure elements are defined:

Whole Pixel (WP):

A unit of representation of the database and image (I) streams on a first predetermined grid which may or may not be of the same resolution as the resolution in which the image was sampled. Whole pixels are also termed herein "pixels". Each whole pixel comprises 2×2 half-pixels, defined below.

Half-pixel (HP):

A unit of representation of the database and image streams in a second predetermined grid each of whose axes has twice the resolution of the corresponding axes of the first predetermined grid. Each half pixel is represented by a numerical value indicating the percentage of black area inside the HP. In the illustrated embodiment, each half-pixel is represented in 4 bits and each WP, comprising 4 HP's, is therefore represented in 16 bits, however this need not be the case.

Image location:

A 2×2 array of whole pixels. Since each whole pixel is a 2×2 array of half-pixels, an image location is also a 4×4 array of half-pixels. The image is covered by a multiplicity of overlapping image locations. The centers of adjacent image locations are typically spaced one pixel apart. It is appreciated that the above image location dimensions and spacings are merely exemplary and are not intended to be limiting.

E_position data:

For each image location, data which categorizes each of the four pixels in the image location into one of three categories, termed herein selected, non-selected and other. A pixel which is categorized as selected in relation to a particular image location contains a portion of an edge which has been selected for that image location. A pixel which is categorized as non-selected contains at least a portion of an edge other than the selected edge and may or may not contain a portion of the selected edge. An other pixel does not contain any portion of any edge. In the illustrated embodiment, the E_POSITION data for each image location is represented as four 2-bit values.

If an individual image location includes more than one edge portion, only one of the included edge portions is selected, preferably the longest edge portion. If an individual image location includes more than one longest edge portions, either of the longest edge portions may be selected. Typically, each edge portion in the image is selected for at least one image location.

A preferred method for providing E-POSITION data for each image location is described below with reference to FIG. 8.

E_NEIGHBORS data:

For each image location two pointers pointing to two respective adjacent ("neighbor") image locations, if such exist, whose selected edge portions are each a continuation of the selected edge portion included in the individual image location. An adjacent image location having this characteristic is termed herein an "edge neighbor". Typically, zero, one or two of the 8 image locations adjacent an individual image location are edge neighbors thereof. Each pointer is preferably represented in 4 bits. One bit indicates whether or not an edge neighbor exists and the remaining three bits identify which of the 8 adjacent image locations is the edge neighbor.

Figure 6:
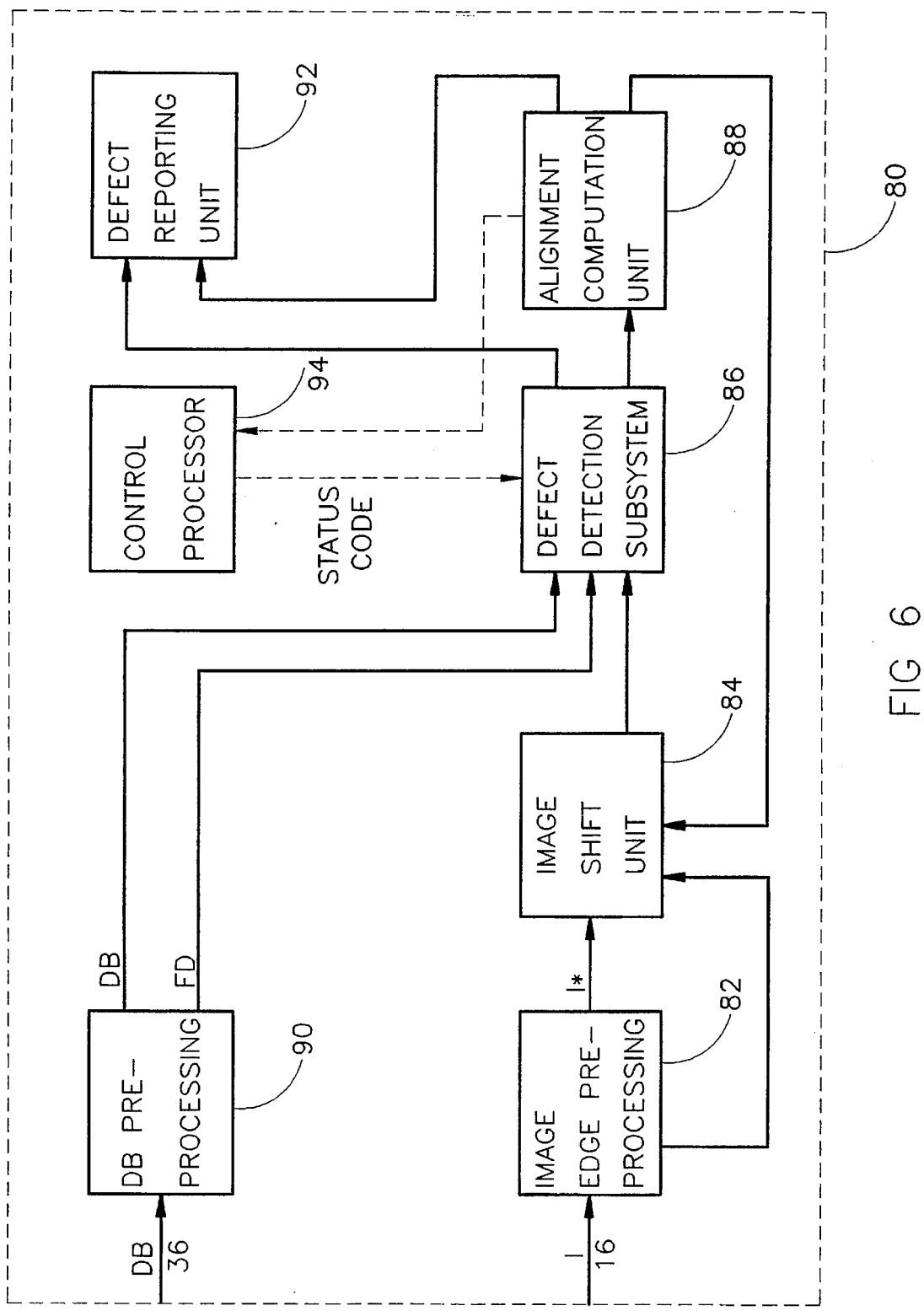
FIG. 6 is a high-level simplified block diagram of a defect detection system constructed and operative in accordance with a preferred embodiment of the present invention.

Reference is now made to FIG. 6 which is a block diagram of a defect detection system, referenced generally 80, operative to detect defects in microscopic objects and constructed and operative in accordance with a preferred embodiment of the present inventions. Defect detection system 80 is operative to compare two digital representations of an image which are received as two datastreams, indicated as the DB (database or reference) stream and the I (image) stream. The DB stream includes a binary raster representation of a database wherein each pixel is described by 36 (6×6) bits. The I stream comprises a stream of 16-bit WP's, as defined above.

A gray precursor of the image stream may be directly provided by an imaging system (not shown) that scans an object to be inspected such as a reticle. Alternatively, the image stream may be provided by a digital storage unit such as a disk which stores images to be inspected. A commercially available imaging system is the MaxVideo 20 system, available from Datacube Inc., 4 Dearborn Rd., Peabody Mass. 01960, U.S.A.

In order to convert the gray image data provided by the imaging system into WP representation, a binarization process for converting each gray pixel into a 6×6 array of binary pixels may be employed. Subsequently, a binary pixel count may be employed in order to generate area values for each HP. The binarization process may be implemented using conventional edge detection and segmentation methods such as those described in the following articles, the disclosures of which are incorporated herein by reference:

Hildreth, E. C., "Implementation of a Theory of Edge Detection", Report AI-TR-579, AI Laboratory, MIT, Massachusetts, U.S.A., April, 1980.

The image stream is received by an image edge preprocessing unit 82. Image edge preprocessing unit 82 computes the E_POSITION and E_NEIGHBORS data streams defined above. These two data streams collectively are also termed herein edge data. The image stream, E_POSITION stream and E_NEIGHBORS stream collectively are also termed herein the I* stream.

An image shift unit 84 receives I*, including the image stream and the edge data, from image edge preprocessing unit 82. Image shift unit 84 is operative to control delay of the I* datastream, thereby to shift the image relative to the database in accordance with alignment information pertaining to the relative positions of the image and database. The image/database alignment information is provided to image shift unit 84 by a defect detection subsystem 86 via an alignment computation unit 88, both of which are discussed in more detail below.

It is a particular feature of the present invention that it is not necessary to conduct, for alignment purposes, a separate comparison of the I and DB datastreams, in addition to the I and DB comparison process carried out by defect detection subsystem 86 for defect detection purposes. Rather, the results of the comparison carried out for defect detection purposes are also employed to determine the relative positions of image and database.

The second stream of data, termed herein "the database stream", may comprise design data of the object to be inspected, converted into 6×6 bit per pixel format. However, the second stream of data need not, in fact, be a database and may alternatively comprise a binarized image, provided by an imaging system or retrieved from digital storage, as described above with reference to the image stream.

The database stream is received by a database preprocessing unit 90 which groups the 36 bit per pixel database stream into 9 parallel 16-bit per WP data streams. The database preprocessing unit also provides a classification of the local geometry of the database, termed herein the "FD code", as explained in detail below with reference to FIG. 9. The FD code stream is provided to defect detection subsystem 86 which utilizes the code to select thresholds for local defect detection. If the FD code indicates a complex edge structure in a particular location of the database, then relatively high local detection thresholds are employed and conversely, relatively low thresholds are employed when inspecting simple edge structures such as single edges or single corners. The grouped database stream and the FD code stream are provided to defect detection subsystem 86 which is operative to compare the DB and I data streams.

Defect detection subsystem 86 receives the image data and image edge data streams from image shift unit 84, compares the image data stream to the database data stream and provides an output indication of differences between the I and DB streams. Defect detection subsystem employs an improved compensate-and-compare algorithm to detect defects and is described in detail below with reference to FIG. 16.

The output indication of differences provided by defect detection subsystem 86 includes a datastream indicative of the relative goodness of various image to database translations and termed herein the translation map. Alignment computation unit 88 receives the translation map from defect detection subsystem 86 and computes alignment information pertaining to the relative positions of the image and database. The alignment information is employed for at least the following two purposes:

(a) Providing indications of defects: The alignment information is useful in identifying defects because it can identify extreme fluctuations in the relative positions of the image and database. Small fluctuations in alignment may be due to inaccuracies of the imaging apparatus and therefore are not classified as defects. Fluctuations which are too large to be attributed to inaccuracies of the imaging apparatus may be defects. The information regarding extreme fluctuations in alignment is provided to a defect reporting unit 92.

(b) Providing shift information: The alignment information is also employed by image shift unit 84 in order to maintain the distance between image and database within the limits of the search process implemented in detection subsystem 86. For example, if the limits of the search process are plus/minus 1.5 pixels, shift instructions may be provided to image shift unit 84 only when the distance between image and database is found to be more than approximately 0.75 pixels.

Defect reporting unit 92 receives separate output from the regional and local defect detection processes carried out in defect detection subsystem 86 as well as receiving the defect-indication output of alignment computation unit 88. Defect reporting unit 92 combines these three inputs and outputs them to an external source, such as a digital file, stored in any suitable medium such as a disk or RAM. Preferably, the output of defect reporting unit 92 comprises, for each individual image location, an output indication of:

a. presence or absence of a local defect in the edge neighborhood centered at the individual image location, b. presence or absence of a regional defect in the region to which the image location belongs, and c. presence or absence of an alignment defect in an integration area comprising a plurality of adjacent regions. An alignment defect indicates that a large discrepancy exists between the identified misalignments of regions within the integration area.

A control processor 94 is provided which coordinates the operations of the various components of the system 80. The control processor preferably provides a status code to detection subsystem 86 which reflects user decisions regarding at least one of the following characteristics of the system:

a. Defect types to be detected. Some or all of regional, local, and alignment defects may be detected.

b. Detection sensitivity of the system for each type of defect to be detected.

The various components of FIG. 6 are now described in detail. First, image edge processing unit 82, image shift unit 84 and alignment computation unit 88 are described with reference to FIGS. 7A & 7B, and database preprocessing unit 90 is described with reference to FIG. 9. Next, a preferred method and structure for implementing defect detection subsystem 86 is described with reference to FIGS. 11, 16–18 and 21–24A&B.

Figure 7A:
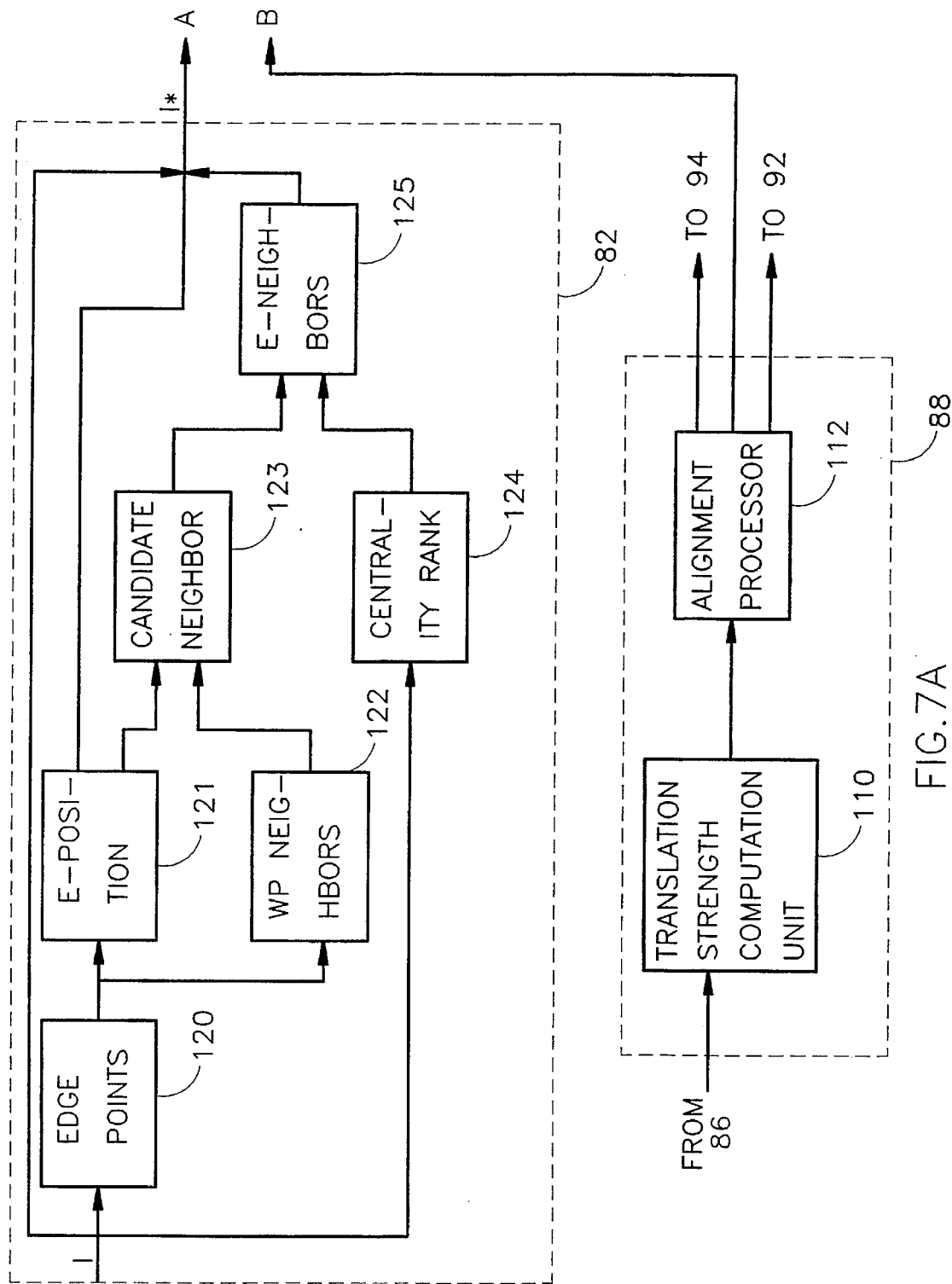
FIGS. 7A and 7B, taken together, are a simplified block diagram of a preferred embodiment of image edge preprocessing unit 82, image shift unit 84, and alignment computation unit 88, all of which form part of the defect detection subsystem of FIG. 6.

Reference is now made to FIGS. 7A & B, which together form a block diagram of a preferred embodiment of image edge preprocessing unit 82, image shift unit 84 and alignment computation unit 88 of FIG. 6.

Image edge preprocessing unit 82 is now described in detail. As explained above, image edge processing unit 82 receives the image stream from outside the system. Each 4 bits of the image stream I received by image edge preprocessing unit 82 represents the percentage of black area in a single HP or half-pixel. As explained above, each 4 HP's defines a WP or whole pixel. Image edge preprocessing unit 82 computes edge data pertaining to locations of edges in the image. The edge data comprises the E_POSITION and E_neighbor data streams defined above. The output of the image edge preprocessing unit 82 is the original I data stream together with the computed E_POSITION and E_NEIGHBORS streams.

As explained above, the E_position data categorizes each pixel as selected, nonselected or other, in relation to a particular image location. The E_NEIGHBORS data for each image location comprises two pointers each of which points to a neighboring image location, iif such exists, whose selected edge portion is a continuation of the selected edge portion included in the individual image location. Normally, there are zero, one or two image locations from among the 8 image locations adjacent an individual image location whose selected edge portion is a continuation of the selected edge portion of the image. Each pointer is represented in 4 bits in the illustrated embodiment.

Figure 8:
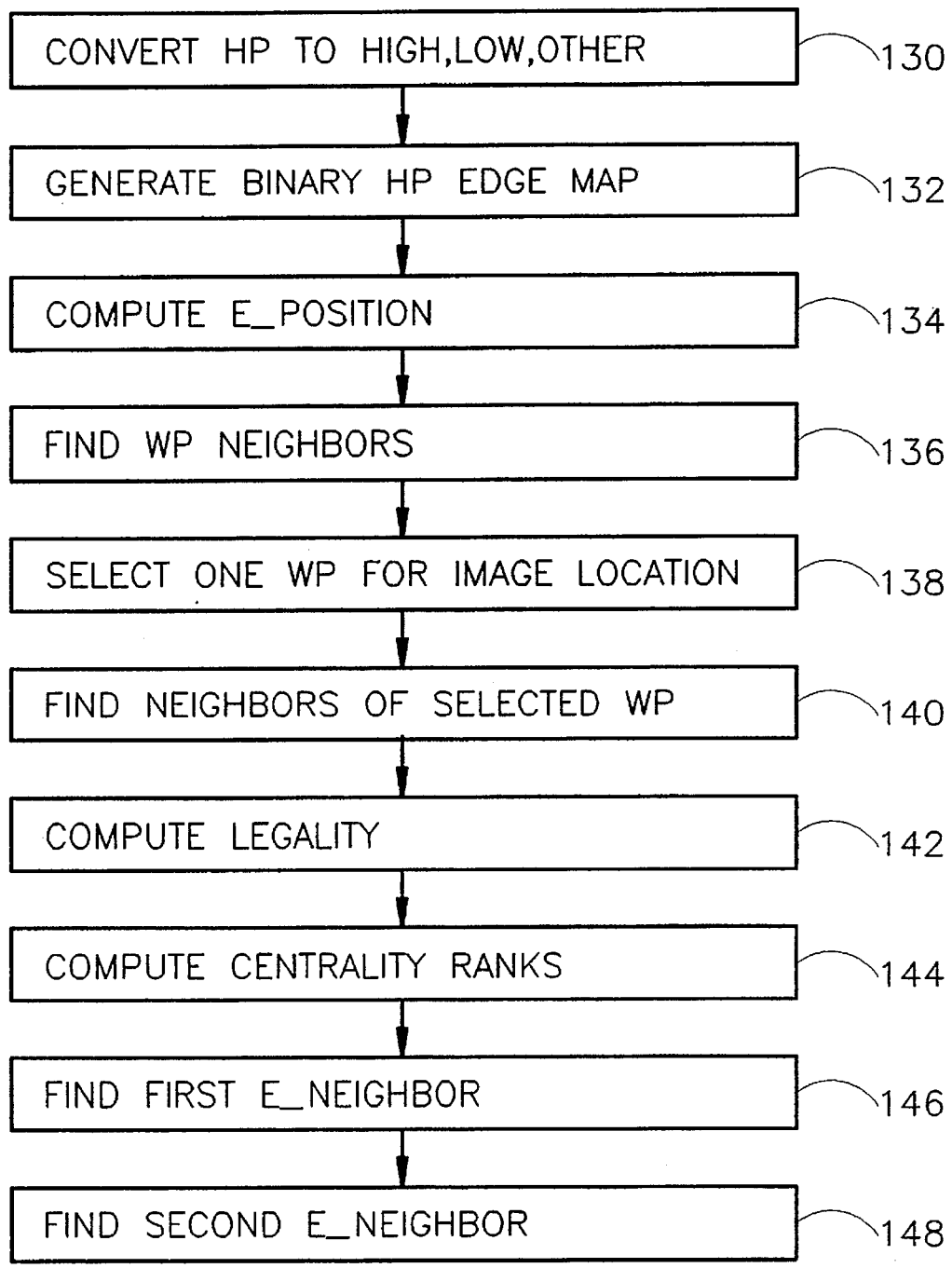
FIG. 8 is a simplified flowchart of a preferred method for computing image edge data which may be performed by image edge preprocessing unit 82 of FIG. 7.

Reference is now made to FIG. 8 which is a flowchart of a preferred method for computing the E_NEIGHBORS and E_POSITION data, which may be performed by image edge preprocessing unit 82.

The method of FIG. 8 preferably comprises the following steps:

Step 130:

Convert each HP value of the image datastream into one of three ordinal values, termed herein HIGH, LOW and OTHER. For example, if each input HP is represented by 4 bits, an HP value of 15 is converted to HIGH, an HP value of 0 is converted to LOW and HP values of 1 to 14 are converted to OTHER.

Step 132:

Generate a binary edge map in HP resolution in which each HP that includes an edge receives a value '1', and each HP that does not include an edge receives a value '0'.

The edge map value of V0, an individual HP, may be computed in accordance with the following formula:

edge_map_value = (not V0 = LOW and not V0 = HIGH) or
    V0 = LOW and (V1 = HIGH or V2 = HIGH or V3 = HIGH) or
        V0 = HIGH and (V1 = LOW or V2 = LOW or V3 = LOW)

where the HP's in the vicinity of V0 are denoted as follows:

V0 V1
V2 V3

Steps 130 and 132 may be performed by unit 120 of FIG. 7. Step 130 may be implemented by a 16 bit-in 8 bit-out table, which provides, for each 16-bit WP, an 8-bit notation for its 4 2-bit ordinally represented HP's. Step 132 may be implemented by four 8 bit-in 1 bit-out tables, each determining a binary edge value for a single HP. Apart from the above 5 tables, unit 120 of FIG. 7 also includes suitable delay units.

Step 134:

Compute E_POSITION data for each image location in the image, using the binary edge map of step 132. As explained above, the E_POSITION data includes four 2-bit values which categorize each of the four WP's in an individual image location into one of three categories, termed selected, non-selected and other. A pixel which is categorized as selected in relation to a particular image location contains a portion of an edge selected for that image location. A pixel which is categorized as non-selected contains at least a portion of an edge other than the selected edge and may or may not contain a portion of the selected edge. An "other" pixel does not contain any portion of any edge.

The process for selecting an edge for an individual image location may be as follows: If there is only one edge in the image location, that edge is the selected edge. If there is more than one edge in the image location, the longer one (in HP's) is defined as the selected edge. A preferred criterion for connecting HP's into edges is 8-connectedness.

Step 134 may be performed by E_POSITION unit 121 of FIG. 7. The 16 1-bit edge map values corresponding to each-image location may be used to address a 16 bit-in, 8 bit-out table which provides the 4×2=8 bits of E_POSITION data for each image location.

Step 136:

The binary edge map computed in step 132 is employed to find, for each WP that contains an edge, all neighboring WP's in which the edge continues. Typically, there are 0, 1 or 2 such neighbors. Information regarding each of the two neighbor pointers for each WP is preferably represented by a 4 bit code. 3 bits are used to indicate neighbor location. The fourth bit is used to indicate existence of at least one neighbor.

Step 136 may be performed by WP neighbors unit 122 of FIG. 7. For each individual WP, a 4×4 HP portion of the binary edge map which is centered around the individual WP is employed to address a 16 bit-in 8 bit-out table, which determines the 4 bit code for each of the two neighbors.

In steps 138, 140 and 142, candidate neighbors are identified for each image location. Candidate neighbors of a current image location are adjacent image locations whose selected edge is a continuation of the selected edge passing in a current edge location. The output of the candidate neighbor identification process for each current image location preferably includes two 8-bit words, indicating the legality of each of the 8 neighbors of the current image location regarding first and second continuations, respectively, of the selected edge of the current image location. The term legality here characterizes a neighboring image location which "qualifies" as a candidate neighbor of a current image location.

The three steps 138, 140 and 142 of the process whereby candidate neighboring image locations of an individual current image location are identified are now discussed in detail.

Step. 138:

From among the 4 WP's included in the current image location, select a WP through which the selected edge passes. This step is implemented by addressing a 4-bit in 2-bit out table with the E_POSITION data.

Step 140:

Identify the two WP neighbors of the WP selected in step 138. These two neighbors are referred to herein as n1 and n2. In order to perform step 140, the WP neighbor data stream computed in step 136 is suitably delayed.

Step 142:

Mark the legality of the neighbors relative to n1 and n2. An image location neighbor is legal with respect to neighboring WP n1, if the location n1 is a selected edge within it (i.e. the pixel n1 has a 'selected' categorization).

Step 142 may be implemented by four 16 bit-in 4 bit-out tables, each of which handles two neighbors. Each table is addressed by the locations of the two neighbors (4+4 bits) concatenated with E_POSITION data for the two candidate neighbors (4+4 bits). The output of each two-neighbor table includes two legality bits for neighbor n1 and two legality bits for neighbor n2.

Step 144:

Assign a centrality rank for each image location. Centrality ranks are determined as a function of the percentage of white area in an individual image location (% W). Specifically, the centrality rank of an image location typically equals % W if % W does not exceed 50. If % W exceeds 50, the centrality rank of the image location equals % W−50.

Step 144 may be performed by unit 124 of FIG. 7A. A 16 bit-in 4 bit-out table may be provided to sum the white area for each WP. A 16 bit-in 3 bit-out table may be provided to receive the output of the above table, and sum the area of each image location by summing the white areas of the four WPs included in each image location, thereby to provide a 3 bit centrality rank. Steps 146 and 148, two of the 8 neighbors of each individual image location are selected as E_NEIGHBORS for the individual image location. Each of the two E_NEIGHBORS of an individual image location contains a selected edge which is a continuation of the selected edge of the individual image location.

The E-NEIGHBORS are selected as the two highest centrality-ranking candidates from among the legal candidate neighbors found in step 142. The selection process may be implemented in unit 125 of FIG. 7A by prefixing a legality bit to the 3-bit centrality ranking for each of the candidates of step 142, and then identifying the two candidates having maximum values. In step 146, a first E_neighbor is found. In step 148, a second E_neighbor is found. Steps 146 and 148 are now discussed in detail.

Step 146:

The legal candidate neighbors identified in step 142 are divided into two groups, each containing four legal candidate neighbors. For each group, the highest centrality ranking candidate neighbor location is identified, using a 16 bit-in 5 bit-out table. The 5-bit output includes 3 bits indicating the centrality rank of the highest ranking candidate neighbor and two bits identifying the highest ranking candidate neighbor within the group of 4 legal candidate neighbors to which it belongs.

The two 5-bit words provided by the tables of the two groups respectively are employed to address a 10 bit-in 4 bit-out table which outputs an E_neighbor code identifying the first neighbor.

Step 148:

The second E_neighbor is selected as follows:

The process may be similar to the process of step 146, except that the legality bit of the E_neighbor selected in step 146 is "turned off". This may be implemented by addressing a 12 bit-in 8 bit-out legality bit updating table with the 8 legality bits and the 4 bit code of the E_neighbor identified in step 146.

Referring back to FIG. 7B, image shift unit 84 is now described in detail. From image edge preprocessing unit 82, image shift unit 84 receives input preferably including the following components:

a. 16 bits of image data pertaining to the WP's of a current row; and b. 16 bits of E_POSITION and E_NEIGHBORS data pertaining to the image locations of the current and next rows.

The output of image shift unit 84 includes all information pertaining to the image locations of the current and next rows. In other words, the output of image shift unit 84 preferably includes pixel values for the WP's of the current and next rows (32 bits) and edge related data for the current and next rows (16 bits).

Image shift unit 84 receives shift commands from alignment computation unit 88 which specify suitable x and y shift values for the image. According to a preferred embodiment of the present invention, each shift value can only be −1, 0 or 1 WP's along either a row or a column and an overlap of 1 WP is provided between image locations which are adjacent along either a row or a column. An advantage of this embodiment is that image data is not lost due to alignment correction. In other words, it is guaranteed that each image row received by image shift unit 84 will also leave image shift unit 84.

Figure 7B:
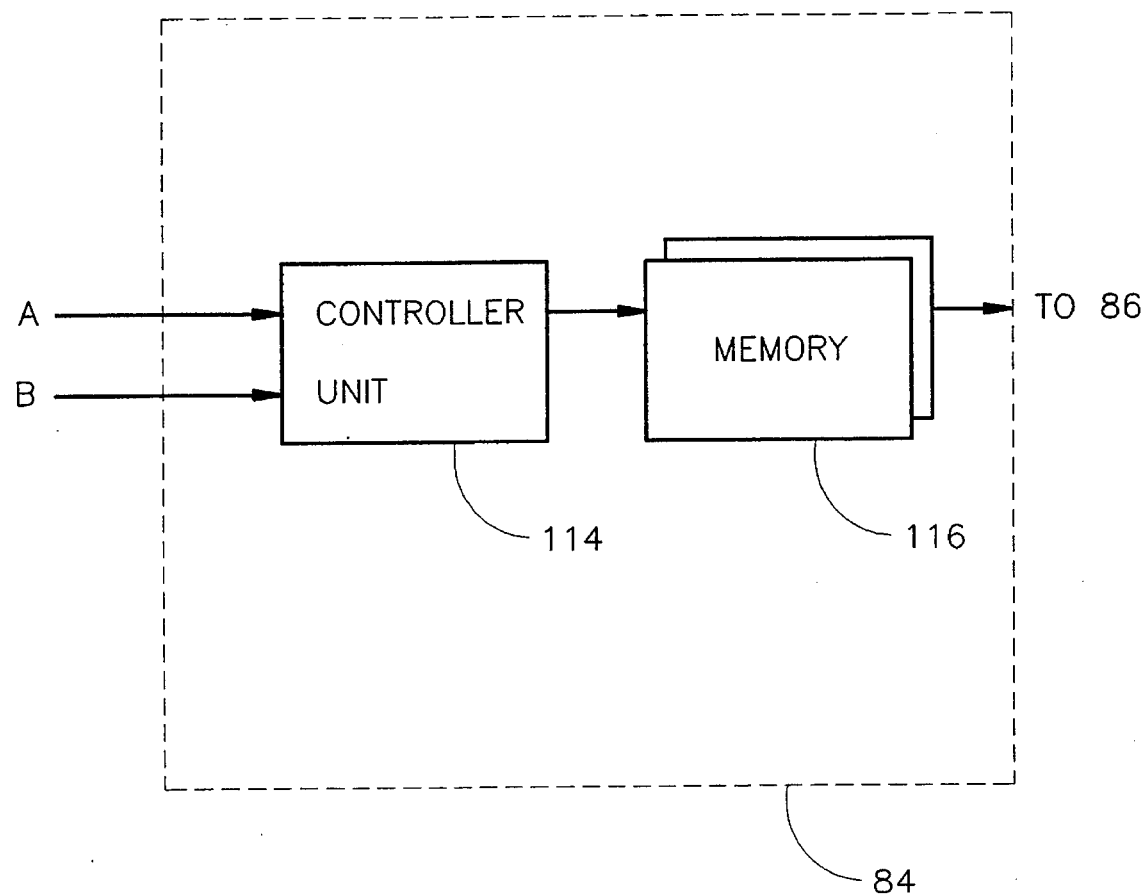

As shown in FIG. 7B, image shift unit 84 preferably comprises a controller unit 114 and a cyclic buffer memory unit 116. Image data entering image shift unit 84 is written into cyclic buffer memory unit 116. The input and output pointers of cyclic buffer unit 116 are maintained by controller unit 114. Image shift commands are implemented by changing the output pointer of the buffer. Memory unit 116 is large enough to store data pertaining to a number of image rows, where the number of rows depends on the maximal desired delay between the input and output of the image shift unit. For example, a maximal capacity of 100 image rows may be used.

Alignment computation unit 88 of FIG. 6 is now described in detail with reference to FIG. 7A. As explained above with reference to FIG. 6, alignment computation unit 88 is operative to receive a translation map datastream, also termed herein a subsystem level regional translation map, from defect detection subsystem 86 of FIG. 6. Each translation map pertains to an individual region defined in the image datastream. In the illustrated embodiment, each of the 324 components of an individual translation map pertaining to an individual region is indicative of the legitimacy of one of 324 I-DB translations, for translating the individual region into a corresponding location in the database.

According to a preferred embodiment of the present invention, the translation map data is transmitted from defect detection subsystem 86 to alignment computation unit 88 at a rate of 1 bit per time unit, where a time unit is the time required to process a single WP. This is possible if the number of time units in which each region is current (60×120, in the illustrated embodiment) is larger than the number of translations in the search grid of the defect detection subsystem 86 (324, in the illustrated embodiment).

As shown in FIG. 7A, the alignment computation unit 88 preferably comprises a translation strength computation unit 110, and an alignment processor 112.

Translation strength computation unit 110 integrates information regarding a plurality of translation maps. Specifically, unit 110 is operative to generate, for each of a plurality of overlapping integration areas of the image, a translation strength map, which has 324 elements in the illustrated embodiment. Each element of the translation strength map indicates the success of an individual translation from among the 324 translations of the search grid in translating all regions falling within the integration area. Each individual element of the translation strength map is computed by summing corresponding elements of the translation maps of all regions falling within the integration area.

The dimensions of each integration area and the mutual overlap therebetween are preferably determined as a function of mechanical vibrations and variations in other physical parameters of the scanning process which cause image-database misalignment. For example, for a scanning process having a scanning width of 1024 WP's per row, whose mechanical vibrations have a period of 200 rows of WP's, each integration area may have dimensions of 1024 WP's× 200 WP's and the mutual overlap between adjacent integration areas may be 100 or 150 rows of WP's.

Preferably, translation strength computation unit 110 comprises a memory having a plurality of cells corresponding in number to the number of translations in the search grid. In the present embodiment, the memory of unit 110 includes 324 cells. In each time unit, a single bit, pertaining to an individual translation of a single region, is added to the cell corresponding to the individual translation.

Alignment processor 112 receives the translation strength map from translation strength computation unit 110 and computes alignment information status and alignment data. The alignment information status is indicative of the type of alignment data which may be determined and typically comprises one of the following three options:

Best point:
If it is possible to determine a single translation which is stronger than all or most other translations, for the current integration area.

Best line:
If it is possible to determine the location of a linear array of translations which are stronger than all or most other translations, for the current integration area.

No information:
If neither a best point nor a best line can be determined.

The alignment data is either an indication of best point, or an indication of best line, or blank.

Alignment data and the status thereof may be computed as follows:

Alignment processor 112 scans the translation strength map to find a set of translations having maximal or relatively high strengths. If this set is entirely included within a circle of a predetermined radius, such as a radius of 3 map elements, then the center of gravity of the translations is defined as the best alignment point, and the alignment status is "best point". Otherwise, if the translation are generally arranged along a line, the line parameters are extracted using any suitable technique such as a least squares technique and the alignment status is "best line". Otherwise, the alignment status is "no information".

Alignment processor 112 employs the alignment status and alignment data for at least the following purposes:

a. Issuing a "shift image" command to image shift unit 84, in order to maintain the distance between the image and database within the limits of the search process implemented in detection subsystem 86. A "shift image" command may be issued if the "best point" translation or the "best line" translations are operative to translate individual image locations to individual database locations which are more than a predetermined distance away. For example, an "image shift" command may be issued if the "best" translation or translations define a location in the DB whose distance from the corresponding I location is more than 0.75 WP;

b. Finding alignment defects by monitoring "best" translations over time, thereby to identify fluctuations in the relative positions of the image and database which are too large to be accounted for by the inaccuracies of the imaging system; and c. Providing control processor 94 of FIG. 6 with information on the status of alignment of the I and DB datastreams.

Figure 9:
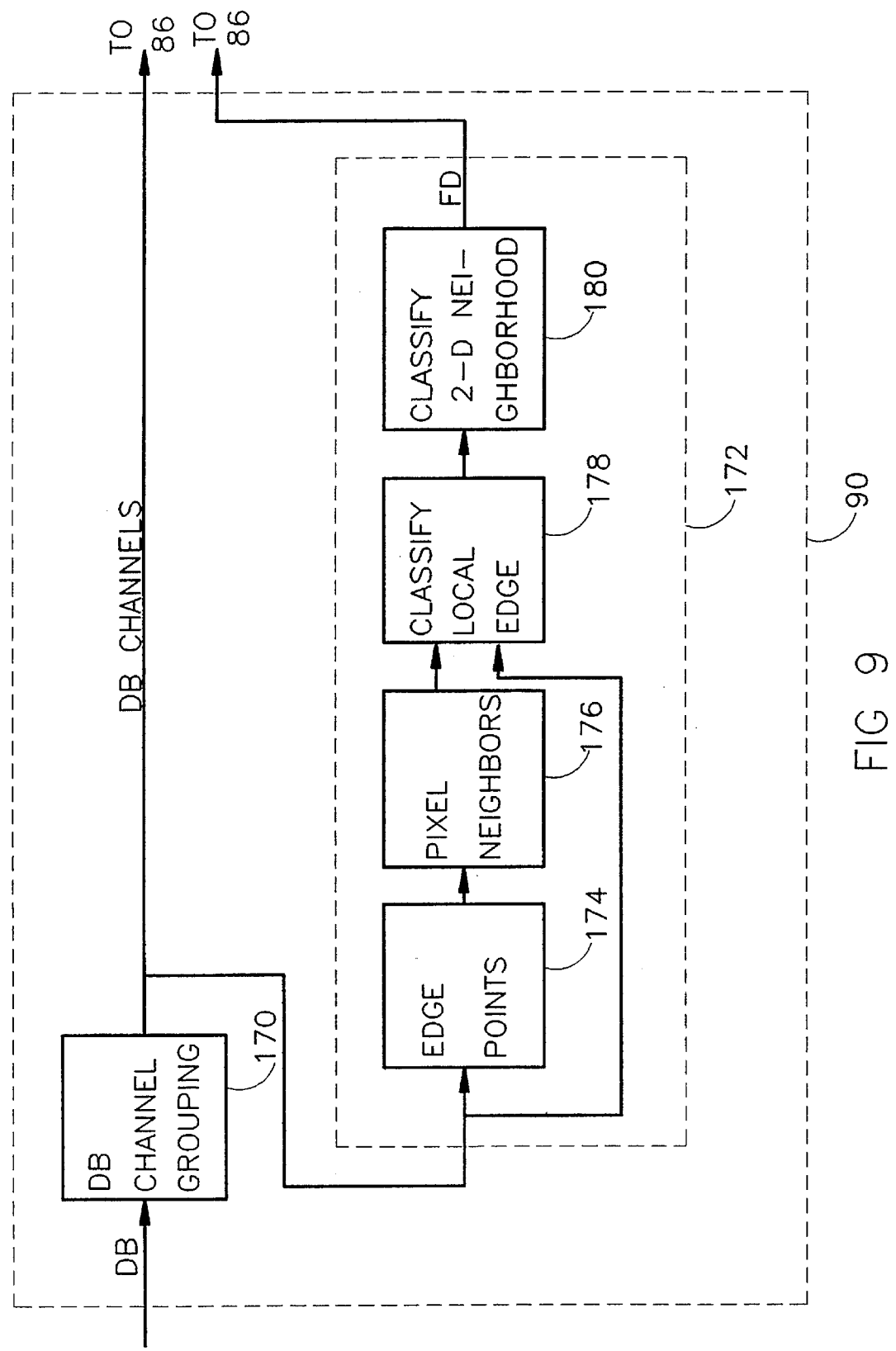
FIG. 9 is a simplified block diagram of a preferred embodiment of DB preprocessing unit 90 of FIG. 6.

Reference is now made to FIG. 9 which is a block diagram of a preferred embodiment of DB preprocessing unit 90. The input to DB preprocessing unit 90 is the DB stream, in which each WP is described by a 6×6 binary map. The DB preprocessing unit 90 preferably comprises a DB channels grouping unit 170, and a FD (feature detection) unit 172.

DB channels grouping unit 170 receives the binary DB datastream and provides 9 differently-offset streams of DB data in HP representation to the 9 modules included in defect detection subsystem 86, as explained in detail below. DB channels grouping unit 170 may include a plurality of associated tables, which implements a binary pixel count for each HP.

The FD computation unit 172 receives a single DB channel, comprising HP-represented DB data. FD computation unit 172 computes the 4 bit FD code described hereinabove which categorizes the local geometry in the data base.

Figure 10:
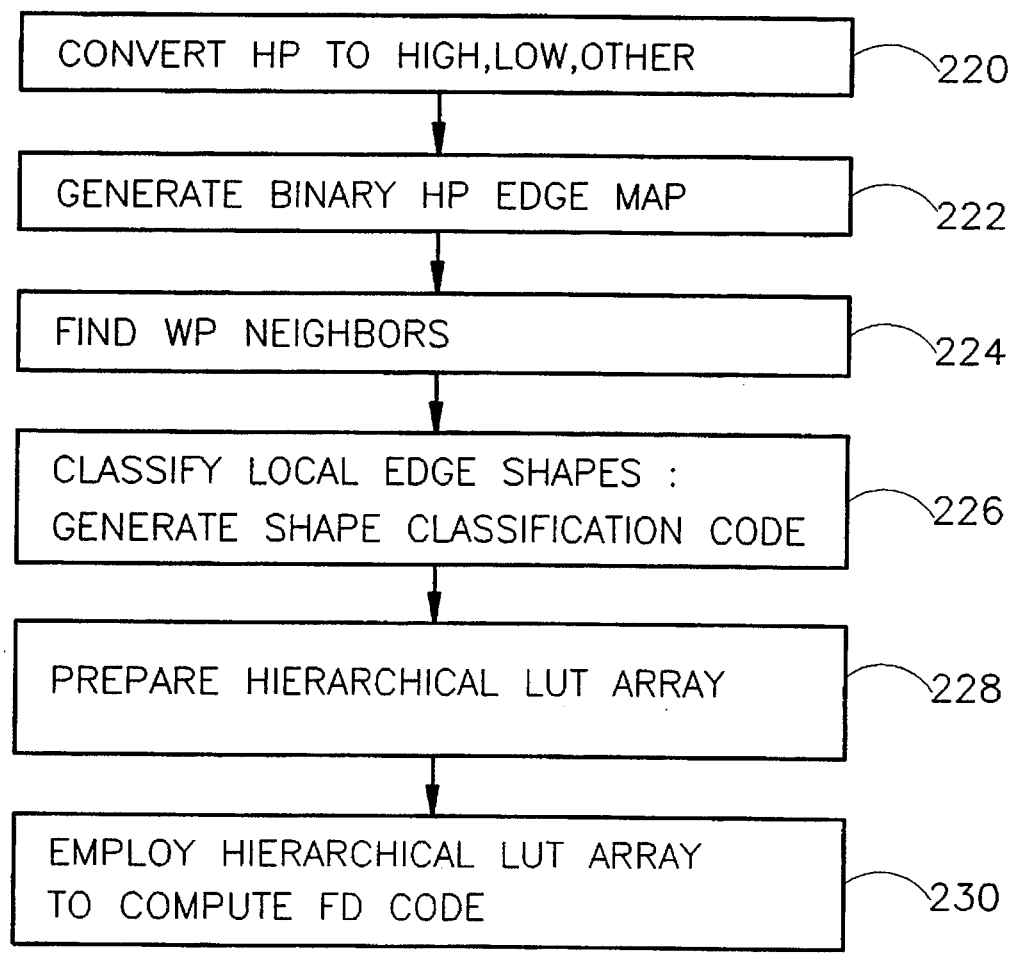
FIG. 10 is a simplified flowchart of a preferred method for computing a database local geometry code which may be performed by DB preprocessing unit 90 of FIG. 9.

A preferred method for computing a 4 bit code which is indicative of the local geometry of the data base is now described, with reference to the flowchart of FIG. 10. Steps 220 and 222; 224; 226; and 228 and 230 of the method of FIG. 10 are implemented by units 174, 176, 178 and 180, respectively, of FIG. 9.

The method of FIG. 10 preferably includes the following steps:

Steps 220 and 222:
A binary HP edge map is generated preferably by first converting received DB HP values into one of three categories: HIGH, LOW, OTHER. Steps 220 and 222 may be generally identical to steps 130 and 132 of the method of FIG. 8.

Step 224:
Employ the binary edge map in order to identify, for each edge-containing WP, two neighboring WP's in which the edge continues. Each neighbor is designated by a 4 bit code. 3 of the bits are employed to designate one of the eight neighbors of the edge-containing WP. The fourth bit indicates whether or not a neighbor exists.

Step 224 may be generally identical to step 136 of the method of FIG. 8.

Step 226:
For each edge-containing WP, employ the neighbor information computed in step 224 in order to generate a 4-WP pixel sequence comprising the edge-containing WP, its two neighbors and an additional neighbor of the second neighbor. The area of each of the four WP's in the sequence may be coded in 3 bits (total: 4×3=12 bits), and the relative positions of the 4 pixels in the sequence may be represented by 2 angles, each coded in 3 bits (total: 2×3=6 bits). The resulting 18-bit coding of the 4 WP sequence may be employed to address a table which provides a shape classification code of the edges included in the 4 WP's of the pixel sequence. In other words, the shape classification code of a particular 4 WP sequence is indicative of the local geometry or edge structure complexity of the image location which includes the 4 WP's of the pixel sequence.

One coding system for the shape classification code may include at least the following code values:

0: no classification. This code may be assigned to the sequence if the edge-containing WP has no neighbors.

1: edge

2: 90 degree corner

3: 135 degree corner

4: 45 degree corner

Alternatively, as many as 16 separate code values may be employed.

Steps 228 and 230:
For each individual WP, compute an FD code value characterizing a 3×3 WP window centered at the individual WP. This is done on the basis of the shape classification codes of each of the 9 pixels in the window, as computed in step 226. The FD code may be generated from the 9 shape classification codes using any suitable apparatus and method such as off-line construction of a suitable hierarchical LUT array (step 228).

Preferably, the FD code of an individual 3×3 WP window in the DB includes an indication of whether or not the 3×3 WP window includes at least one edge. The local defect detection process is preferably disabled for portions of the DB which contain no edges. The FD code also is indicative of the complexity of the local edge structure, which in turn determines the magnitude of local detection thresholds, as explained herein.

A preferred method and structure for implementing defect detection subsystem 86 of FIG. 6 is now described with reference to FIGS. 11, 16–18, and 21–24.

Figure 11:
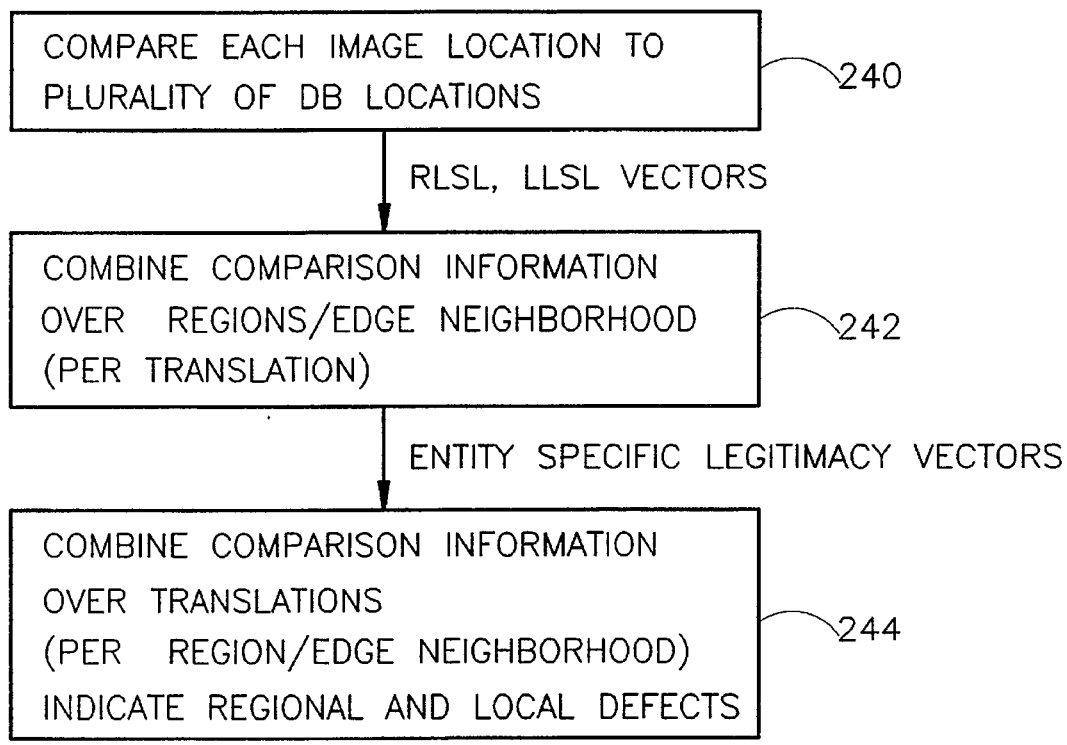
FIG. 11 is a simplified flow chart of a preferred defect detection method which may be performed by defect detection subsystem 86 of FIG. 6.

Specific reference is now made to FIG. 11 which is a generalized flowchart of a defect detection method useful in implementing defect detection subsystem 86 of FIG. 6.

The defect detection method of FIG. 11 interacts with the image stream on two separate levels, defining two separate units for comparison to the database stream. The unit of comparison at the top level is termed a comparison entity and the unit of comparison at the bottom level is termed an image location. The defect detection method of FIG. 11 employs two cooperating detection processes, termed the regional process and the local process, which differ as to the type of image entity (region or edge neighborhood, respectively) which is compared to the database. Both types of image entity comprise a plurality of image locations.

The method of FIG. 11 comprises three steps. In the first step, step 240, individual image locations are compared to corresponding individual locations in the database. For each image location, each database location defines an individual image-database translation. Step 240 is performed for each image location and for each translation of that image location.

In the second step of the method of FIG. 11, step 242, the per-image location and per-translation results of step 240 are combined, preferably by an AND function, over comparison entities. The output of step 242 is, therefore, specific to individual translations of individual comparison entities.

In the third step of the method of FIG. 11, step 244, the per-comparison entity and per-translation results of step 242 are combined, preferably by an OR function, over translations. The output of step 244 is specific to individual comparison entities and is indicative of defects in the individual comparison entities.

The various steps of the method of FIG. 11 are now described in detail.

Step 240: Compare image locations to database:

In step 240, each image location is compared to a plurality of locations of the database, corresponding to a predetermined plurality of translations of the image datastream. The comparison is performed as follows:

For each database location, a regional comparison value (RCV) and a local comparison value (LCV) is computed, using any suitable difference measure. The regional and local comparison values computed for each pair of image and database locations are compared to comparison thresholds.

According to a preferred embodiment of the present invention, the comparison thresholds for the regional and local processes, respectively, are not equal, and are therefore termed herein regional comparison thresholds and local comparison thresholds, respectively. The binary result of each comparison between a regional comparison value and a regional comparison threshold is termed herein a regional location-specific legitimacy value or a RLSLV. The binary result of each comparison between a local comparison value and a local comparison threshold is termed herein a local location-specific legitimacy value or a LLSLV.

For example, if the regional comparison value of a particular translation is less than the regional comparison threshold, the RLSLV of that translation may be defined as 1, and the translation is termed herein legitimate for the particular image location, as far as the regional inspection process is concerned. If the regional comparison value of the translation exceeds the regional comparison threshold, the RLSLV of the translation may be defined as 0 and the translation is termed herein illegitimate for the particular image location.

Each RLSLV and each LLSLV is specific to a particular pair of image and database locations, because each RLSLV and each LLSLV is specific to a particular image location and to a particular image-database translation. Also, as explained above, a plurality of database locations are compared to each image location. Therefore, a corresponding plurality of RLSLV's are defined for each image location, one per image-database translation. The plurality of RLSLV's defined for an individual image location defines a vector corresponding to that image location which is termed herein a regional location-specific legitimacy vector or RLSL vector. If 324 database locations are compared to each image location, the RLSL vector of each individual image location has 324 components.

Similarly, since a plurality of database locations are compared to each image location, a corresponding plurality of LLSLV's are defined for each image location, one per image-database translation. The plurality of LLSLV's defined for an individual image location defines a vector corresponding to that image location which is termed herein a local location-specific legitimacy vector or LLSL vector. If 324 database locations are compared to each image location, the LLSL vector of an individual image location has 324 components.

Step 242: Combine comparison information over regions/edge neighborhoods:

For each comparison entity (region or edge neighborhood), an entity-specific legitimacy vector is computed by combining the information obtained in step 240 for each of the image locations included in the individual comparison entity. Specifically, the regional and local location-specific legitimacy vectors of the image locations included in the individual region or edge neighborhood are ANDed componentwise in order to obtain the entity-specific legitimacy vector of the comparison entity. As explained above, the components of the regional and local location-specific legitimacy vectors are termed RLSLV's and LLSLV's, respectively. The result of ANDing all RLSLV's pertaining to a particular translation, over an individual region, is termed herein a regional entity-specific legitimacy value (RESLV). The result of ANDing all LLSLV's pertaining to a particular translation, over an individual edge neighborhood is termed herein a local entity-specific legitimacy value (LESLV).

An entity-specific legitimacy vector defined by a plurality of RESLV's all pertaining to a single region but corresponding to a plurality of translations is termed herein a region legitimacy vector or an RL-vector. An entity-specific legitimacy vector defined by a plurality of LESLV's all pertaining to a single edge neighborhood but corresponding to a plurality of translations is termed herein an edge-neighborhood legitimacy vector or an ENL-vector.

Step 244: Indicate defects by combining comparison information over translations for each region or edge neighborhood:

This step corresponds to steps II and III of conventional compensate-and-compare defect detection methods, as explained in the Background section of the specification. The entity-specific legitimacy vector of an individual comparison entity (region or edge neighborhood) is employed to determine whether a defect exists in the vicinity of the region or edge neighborhood. Typically, if the entity-specific legitimacy vector of an individual comparison entity indicates that no legitimate translation from image to database exists for that comparison entity, a defect indication is provided for that comparison entity. In other words, for each individual comparison entity, the translation-specific components of its entity-specific legitimacy vector are ORed to determine whether or not a defect exists in the comparison entity.

A computer listing of a software implementation of the method of FIG. 11 and batch files for activation thereof are appended hereto and referenced Appendix A. The software implementation of Appendix A is operative in either a local or a regional defect detection mode and employs a user-defined constant threshold for each of these modes. The computer listing of the method of FIG. 11 is written in C and the batch files are SUN UNIX Script files. The computer listings of Appendix A are operative on a suitable workstation such as a SPARC workstation, commercially available from SUN.

A preferred structure for defect detection subsystem 86 which implements the method of FIG. 11 is described below with reference to FIGS. 16–18 and 21–24.

The foregoing discussion relates generally to a plurality of search modes which may be employed by defect detection subsystem 86 and to a preferred hierarchical arrangement of defect detection subsystem 86. Subsequently, detailed reference is made to each of FIGS. 16–18 and 21–24 in order to describe each of the hierarchically arranged components of defect detection subsystem 86 in detail, in top-to-bottom order.

As described above the defect detection subsystem 86 is operative to compare a plurality of translations of a multiplicity of image portions with respect to a corresponding multiplicity of database portions. The plurality of translations or search grid inspected for each image portion is determined by the searcj mode employed by the detection system 80. Preferably, a plurality of search modes are provided such as first and second user-selectable search modes differing in the resolution of their search grids.

Figure 12:
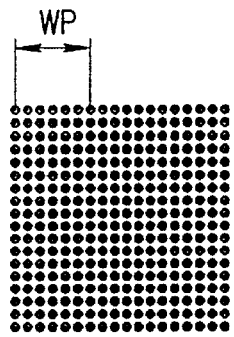
FIGS. 12 and 13 are conceptual illustrations of first and second search grids which may be employed by defect detection subsystem 86 of FIG. 6.
Figure 13:
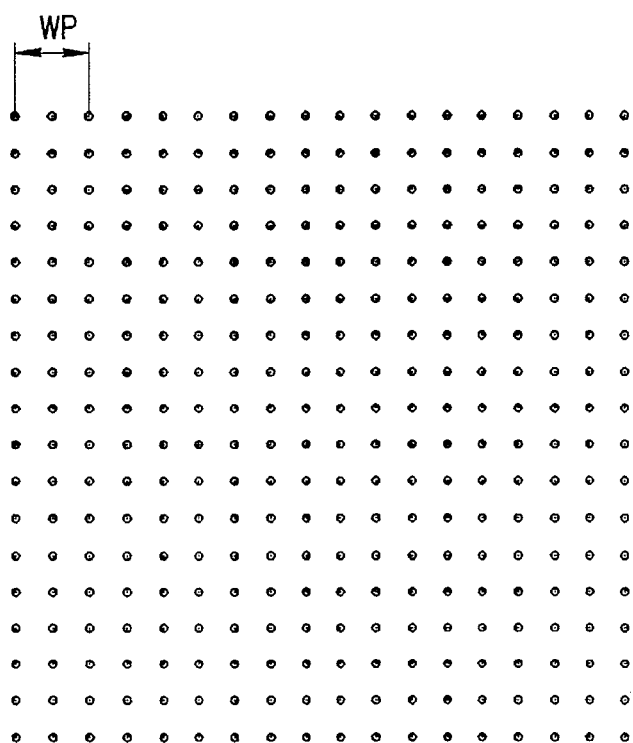

Reference is made briefly to FIGS. 12 and 13 which illustrate first and second search grids employed respectively by the first and second search modes. As shown, in the search mode of FIG. 12, a search grid resolution of ⅙ WP is used whereas in the search mode of FIG. 13, a search grid resolution of ½ WP is employed. Both search grids are, in the illustrated embodiment, 18 translations long and 18 translations wide. In each time unit, the detection subsystem 86 inspects, preferably in parallel, the legitimacy of 18×18= 324 translations in the search grid for a current region and a current edge neighborhood.

Figure 16:
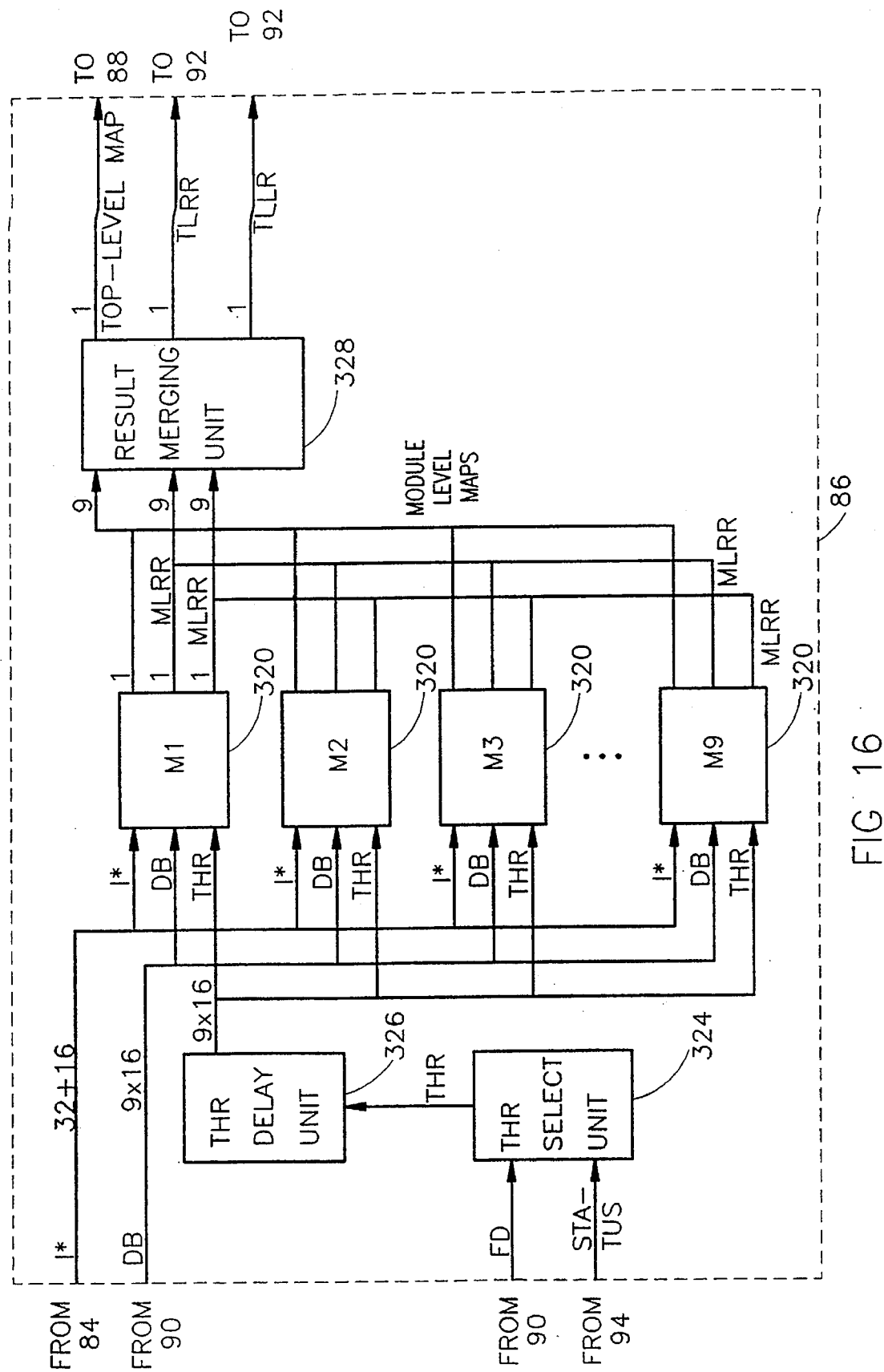
FIG. 16 is a simplified block diagram of a preferred embodiment of defect detection subsystem 86 of FIG. 6.
Figure 17:
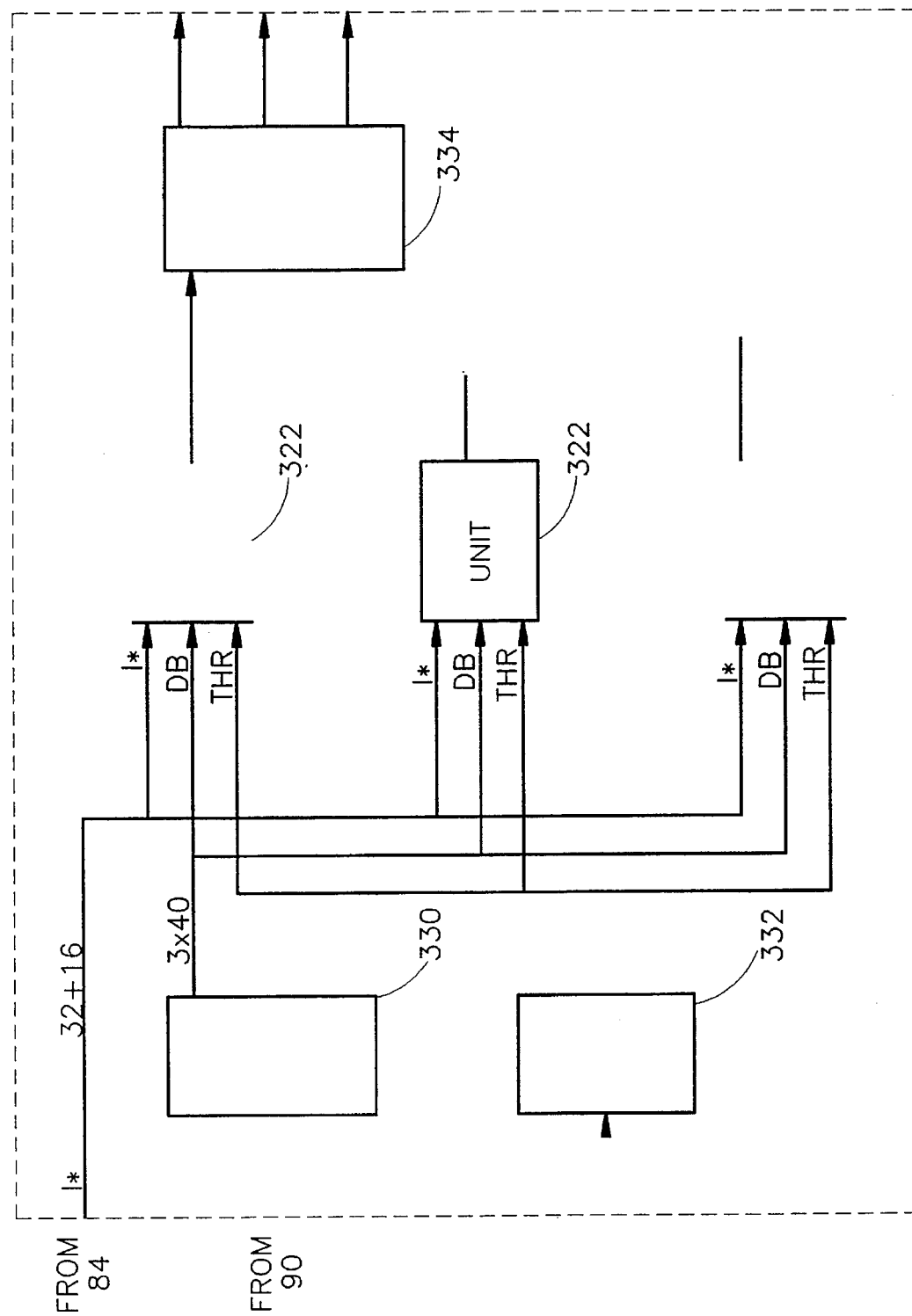
FIG. 17 is a simplified block diagram of a preferred embodiment of an individual defect detection module forming part of defect detection subsystem 86 of FIG. 16.

The detection subsystem 86 of FIG. 6 preferably is arranged hierarchically, as may be appreciated from a comparison of FIGS. 6, 16 and 17. As shown in FIG. 16, the detection subsystem comprises a plurality of detection modules 320, such as 9 detection modules 320. As shown in FIG. 17, which is a block diagram of a single detection module 320, each detection module 320 comprises a plurality of detection units 322 such as three detection units. In other words, in the illustrated embodiment, the detection subsystem 86 is arranged in three hierarchical levels.

Figure 14:
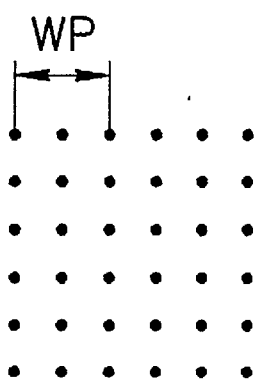
FIGS. 14 and 15 are conceptual illustrations of two search grids respectively employed in an individual detection module of FIG. 17 and in an individual detection unit of FIG. 18.
Figure 15:
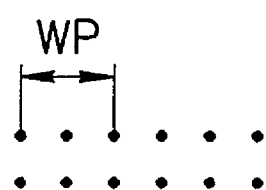

In the illustrated embodiment, the first level comprises the detection subsystem as a whole which is operative to inspect the 324 translations in the 18×18 search grid of the detection subsystem. The second level comprises 9 detection modules operating in parallel, each being operative to inspect 36 translations in parallel. The 36 translations are arranged on a 6×6 grid with a displacement of 1 HP between adjacent translations, as illustrated in FIG. 14. The third level comprises 27 detection units operating in parallel, each being operative to inspect 12 translations in parallel. The 12 translations are arranged on a 2×6 grid with a displacement of 1 HP between adjacent translations, as illustrated in FIG. 15, such that the three 2×6 grid inspected by the three detection units 322 included in a single detection module 320, form the 6×6 grid of the detection module 320.

The relative placement of the nine search grids employed respectively by the 9 detection modules 320 depends on the search mode. In the high resolution search mode of FIG. 12, the 9 search grids overlap and have a relative displacement of ⅙ WP, thereby to form the search grid of FIG. 12. In the low resolution search mode of FIG. 13, the 9 search grids do not overlap, but are rather placed side by side, thereby to form the search grid of FIG. 13.

A preferred hierarchical mode of operation according to which the detection subsystem 86 may operate in order to detect defects in current regions or edge neighborhoods, in accordance with steps 240, 242 and 244 of the defect detection method of FIG. 11, is now described.

Step 240 of FIG. 11 is performed at the unit level. In other words, step 240 is performed independently by each of the 27 detection units 322. In each unit of time, each detection unit 322 compares an individual image location to 12 database locations in parallel and computes a 12-component RLSL vector and a 12-component LLSL vector. Each vector is specific to an image location. Within each vector, each component is specific to a database location or image-database translation.

Step 242 of FIG. 11 is also performed at the unit level. In other words, step 242 is also performed independently by each of the 27 detection units 322. Each detection unit 322 performs a component-wise AND operation on the RLSL vectors accumulated for an entire region, thereby to obtain a 12-component RL vector, also termed herein a unit-level regional translation map. Each RL vector is specific to an individual region. Within each region-specific vector, each component is specific to an image-database translation.

Each detection unit 322 also performs a component-wise AND operation on the LLSL vectors accumulated for an entire region, thereby to obtain a 12-component ENL vector. Each ENL vector is specific to an individual edge-neighborhood. Within each edge neighborhood-specific vector, each component is specific to an image-database translation.

OR-step 244 is carried out in three stages, which are performed at the unit level, the module level and the subsystem level, respectively. The first stage of OR-step 244 is performed separately for each of the 27 detection units 322, like steps 240 and 242. Each unit-level result of the first stage of OR-step 244 pertains to 12 translations from among the 324 translations in the search grid of detection subsystem 86.

In the second stage of OR-step 244, the unit-level results of each three units forming a single module are merged, thereby to define 9 module-level results. Each module-level result of the second stage of OR-step 244 pertains to 36 translations from among the 324 translations in the search grid of detection subsystem 86. In the third stage of OR-step 244, the module-level results of all 9 modules within detection subsystem 86 are merged, thereby to define a single subsystem-level result which pertains to all 324 translations in the search grid of detection subsystem 86.

In the illustrated embodiment, each of the 27 unit-level results computed by the unit-level stage of step 244 of FIG. 11 includes the following 3 components:

a. A 12-bit unit-level regional translation map, also termed herein an RL vector, which comprises a sequence of the 12 RESLV's computed in step 242.

b. A binary unit-level regional result (ULRR) computed by ORing the 12 RESLV's computed in step 242. This result indicates whether or not at least one translation from among the 12 translations is legitimate for the current region.

c. A binary unit-level local result (ULLR) computed by ORing the 12 LESLV's computed in step 242. This result indicates whether or not at least one translation from among the 12 translations for which an individual unit is responsible is legitimate for the current edge neighborhood.

In the illustrated embodiment, each of the 9 module-level results computed by the module-level stage of step 244 of FIG. 11 includes the following 3 components:

a. A 36-bit module-level regional translation map, which comprises a concatenated sequence of the 3 unit-level legitimate regional translation map sequences computed in the unit-level stage of step 244.

b. A binary module-level regional result (MLRR) computed by ORing 3 unit-level regional results computed in the unit-level stage of step 244. This result indicates whether or not at least one translation from among the 36 translations for which an individual module is responsible is legitimate for the current region.

c. A binary module-level local result (MLLR) computed by ORing 3 unit-level local results computed in the unit-level stage of step 244. This result indicates whether or not at least one translation from among the 36 translations for which an individual module is responsible is legitimate for the current edge neighborhood.

In the illustrated embodiment, the detection subsystem-level result computed by the top-level stage of step 244 of FIG. 11 which forms the output of detection subsystem 86 includes the following 3 components:

a. A 324-bit top-level regional translation map, which comprises a concatenated sequence of the 9 module-level legitimate regional translation map sequences computed in the module-level stage of step 244.

b. A binary top-level regional result (TLRR) computed by ORing 9 module-level regional results computed in the module-level stage of step 244. This result indicates whether or not at least one translation from among the 324 translations in the search grid of defect detection subsystem 86 is legitimate for the current region. A value of '0' means that no legitimate translation has been found for the region, and therefore the current region contains a defect.

c. A binary top-level local result (TLLR) computed by ORing 9 module-level local results computed in the module-level stage of step 244. This result indicates whether or not at least one translation from among the 324 translations in the search grid of defect detection subsystem 86 is legitimate for the current edge neighborhood. A value of '0' means that no legitimate translation has been found for the edge neighborhood and therefore the current edge neighborhood contains a defect.

Components b and c of the output of defect detection subsystem 86 are provided to defect reporting unit 92 of FIG. 6. Component a is provided to alignment computation unit 88.

The components of defect detection subsystem 86 are now described with specific reference to FIG. 16.

As explained above with reference to FIG. 6, the defect detection subsystem 86 receives the following four input streams of data:

(a) image data from image shift unit 84 of FIG. 6;

(b) database data from database preprocessor 90 of FIG. 6, to which the image data is compared;

(c) FD data which categorizes the database geometry, also from database preprocessor 90 of FIG. 6; and (d) status data from control processor 94 of FIG. 6 which indicates, inter alia, the desired search mode. For example, the status data in the illustrated embodiment indicates whether the system is to operate in the high resolution search mode of FIG. 12 or the low-resolution, broad search area mode of FIG. 13.

As explained above, the detection subsystem of the present embodiment includes 9 detection modules 320 each of which operate in parallel to inspect 36 translations from among the 324-translation search grid of the present embodiment.

The image stream arrives directly at the detection modules 320 from image shift unit 84. Each individual portion of the image stream arrives at all 9 detection modules simultaneously. The image stream is 32 bits wide and comprises the following ts:

(a) a 16-bit stream representing a column of image data which is 4 HP's (2 pixels) wide, each HP being represented in 4 bits; and (b) 16 bits of edge data useful for the local comparison process described above, the edge data comprising E_POSITION data (8 bits) and E_NEIGHBORS data (8 bits), as defined above.

The database stream arrives directly at the detection modules 320 from database preprocessor 90. The database stream, in the illustrated embodiment, is 9×16 bits wide.

Each individual portion of the database stream arrives at the 9 detection modules at 9 respective times, which are all different. The relative offset between the data in the streams is determined by the search mode, as indicated by the status code.

For example, when the search mode of FIG. 12 is operative, the following shifts, given in WP, are employed for the 9 detection modules, respectively:

| | | |
|---|---|---|
| (0,0) | (0,1/6) | (0,2/6) |
| (1/6,0) | (1/6,1/6) | (1/6,2/6) |
| (2/6,0) | (2/6,1/6) | (2/6,2/6). |

When the search mode of FIG. 13 is operative, the following shifts, given in WP, are employed for the 9 detection modules, respectively:

| | | |
|---|---|---|
| (0,0) | (0,3) | (0,6) |
| (3,0) | (3,3) | (3,6) |
| (6,0) | (6,3) | (6,6). |

The first and second coordinates in each of the above ordered pair are the shift, in pixels, along a first axis along which the object to be inspected is scanned, and along a second axis perpendicular to the first axis, respectively.

The FD and status data streams are received by a threshold selecting unit 324 which provides each detection module 320 with an indication of comparison thresholds, termed herein a threshold data stream.

The threshold data stream is 9×16 bits wide in the illustrated embodiment and comprises the following components:

(a) an 8-bit regional threshold value; and (b) an 8-bit local threshold value.

Preferably, threshold selecting unit 324 comprises a table which stores regional and local threshold values and is addressed by the FD and status codes. As explained above, the FD code characterizes the complexity of local edge structure and is employed to select a local threshold value. The table of threshold selecting unit 324 may be constructed off-line by empirically comparing the results of regional and local detection on a selected representative set of images, using a variety of regional and local threshold levels, respectively.

According to a preferred embodiment, the table of threshold selection unit 324 may be dynamically modified by the user and/or by the system, via control processor 94 of FIG. 6.

The threshold data stream provided by threshold selecting unit 324 arrives at detection modules 320 via a threshold delay unit 326. The threshold delay unit 326 is operative to appropriately delay the local and regional thresholds, if necessary.

For example, if the search mode of FIG. 12 is employed, identical regional and local thresholds may be sent to all detection modules at each individual time, and no delay is introduced, because the distance between the database locations processed by the 9 detection modules at a given time is relatively small. Therefore, it is assumed that the local geometries of the 9 database locations processed at a given time are similar. However, if the search mode of FIG. 13 is employed, the local geometries of the 9 database locations processed at a given time are not assumed to be similar. In this case, the 3-pixel offset delay schedule described above as being used to delay the database stream, may be employed.

The detection modules 320 are operative to perform steps 240 and 242 of the defect detection method of FIG. 11, as described in detail above. The detection modules 320 are also operative to perform the module-level stage of step 244 of the defect detection method of FIG. 11. Specifically, as explained above, each module 320 is operative to combine the per-region and per-edge neighborhood results obtained for each of the 36 translations for which that module is responsible, into single per-region and per-edge neighborhood results. As described above, the output of module 320 includes a MLRR and a module-level regional translation map for each region inspected, and a MLLR for each edge neighborhood inspected.

The three output components of each of the 9 detection modules 320 are received by a result merging unit 328. Result merging unit 328 is operative to perform the top-level stage of step 244 of FIG. 11. In other words, result merging unit 328 merges the 9 module-level regional results, using an OR operation, to provide a top-level regional result (TLRR), described above, which indicates the existence of a defect in a current region. The TLRR is transmitted to defect reporting unit 92 of FIG. 6.

Result merging unit 328 is also operative to merge the 27 module-level local results, using an OR operation, to provide a top-level local result (TLLR), described above, which indicates the existence of a defect in a current edge neighborhood. The TLLR is transmitted to defect reporting unit 92 of FIG. 6.

Result merging unit 328 is also operative to merge the 27 module-level regional translation maps, using an OR operation, in order to provide a top-level regional translation map. The map is provided to alignment computation unit 88 of FIG. 6.

Reference is now made to FIG. 17 which is a block diagram of a preferred embodiment of an individual defect detection module 320. As explained above, each module 320 receives three streams of data: an I stream, a DB stream compared thereto in accordance with regional and local procedures described above and a threshold stream which determines regional and local comparison thresholds for the regional and local procedures respectively.

As explained above, the detection module 320 of the present embodiment includes 3 detection units 322 each of which operates in parallel to the others to inspect 12 translations from among the 36 translations for which the detection module 320 is responsible.

The image stream arrives directly at the detection units 322 from image shift unit 84. Each individual portion of the image stream arrives at all 3 detection units simultaneously.

The database stream comprises a 2.5 WP wide column. In other words, in each time unit, an array of 2×5 database HP is provided to each detection module 320. The database stream arrives at the detection modules 320 via a DB delay unit 330. DB delay unit 330 is operative to delay the DB streams for each of the 3 detection units such that the three detection units may simultaneously operate to inspect three respective distinct sets of 12 database locations each. The relative delay of the database stream between adjacent detection units 322 is two rows of HP's because, as may be appreciated by a comparison of FIG. 14 and FIG. 15, the relative displacement of portions of the reference image for which adjacent detection units are responsible is two rows of HP's.

The threshold datastream is received by a threshold delay unit 332 which is operative to simultaneously provide to each of the three detection units, a threshold stream suitable to the respective geometry of the distinct set of database locations for which that detection unit is responsible. The relative delay of the threshold stream between adjacent detection units 322 is two rows of HP's because, as may be appreciated by a comparison of FIG. 14 and FIG. 15, the relative displacement of portions of the reference image for which adjacent detection units are responsible is two rows of HP's.

The detection units 322 are operative to perform steps 240 and 242 of the defect detection method of FIG. 11, as described in detail above. The detection units 322 are also operative to perform the unit-level stage of step 244 of the defect detection method of FIG. 11. Specifically, as explained above, each unit 322 is operative to combine the per-region and per-edge neighborhood results obtained for each of the 12 translations for which that unit is responsible into a single per-region result and a single per-edge neighborhood result. As explained above, the output of the unit-level stage of step 244 performed by each unit 322 comprises a unit-level regional result, a unit-level local result and a unit-level regional translation map.

The three-component output of each of the 3 detection units 322 are received by a result merging unit 334. Result merging unit 334 is operative to merge the 3 unit-level regional results, using an OR operation, to provide a module-level regional result (MLRR), described above, which indicates the existence of a defect in a current region. The MLRR is transmitted to result merging unit 328 of FIG. 16.

Result merging unit 334 is also operative to merge the 3 unit-level local results, using an OR operation, to provide a module-level local result (MLLR), described above, which indicates the existence of a defect in a current edge neighborhood. The MLLR is transmitted to result merging unit 328 of FIG. 16.

Result merging unit 334 is also operative to merge the 3 unit-level regional translation maps, using an OR operation, in order to provide a module-level regional translation map. The map is provided to alignment computation unit 88 of FIG. 6 in concatenation with 8 other module-level regional translation maps provided by the remaining 8 modules 320.

Figure 18:
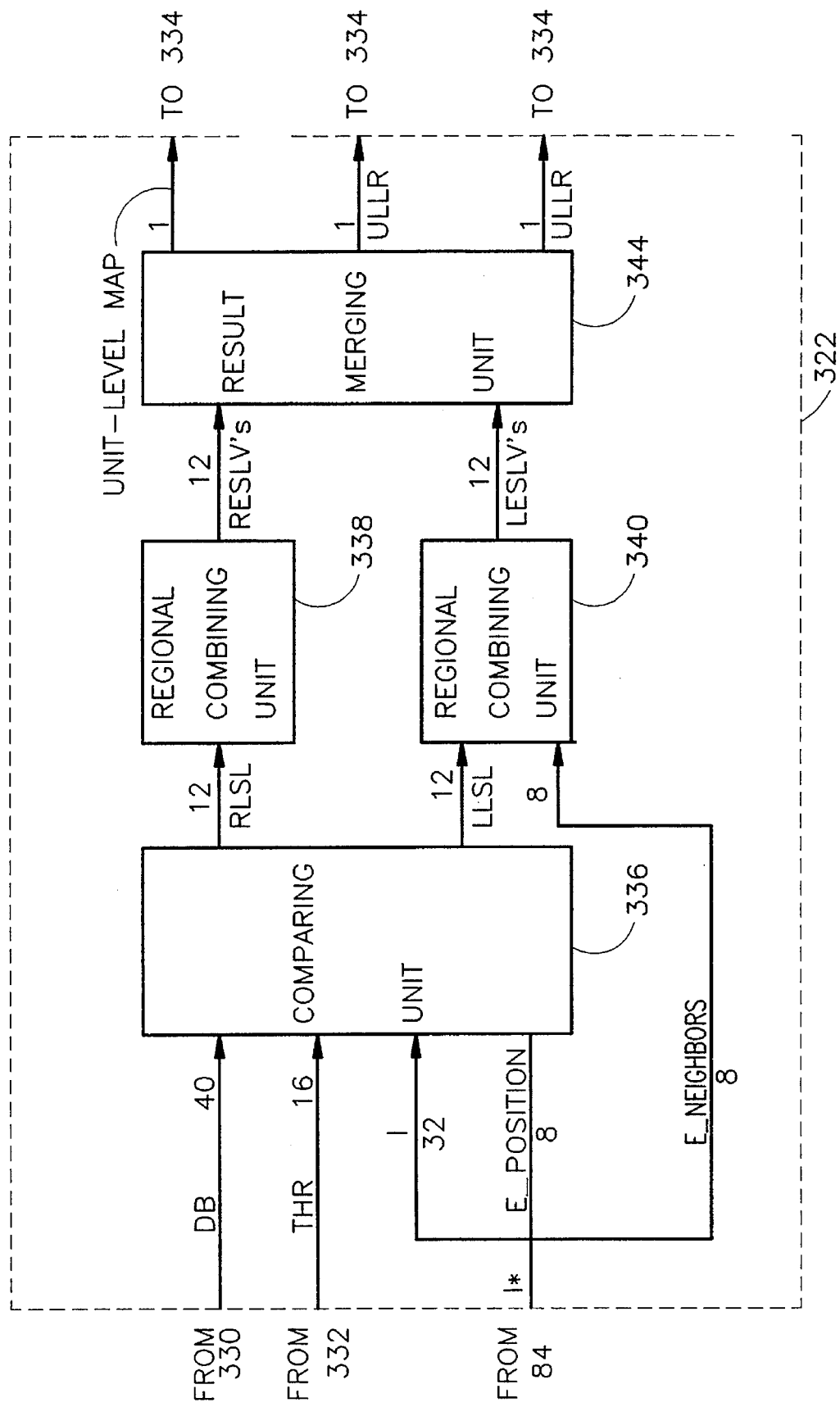
FIG. 18 is a simplified block diagram of a preferred embodiment of an individual defect detection unit forming part of the defect detection module of FIG. 17.

Reference is now made to FIG. 18 which illustrates an individual defect detection unit 322. As described above, in each time unit, each individual detection unit 322 inspects, in parallel, the legitimacy of 12 translations with respect to some current region and with respect to some current edge neighborhood.

Each detection unit 322 comprises a comparing unit 336 which receives the database stream from database delay unit 330 of FIG. 17, the image stream, including E_POSITION data, from image shift unit 84 of FIG. 6, and threshold stream data from threshold delay unit 332 of FIG. 17. Comparing unit 336 is operative to perform step 240 of FIG. 11 for 12 translations from among the 324 translations inspected by the defect detection subsystem 86 (FIG. 6) as a whole. Step 240 is performed in both regional and local modes. The output of comparing unit 336 from the regional and local modes preferably comprises 12 regional comparison values and 12 local comparison values, respectively, for each image location.

Preferred methods which may be employed by comparing unit 336 in order to perform step 240 of FIG. 11 in the regional and local modes are described below with reference to FIGS. 19 and 20, respectively.

The 12 regional comparison values for each image location are supplied to a regional combining unit 338 which combines the regional comparison values for all image locations within each image region in accordance with step 242 of the method of FIG. 11. The output of regional combining unit 338 comprises 12 regional entity-specific legitimacy values (RESLV's) for each of the respective 12 translations for which the individual detection unit 322 is responsible.

The 12 local comparison values for each 2×2 image location are supplied to a local combining unit 340 which combines the local comparison values for all 2×2 image locations within each edge neighborhood in the image in accordance with step 242 of the method of FIG. 11. The output of local combining unit 340 comprises 12 local entity-specific legitimacy values (LESLV's) for each of the respective 12 translations for which the individual detection unit 322 is responsible.

A result merging unit 344 is operative to receive the 12 RESLV's from regional combining unit 338 and the 12 LESLV's from local combining unit 340, and perform the unit-level stage of ORing step 244 of FIG. 11, thereby to obtain a unit-level regional result (ULRR), a unit-level local result (ULLR) and a unit-level legitimate regional translation map, as explained above.

The unit-level regional and local results are provided to result merging unit 334 of FIG. 17 which merges these results with other unit-level regional and local results, respectively, arriving from other detection units. The unit-level legitimate regional translation map is transmitted to result merging unit 334 over a 1-bit channel.

The various components of FIG. 18 are now described in detail with reference to FIGS. 19–24. First, preferred regional and local methods useful in implementing comparing unit 336 are described with reference to FIGS. 19 and 20, respectively. A preferred structure for comparing unit 336 which implements the methods of FIGS. 19 and 20 is then described with reference to FIGS. 21–23. Finally, units 338 and 340 of FIG. 18 are described with reference to FIGS. 24 and 26 respectively.

Figure 19:
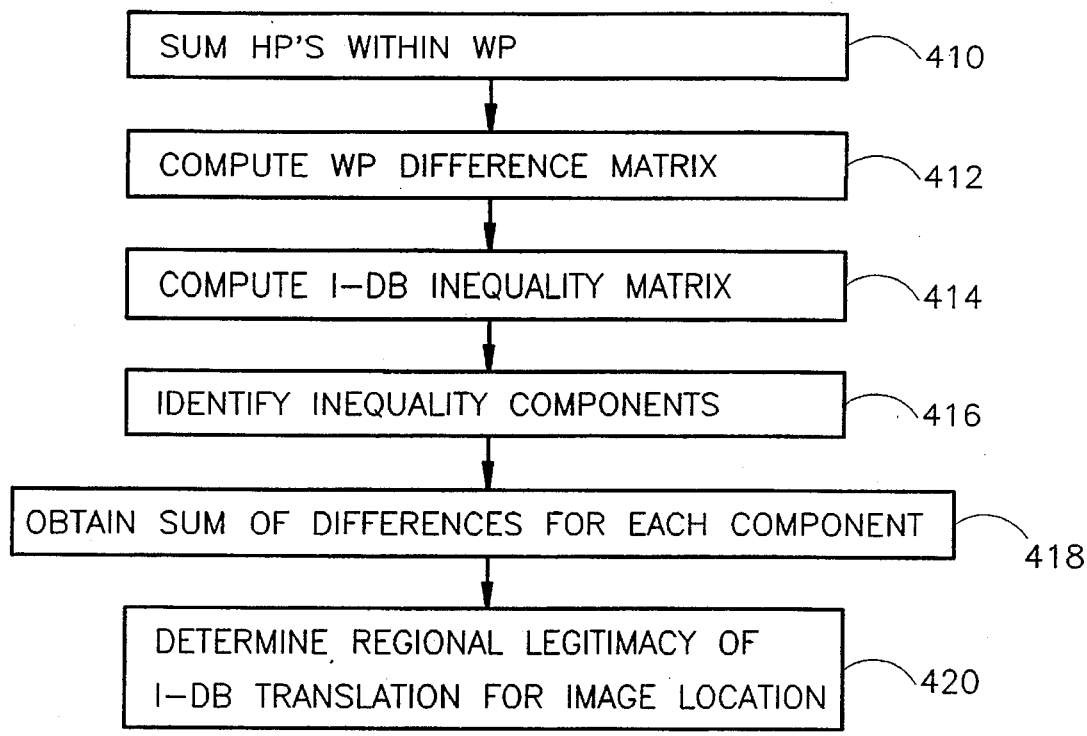
FIG. 19 is a simplified flow chart illustrating a preferred method which may be employed by comparing unit 336 of FIG. 18 in order to implement step 240 of the method of FIG. 11 in the course of a regional detection process.

Reference is now made specifically to FIG. 19 which illustrates a preferred method, suitable for the regional detection process, which may be employed by comparing unit 336 of FIG. 18 in order to implement step 240 of FIG. 11. In the method of FIG. 19, an individual image location is compared to an individual database location and a binary regional location-specific legitimacy value (RLSLV) is computed. The RLSLV is indicative of the legitimacy of a translation for translating the individual image location to the individual database location.

In order to simplify understanding, the method will be explained with reference to the following sample image and DB locations, represented in half-pixels.

Image location (16 half-pixels):

```
15 15   15 15
 0  4    7  7

0  0    0  0
 0  0    0  0
```

Database location (16 half-pixels):

```
5 5   5 5
0 0   0 0

0 0   0 0
8 8   8 8
```

Step 410: Sum HP's within each WP

1. The sum of the four half-pixels within each pixel of the image location and each pixel of the database location is computed. The resulting 2×2 sum image and database matrices for the above example are as follows:

```
Image:     34  44
            0   0

Database:  10  10
           16  16
```

Step 412: Compute pixel difference matrix

The absolute values of the differences between corresponding elements in the sum matrices computed in step 410 are now computed. In the present example, the pixel difference matrix is as follows:

```
24  34
16  16
```

Step 414: Compute inequality matrix:

Each half-pixel in the image location is compared to the corresponding half-pixel in the database location, thereby to define a 4×4 inequality flag matrix comprising 16 binary values indicative of inequality/equality, here represented as 1 and 0 respectively, of corresponding half-pixels.

The inequality matrix of the above pair of locations is as follows:

```
1 1   1 1
0 1   1 1

0 0   0 0
1 1   1 1
```

Step 416: Identify inequality components

Four components are defined which respectively correspond to the four WP's in the image location. The four WP's are termed A, B, C and D in the present discussion, where pixels A, B, C and D are arranged as follows:

A B
C D

Component A is empty if pixel A does not include any 1's. If pixel A includes any 1's, the 1's in pixel A define a sequence of connected 1's, also termed an inequality sequence. In the present example, an 8-connectedness criterion is employed, so the inequality sequence defined by pixel A extends through pixel B. Component A is the set of all pixels which include part of the inequality sequence defined by pixel A. Therefore, in the present example, component A comprises pixels A and B.

Component B is empty unless pixel B includes 1's which are not included in the inequality sequence of pixel A. If component B is not empty, pixel B defines an inequality sequence and component B is the set of all pixels which include part of the inequality sequence defined by pixel B. In the present example, component B is empty because the only 1's in pixel B are part of the inequality sequence of pixel A.

Component C is empty unless pixel C includes 1's which are not included in the inequality sequences of pixels A and B, if any. If component C is not empty, pixel C defines an inequality sequence and component C is the set of all pixels which include part of the inequality sequence defined by pixel C. In the present example, component C is not empty because both 1's in pixel C are not part of the inequality sequence of pixel A. Therefore, component C comprises pixels C and D.

Component D is empty unless pixel D includes 1's which are not included in the inequality sequences of pixels A, B and C, if any. If component D is not empty, pixel D defines an inequality sequence and component D is the set of all pixels which include part of the inequality sequence defined by pixel D. Component D never includes more than a single pixel, pixel D, because pixels A, B and C are always included in components A, B or C and the components are a partition of the set of pixels A, B, C and D. In the present example, component D is empty because the only 1's in pixel D are part of the inequality sequence of pixel C.

Step 418: Obtain sum of difference for each component

For each of Components A–D, the values of the pixel difference matrix corresponding to the pixels within that component, are summed, thereby to obtain four values SumA, SumB, SumC and SumD. Each value indicates the sum of the differences between image and database in a particular component.

In the present example,

SumA=58; SumB=0; SumC=32; SumD=0.

Step 420: Determine legitimacy of image-database translation

The four values SumA, . . . , SumD are compared to a regional comparison threshold which is preferably specific to the location in the database to which the image location is presently being compared. If each of the four is less than the regional comparison threshold, the RLSLV is 1, indicating that the particular translation of the particular image location within the image is legitimate in the regional detection process. If any of the four values exceeds the regional comparison threshold, the RLSLV is 0, indicating illegitimacy of the particular translation for the particular image location in the regional detection process.

In the present example, if a threshold value of 50 is used, the difference value for component_A, 58, exceeds the threshold, and hence the legitimacy value accepted is 0.

Figure 20:
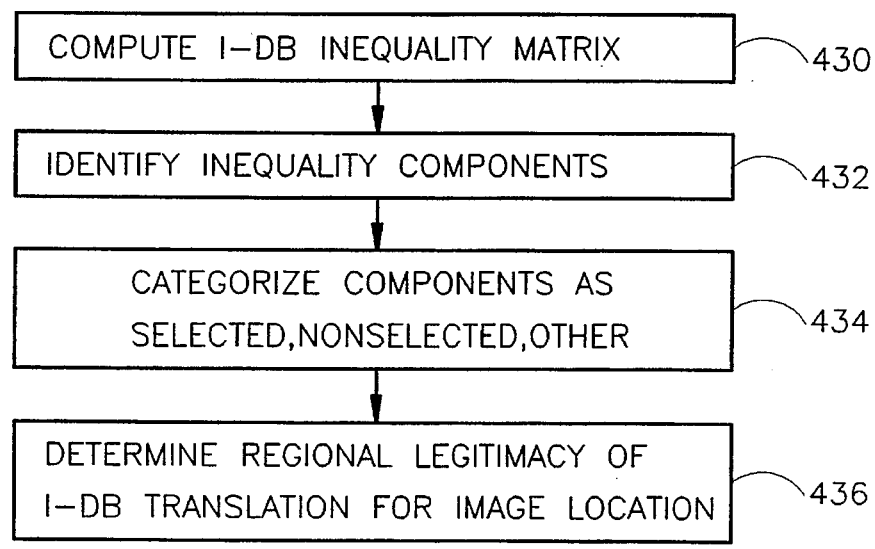
FIG. 20 is a simplified flow chart illustrating a preferred method which may be employed by comparing unit 336 of FIG. 18 in order to implement step 240 of the method of FIG. 11 in the course of a local detection process.

Reference is now made to FIG. 20 which illustrates a preferred method, suitable for the local detection process, which may be employed by comparing unit 336 of FIG. 18 in order to implement step 240 of FIG. 11. In the method of FIG. 20, an individual image location is compared to an individual database location and a binary local location-specific legitimacy value (LLSLV) is computed. The LLSLV is indicative of the legitimacy of a translation for translating the individual image location to the individual database location.

Steps 430 and 432 of the local legitimacy value computation method of FIG. 20 may be identical to steps 414 and 416 respectively of the regional process legitimacy value computation method of FIG. 19. These steps may be performed only once and the results may be utilized for computation of both the RLSLV, in accordance with steps 418–420 of the method of FIG. 19, and the LLSLV, in accordance with steps 434 and 436 in the method of FIG. 20.

Steps 434 and 436 of the local process legitimacy value computation method of FIG. 20 may be as follows:

Step 434: Categorize components as selected, non-selected, other:

Categorization of each component A, B, C and D as either selected, non-selected or other is determined in accordance with the E_POSITION values provided for each image location. A component is defined as selected if it includes a selected pixel and includes no non-selected pixels. In other words, a selected component contains a portion of the selected edge and does not contain any portion of any other edge.

For example, if the E_POSITION data for the four WP's of an individual image location is:

| selected | selected |
|----------|----------|
| other    | other    | then component_A is a selected component.

Step 436: Determine legitimacy of I-DB translation:

The selected/nonselected status of components A–D is employed to determine the LLSLV which indicates the legitimacy of the I-DB translation for the local detection process.

Specifically, if none of the components A, B, C and D are selected, the LLSLV is 1. If at least one of components A, B, C and D is selected, the selected ones from among the four values SumA, . . . , SumD are compared to a local comparison threshold which is preferably specific to the location in the database to which the image location is presently being compared.

If each of the selected values from among the four values is less than the local comparison threshold, then the LLSLV is 1, indicating legitimacy of the translation. If any of the selected values from among the four values exceeds the local comparison threshold, the LLSLV is 0, indicating illegitimacy of the translation.

Using the example previously employed with reference to FIG. 19, if the local threshold value is 34 and SUM_A=58, the LLSLV is 0.

A preferred structure for comparing unit 336 including apparatus for implementing the above-described methods of FIGS. 19 and 20 is now described with reference to FIGS. 21–23.

Figure 21:
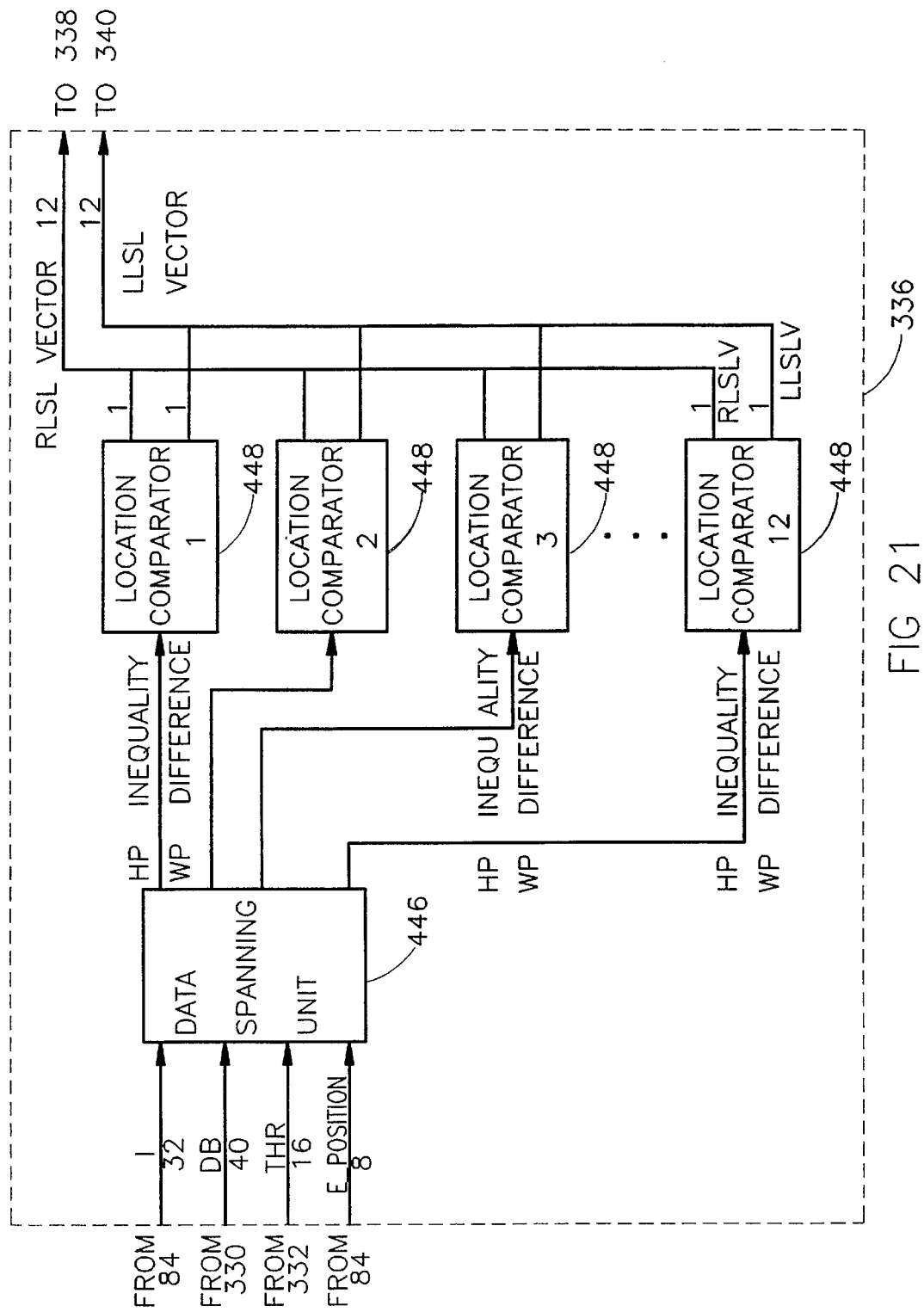
FIG. 21 is a simplified block diagram of a preferred embodiment of comparing unit 336 forming part of the detection unit of FIG. 18.

Reference is now made specifically to FIG. 21 which is a block diagram of a preferred structure for comparing unit 336 of FIG. 18 which is suitable for implementing the regional and local detection methods described above with reference to FIGS. 19 and 20 respectively. As described above, comparing unit 336 is operative to perform step 240 of FIG. 11, which step is described in further detail in FIGS. 19 and 20, and which step comprises the process of comparing an image location to 12 locations in the database. The output of the comparing step performed by comparing unit 336 comprises 12 regional comparison values and 12 local comparison values.

As seen in FIG. 21, comparing unit 336 preferably comprises a data spanning unit 446 interfacing an array of location comparators 448. The number of location comparators 448 corresponds to the 12 translations for which the detection unit 322 (FIG. 18) of which comparing unit 336 is a part, is responsible. Data spanning unit 446 is operative to perform steps 410, 412 and 414 of the method of FIG. 19, and step 430 of FIG. 20.

The array of location comparators 448 is operative to perform the remaining steps of the methods of FIGS. 19 and 20, namely steps 416, 418 and 420 of the method of FIG. 19, and steps 432, 434 and 436 of the method of FIG. 20. Data spanning unit 446 and location comparators 448 are now described in detail with reference to FIGS. 22 and 23, respectively.

Figure 22:
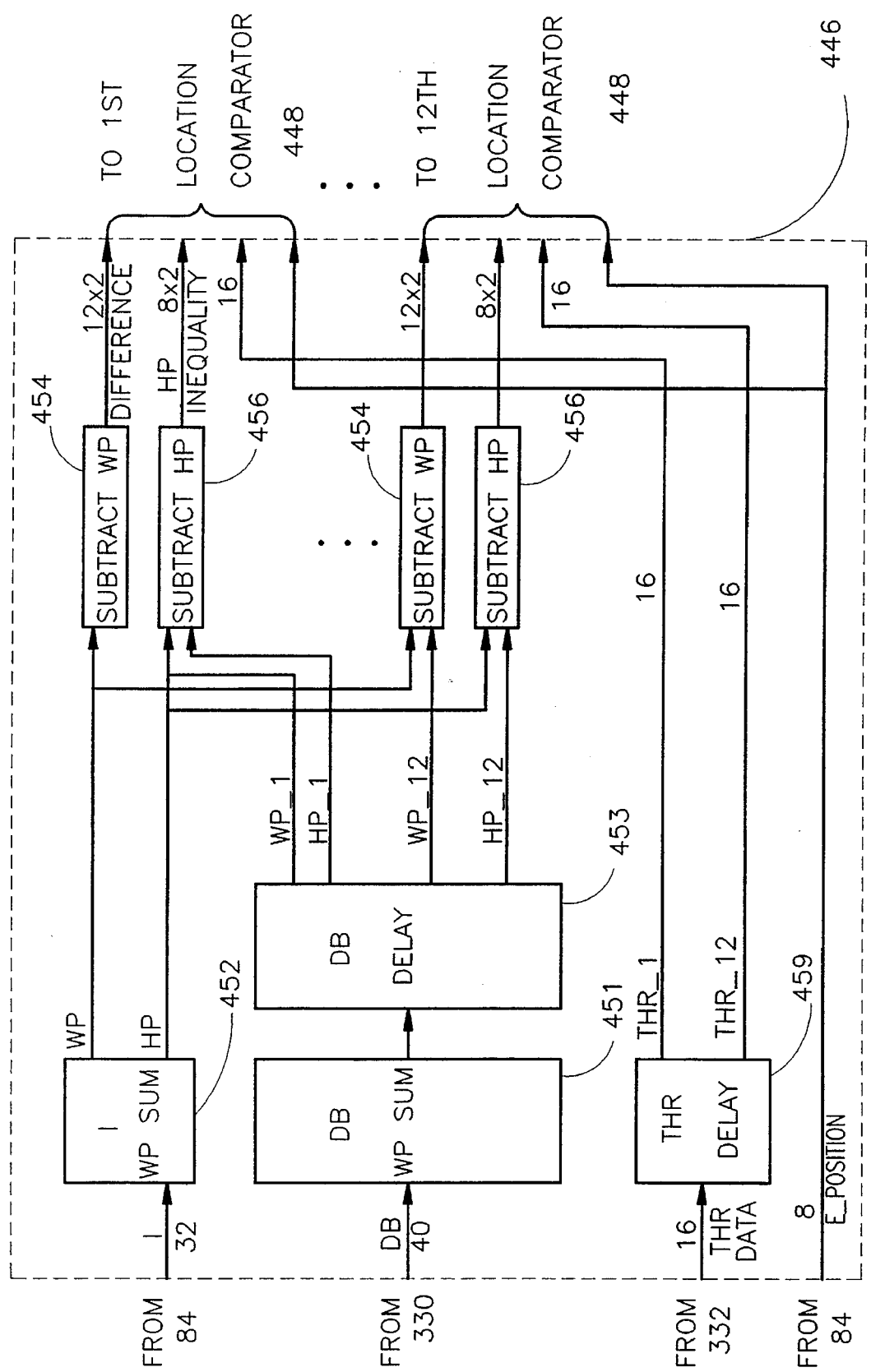
FIG. 22 is a simplified block diagram of a preferred embodiment of a data spanning unit forming part of the comparing unit of FIG. 21.

Reference is made specifically to FIG. 22 which is a block diagram of a preferred embodiment of data spanning unit 446. As explained above, data spanning unit 446 implements steps 410, 412 and 414 of the method of FIG. 19, for each of 12 image—database location pairs. Data spanning unit 446 also implements step 430 of the method of FIG. 20, because step 430 of FIG. 20 is identical to step 414 of FIG. 19.

The data spanning unit 446 preferably includes an image WP summing unit 452 which implements step 410 for the image channel, database WP summing and delay units 451 and 453 respectively which implement step 410 for the database channel, an array of 12 WP subtraction units 454 which implements step 412 of FIG. 19, and an array of 12 HP comparing units 456 which implements step 414 of FIG. 19 which is identical to step 430 of FIG. 20. Only two of WP subtraction units 454 and only two of HP comparing units 456 are shown in FIG. 22.

The components of data spanning unit 446 are now described in detail:

The image WP summing unit 452 receives the HP image datastream from image shift unit 84 and sums each group of 4 HP's arriving therefrom. In other words, summing unit 452 provides a WP channel by summing each 4 image HP's into a single image WP (step 410 of FIG. 19 for the image channel).

The database WP summing unit 451 receives the HP database stream from DB delay unit 330 and sums each group of 4 database HP's arriving therefrom into a single database WP (step 410 of FIG. 19 for the database channel). Database WP delay unit 453 is operative to delay the summed data so to create 12 WP channels having the following relative shifts:

(0, 0)   (0, 0.5)   (0, 1)   (0, 1.5)   (0, 2)   (0, 2.5)
(0.5, 0) (0.5, 0.5) (0.5, 1) (0.5, 1.5) (0.5, 2) (0.5, 2.5).

The relative shifts correspond to the relative locations of the 12 translations for which the individual data spanning unit 446 is responsible and which are best seen in FIG. 15.

Each WP subtraction unit 454 performs step 412 of the method of FIG. 19 for a single image location and a single database location. Specifically, each individual one of the 12 WP subtraction units 454 receives the WP output channel of summing unit 452, which carries the sum matrix for the image location, and a corresponding one of the 12 WP output channels of delay unit 453, which carries the sum matrix for the database location. The individual subtraction unit 454 computes the absolute differences between corresponding elements in the image and database sum matrices. The absolute differences computed by each individual one of WP subtraction units 454 are provided to a corresponding one of location comparators 448 of FIG. 21.

Each HP comparing unit 456 performs step 414 of the method of FIG. 19 for a single image location and a single database location. Specifically, each individual one of the 12 HP comparing units 456 receives the HP output channel of summing unit 452 and a corresponding one of the 12 HP output channels of delay unit 453. The individual HP comparing unit 456 computes the equality/inequality between corresponding HP's in the image and database streams. The equality/inequality values computed by each individual one of HP comparing units 456 are provided to a corresponding one of location comparators 448 of FIG. 21.

In summary, the data spanning unit 446 of FIG. 22 computes 12 sets of output data, corresponding to the 12 I-DB translations for which the data spanning unit 446 is responsible. The 12 sets of output data are provided to respective ones of the 12 location comparators 448 of FIG. 21. Each of the 12 sets of output data comprises the following data items:

(a) The absolute values of the differences between corresponding ones of the 4 WP sums in the image and database locations;

(b) A 4×4 inequality flag matrix comprising 16 binary values indicative of inequality/equality of corresponding ones of the 16 HP's in image and DB locations; and (c) Regional and local comparison thresholds.

Data spanning unit 446 also comprises a threshold delay unit 459. Threshold delay unit 459 is operative to introduce delay in the threshold channel received from threshold delay unit 332, so as to provide a suitably delayed database comparison threshold to each of the 12 location comparators 448 of FIG. 21, using the same delay schedule as delay unit 453, in order to take into account the fact that 12 different database locations are simultaneously processed by the array of 12 location comparators 448.

It will be appreciated by persons skilled in the art that, in the illustrated embodiment, the regional and local comparison thresholds employed to determine whether or not the I and DB streams are discrepant are not uniform as inspection of the image and database proceeds but rather vary as a function of the local database geometry as indicated by the FD code. It is appreciated that, alternatively or in addition, the thresholds may vary as a function of the local image geometry. It is further appreciated that, if the thresholds do not vary as a function of local database geometry, threshold delay units 459 of FIG. 22, 332 of FIG. 17 and 326 of FIG. 16 may be eliminated. According to yet another alternative, the regional threshold and local threshold may each be assigned constant values which do not vary as a function of either database or image geometry, in which case threshold selection unit 324 of FIG. 16 may also be eliminated.

Figure 23:
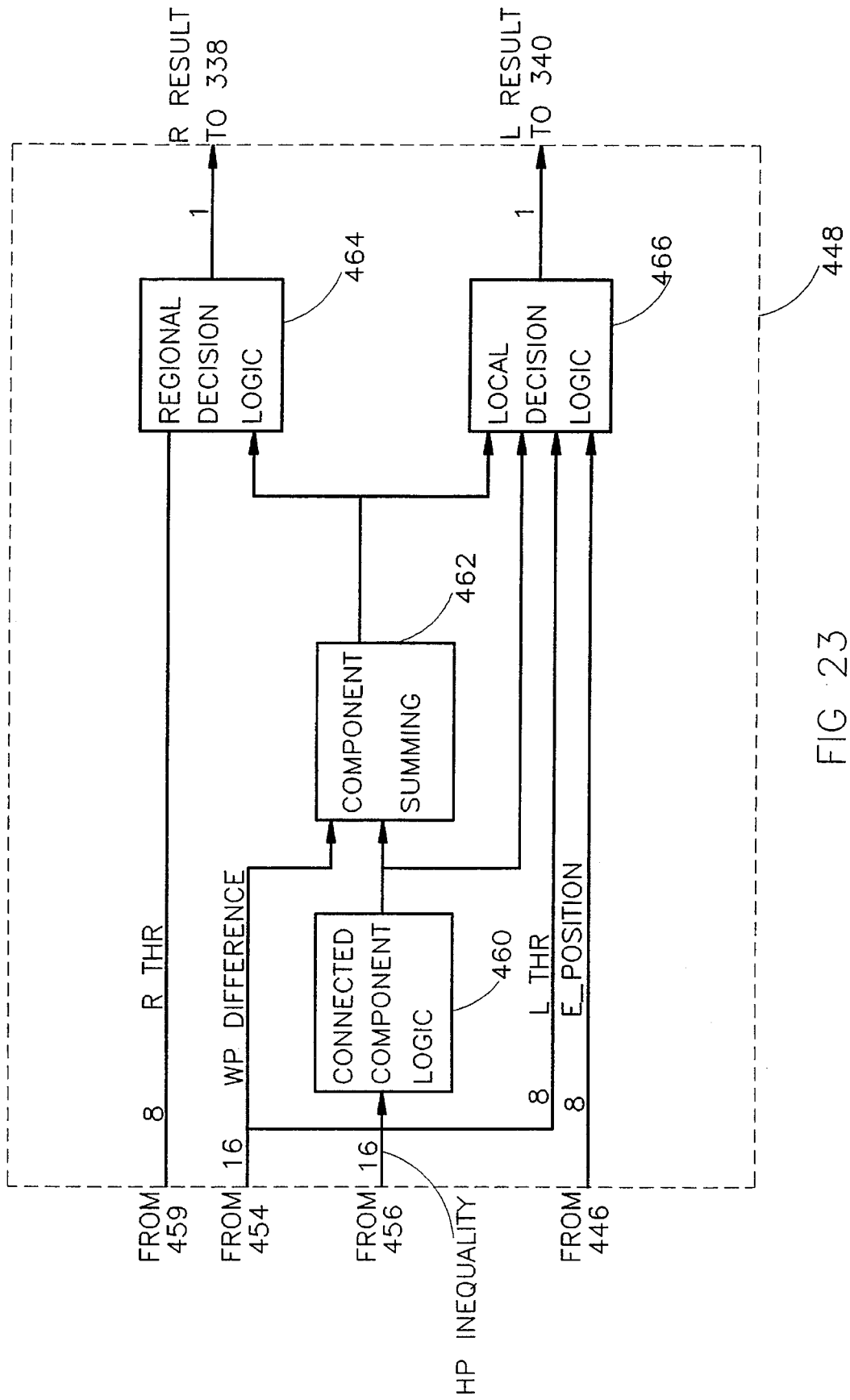
FIG. 23 is a simplified block diagram of a preferred embodiment of a location comparator unit forming part of the comparing unit of FIG. 21.

Reference is now made to FIG. 23 which is a block diagram of a preferred embodiment of an individual image location comparator unit 448. The image location comparator unit 448 preferably comprises a connected component logic unit 460, a component summing unit 462 and regional (R) and local (L) decision logic units 464 and 466 respectively. Connected components logic unit 460 receives the HP inequality data from HP comparing unit 456 of FIG. 22 and implements step 416 of FIG. 19 by identifying inequality components. Connected components logic 460 also implements step 432 of FIG. 20 which is identical to step 416 of FIG. 19. Component summing unit 462 receives the WP difference matrix computed by WP subtraction unit 454 of FIG. 22 and implements step 418 of FIG. 19 by summing the differences over components. Regional decision logic unit 464 receives the per-component difference sums from component summing unit 462 and implements step 420 of FIG. 19 by comparing each component difference sum to a threshold. Local decision logic unit 466 implements steps 434 and 436 of FIG. 20.

A detailed description of the structure of each of the components of image location comparator 448 and the relationship therebetween appears in Appendix B. Appendix B employs VHDL, which is a hardware description language complying with IEEE standard 1076-1987, recognized as an American National Standard by the ANSI.

Figure 24A:
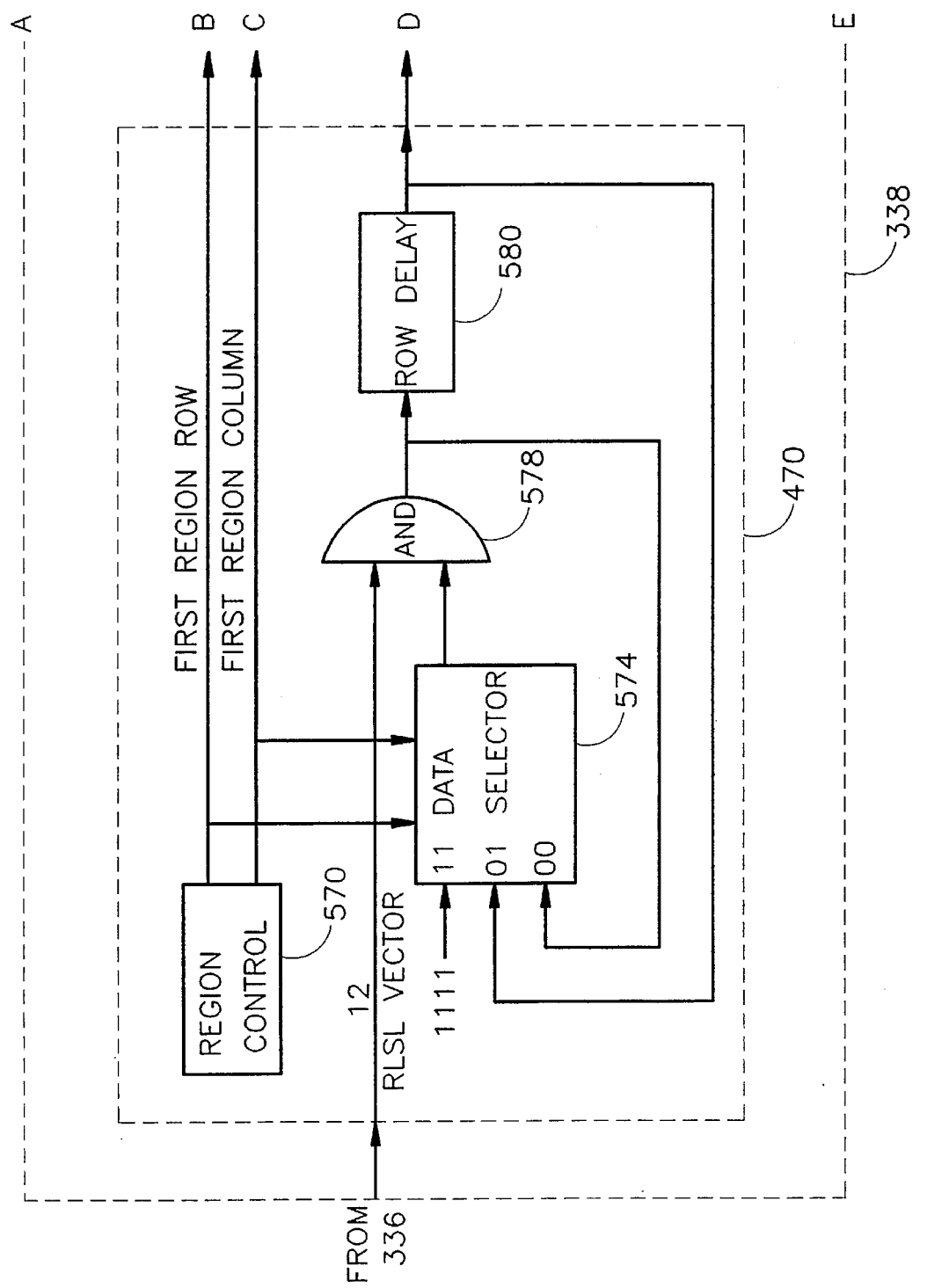
FIGS. 24A and 24B, taken together, are a simplified block diagram of a preferred embodiment of a regional combining unit forming part of the detection unit of FIG. 18.
Figure 24B:
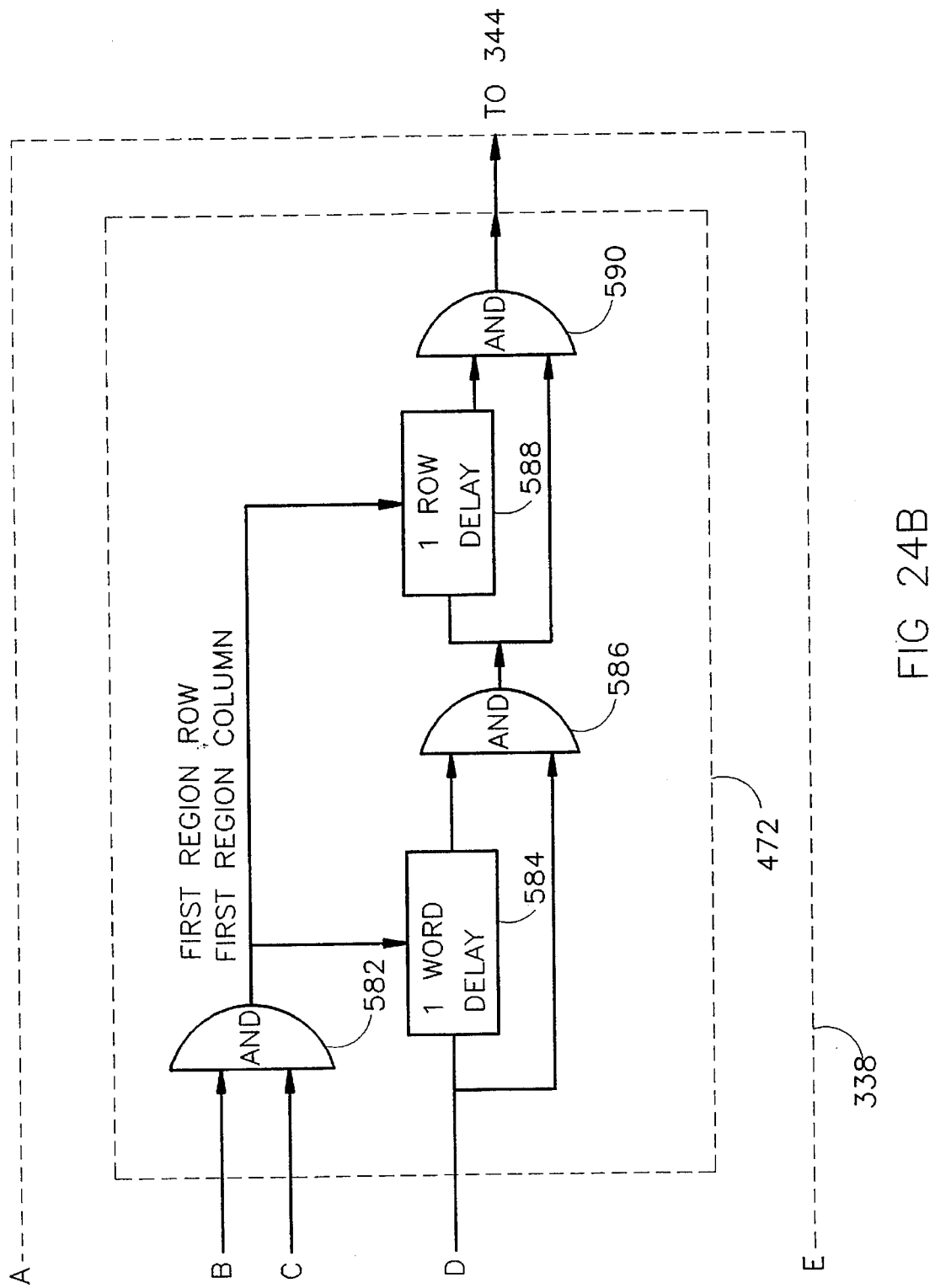

Reference is now made to FIGS. 24A & 24B, which taken together form a block diagram of a preferred embodiment of regional combining unit 338 of FIG. 18. Regional combining unit 338 implements step 242 of FIG. 11 for the regional process. In other words, regional combining unit 338 is operative to combine per-translation comparison information over regions.

The regional combining process performed by regional combining unit 338 preferably employs a partition of the image I into a plurality of subregions. As explained above, a plurality of regions each comprising a multiplicity of image locations are defined to cover the image. In the illustrated embodiment, the distance between centers of adjacent regions is 0.5 region lengths along one axis and 0.5 region widths along the other axis. The plurality of subregions may be defined by partitioning each region into four non-overlapping subregions such that the length of each subregion is 0.5 region lengths and the width of each subregion is 0.5 region widths.

Figure 25:
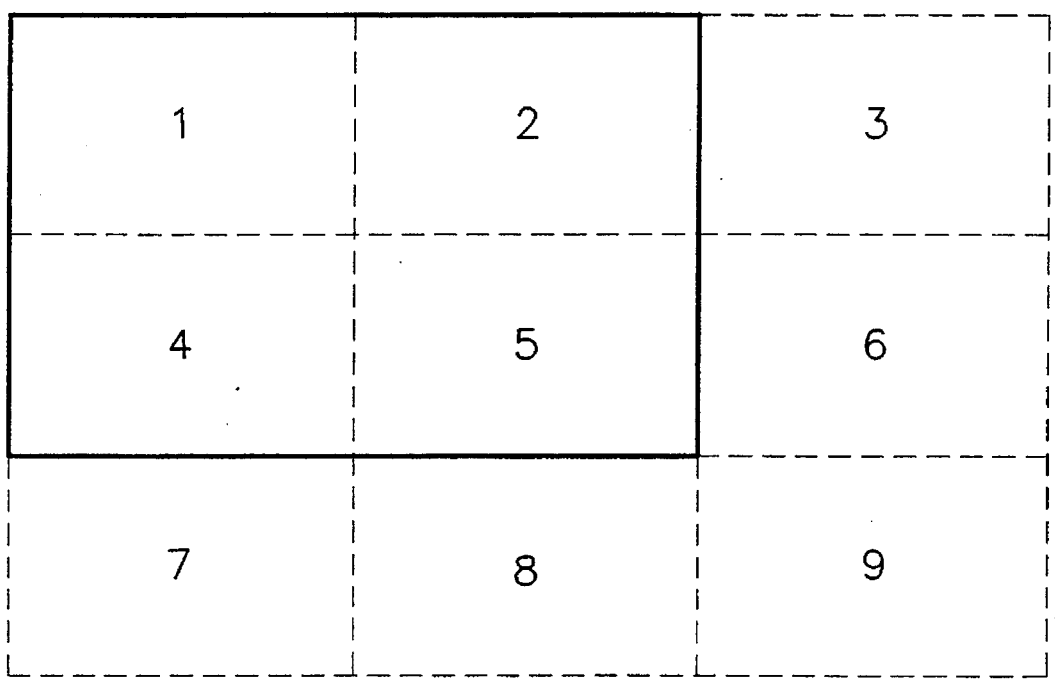
FIG. 25 is a conceptual illustration of adjacent image regions.

Reference is made briefly to FIG. 25 which illustrates an image portion including 9 subregions 1–9. It is appreciated that the image portion of FIG. 25 also includes 4 complete regions A, B, C and D, respectively comprising the following subregions:

A: subregions 1, 2, 4, 5

B: subregions 2, 3, 5, 6

C: subregions 4, 5, 7, 8

D: subregions 5, 6, 8, 9

The regional combining method for implementing step 242 of FIG. 11 includes the following two steps:
(a) Compute subregion legitimacy vector for each subregion:

For each subregion, AND the regional location-specific legitimacy vectors (RLSL vectors) computed in step 240 for each image location, over all image locations included in the subregion. The result of ANDing the RLSL vectors over an individual subregion is termed herein a subregion legitimacy vector.

Regional combining unit 338 includes a subregion combining unit 470 which is operative to perform the above subregion combining step.
(b) Combine subregion legitimacy vectors into region legitimacy vectors:

For each individual region, the subregion legitimacy vectors of each of the typically four subregions included in that region are ANDed. The result is a region legitimacy vector indicating which image-to-database translations of the individual region are legitimate.

Regional combining unit 338 includes a full region combining unit 472 which receives subregion-specific information from subregion combining unit 470 and performs the above full region combining step thereupon.

Subregion combining unit 470 and full region combining unit 472 are now described in detail, still with reference to FIGS. 24A–24B.

Subregion combining unit 470 comprises region control unit 570, data selector unit 574, AND unit 578 and row delay unit 580. Region control unit 570 supplies two signals: first region row and first region column, indicating whether a current image location is in the first row or column, respectively, of the current region, or not. The data that enters sub-regions combining unit 470 is ANDed by AND unit 578 with appropriate data selected by data selection unit 574. Data is selected by unit 574 as follows: If the current image location is in the first column and the first row of a region—a value of all 1's is selected. If the current image location is in the first region column but not in the first row of the region, data delayed from the previous row by row delay unit 580 is selected. If the current image location is not in the first column of the current region, then the result of the last AND operation is selected.

Row delay unit 580 is operative to introduce a one-row delay in data received and is enabled by the "first column" signal provided by region control unit 570. In the illustrated embodiment, there are no more than 32 regions per image row. Therefore, the length of the delay line of row delay unit 580 is, in the illustrated embodiment, 32 12-bit data words.

Full regions combining unit 472 comprises an AND gate 582, a 1-word delay unit 584, an AND unit 586, a 1-row delay unit 588 and an AND unit 590. 1-word delay unit 584 together with AND unit 586 are operative to combine subregions data in a horizontal direction. 1-row delay unit 588 together with AND unit 590 are operative to combine the subregions data in the vertical direction.

Reference is now made to FIG. 26 which is a block diagram of local combining unit 340 of FIG. 18, constructed and operative in accordance with a preferred embodiment of the present invention. As explained above, local combining unit 340 is operative to perform step 242 of the method of FIG. 11, for the local process only. In other words, local combining unit 340 is operative to combine per-image location information comprising LLSL vectors over edge neighborhoods. The result, as described above with reference to FIG. 11, is an ENL vector for each edge neighborhood which indicates the legitimacy of a plurality of I-DB translations for the entire edge neighborhood.

The local combining process performed by local combining unit 340 preferably comprises the following two steps:

(a) The LLSL vector of each image location is ANDed with the LLSL vectors of its two neighbors, as indicated by the two E-NEIGHBORS pointers provided for that image location. The result of the AND operation is an intermediate vector for each image location; and (b) The intermediate vector of each image location is ANDed with the intermediate vectors of its two neighbors, as indicated by the two E_NEIGHBORS pointers provided for that image location. The result of this AND operation is an ENL vector for each individual image location, indicative of the legitimacy of a plurality of I-DB translations for the edge neighborhood centered at the individual image location. The ENL vector for a particular edge neighborhood, when computed as above, equals the ANDed combination of the 5 LLSL vectors corresponding to the 5 image locations included in that edge neighborhood, due to the associativity of the AND function.

Referring again to FIG. 26, local combining unit 340 preferably comprises a first neighbor operator 490 for receiving local location-specific legitimacy values (LLSLV's) from comparing unit 336 of FIG. 18 and performing ANDing step (a), above, thereupon. Local combining unit 340 also preferably comprises a second neighbor operator 492 for receiving the output of first neighbor operator 490 and performing ANDing step (b) thereupon. Both neighbor operators 490 and 492 receive E-NEIGHBORS data from image shift unit 84 of FIG. 6. The E-NEIGHBORS data is received by second neighbor operator 492 via a delay unit 494. Delay unit 494 is operative to introduce a suitable delay in the E-NEIGHBORS data, preferably a two cycle delay, where a cycle is the time required for each neighbor operator to AND a single image location with its two neighbors.

The first neighbor operator unit 490 comprises a neighbors selection units 496 which spans 3 rows of data. In other words, neighbor operator unit 490 is operative to simultaneously supply LLSL vectors for a current image location and two neighbors thereof. Neighbor operator unit 490 also comprises an ANDing unit 498 for ANDing the three outputs of neighbors selection unit 496.

Second neighbor operator unit 492 may be substantially identical to first neighbor operator 490.

It is appreciated that designation in the specification of the number of bits per stream of data is merely intended to clarify the description of the illustrated embodiment and, being merely exemplary, is not intended to be limiting.

It will be appreciated by persons skilled in the art that the present invention is not limited to what has been particularly shown and described hereinabove. Rather, the scope of the present invention is defined only by the claims that follow:

```
adiff/adiff.c          Thu Jul  2 18:27:48 1992              2 define  DIM  150      /* Input and output image dimension */ typedef int max_image[DIM*6][DIM*6];

adiff(image1,
      image2,
      out_image,
      x_dim,
      y_dim,
      abs_flag)

max_image image1, image2, out_image;
    int abs_flag, x_dim, y_dim;
{
  int x, y;
  int d;

for (x=0;x<x_dim;x++)
    for (y=0;y<y_dim;y++)
      {
        d = image1[x][y] - image2[x][y];

out_image[x][y] = (abs_flag ? (d>0?d:-d) :d);
      }

}
``` adiff/adiff_main.c        Thu Jul  2 18:27:49 1992                3

```c
#include <stdio.h>
include <math.h>
include <ubc/image.h>
include <ubc/maclib.h> define DIM 150      /* Input and output image dimension */ typedef int max_image[DIM*6][DIM*6];

char *dfltab[] = {
  "-i1",0,
  "-i2",0,
  "-o",0,
  "-abs_flag","1",
  0 };

max_image image1, image2, out_image;
int image_x_dim, image_y_dim;

int abs_flag;

main(argc,argv)
  int argc;
  char *argv[];
{
   char annote1[1024];
   char annote2[1024];

IMAGE *ifp1,*ifp2,*bifp;
   int i,j;

initargs(argc,argv,dfltab);

/*..IF help THEN */
      if  (flagp("-help"))
      {
         printf("usage: adiff   [-i1 image1 -i2 image2 [-o output image] -abs_flag
(1) \n");
         exit(1);
      }

/*..Initialize input image file */
   if (keyarg("-i1"))
     ifp1 = iopen(keyarg("-i1"),R);

if (keyarg("-i2"))
     ifp2 = iopen(keyarg("-i2"),R);

require(ifp1,"can not open input image 1 file\n");
   getheader(ifp1,annote1);

require(ifp2,"can not open input image 2 file\n");
   getheader(ifp2,annote2);

abs_flag  = atoi(keyarg("-abs_flag"));

image_x_dim = ifp1->ncols;
   image_y_dim = ifp1->nrows;

/*..Initialize output image file */
   if (keyarg("-o"))
     bifp = iopen(keyarg("-o"),W);
   else
     bifp = idopen(OUTPUT,W);
   require(bifp,"can not open output image file\n");

bifp->nrows    = ifp1->nrows;
   bifp->ncols    = ifp1->ncols;
   bifp->bpp      = (abs_flag) ? 8 : 9;
   bifp->signed   = (abs_flag) ? 0: 1;
   bifp->positive = ifp1->positive;
```

```
adiff/adiff_main.c          Thu Jul  2 18:27:49 1992         3 include <stdio.h>
include <math.h>
include <ubc/image.h>
include <ubc/maclib.h> define  DIM  150      /* Input and output image dimension */
typedef int max_image[DIM*6][DIM*6];

char *dfltab[] = {
  "-i1",0,
  "-i2",0,
  "-o",0,
  "-abs_flag","1",
  0 };

max_image image1, image2, out_image;
int image_x_dim, image_y_dim;

int abs_flag;

main(argc,argv)
  int argc;
  char *argv[];
{
   char annote1[1024];
   char annote2[1024];

IMAGE *ifp1,*ifp2,*bifp;
   int i,j;

initargs(argc,argv,dfltab);

/*..IF help THEN */
     if (flagp("-help"))
     {
        printf("usage: adiff   [-i1 image1 -i2 image2 [-o output image] -abs_flag
(1) \n");
        exit(1);
     }

/*..Initialize input image file */
   if (keyarg("-i1"))
      ifp1 = iopen(keyarg("-i1"),R);

if (keyarg("-i2"))
      ifp2 = iopen(keyarg("-i2"),R);

require(ifp1,"can not open input image 1 file\n");
   getheader(ifp1,annote1);

require(ifp2,"can not open input image 2 file\n");
   getheader(ifp2,annote2);

abs_flag  = atoi(keyarg("-abs_flag"));

image_x_dim = ifp1->ncols;
   image_y_dim = ifp1->nrows;

/*..Initialize output image file */
   if (keyarg("-o"))
      bifp = iopen(keyarg("-o"),W);
   else
      bifp = idopen(OUTPUT,W);
   require(bifp,"can not open output image file\n");

bifp->nrows    = ifp1->nrows;
   bifp->ncols    = ifp1->ncols;
   bifp->bpp      = (abs_flag) ? 8 : 9;
   bifp->signed   = (abs_flag) ? 0: 1;
   bifp->positive = ifp1->positive;
``` adiff/adiff_main.c                    Thu Jul  2 18:27:49 1992                    4

```c
    putheader(bifp,annotel);

/*..Get input images into its array */
    foreach (i,ifp1->nrows)
      foreach (j,ifp1->ncols)
        image1[i][j] = getpix(ifp1);

foreach (i,ifp2->nrows)
      foreach (j,ifp2->ncols)
        image2[i][j] = getpix(ifp2);

/*.. use external routine to process image */
    adiff(image1,
          image2,
          out_image,
          image_x_dim,
          image_y_dim,
          abs_flag);

/*..Output image to output file */
    foreach (i,bifp->nrows)
      foreach (j,bifp->ncols)
        putpix(bifp,out_image[i][j]);

/*..Close files */
    iclose(ifp1);
    iclose(ifp2);
    iclose(bifp);

exit(0);

}
```

```
ax2/Makefile              Thu Jul  2 18:27:56 1992              5

CC = cc
OBJECTS = ubc_main.o ax2.o  data.o io.o  \
          ubc_io.o

CFLAGS = $(FLAGS) -g  -I/usr/local/include c2a:    $(OBJECTS) ubc_io.o data.h
        $(CC) $(FLAGS) -o ax2 $(OBJECTS)    -lubc -lm $(OBJECTS):    data.h
``` ax2/ax2.c          Thu Jul  2 18:27:57 1992                    6

```c
#include "data.h"
include <math.h> ax2()
{
  get_input_data();

perform_processing();

output_computed_data();
} perform_processing()
{
  compute_directions();
  compute_R();
  compute_areas_x2();

write_int_image_to_signed_ubc_file(directions,x_dim, y_dim, "directions");

write_double_image_scaled_to_signed_ubc_file(R,
                                  x_dim, y_dim,
                                  "R", 255.0);

write_double_image_scaled_to_signed_ubc_file(areas,
                                  x_dim, y_dim,
                                  "areas", 255.0);

} get_input_data()
{
  read_double_image_scaled_from_ubc_file(areas,
                                  &x_dim,
                                  &y_dim,
                                  areas_fname,
                                  SCALE_FACTOR);
  fine_x_dim = 2 * x_dim;
  fine_y_dim = 2 * y_dim;
} output_computed_data()
{
  write_double_image_scaled_to_ubc_file(areas_x2, fine_x_dim, fine_y_dim,
                                  areas_x2_fname, HIGH_QP_VALUE);
}
/*--------------------------------------------------------------------*/
/*          compute directions and polarities                         */
/*--------------------------------------------------------------------*/ compute_directions()
/*
  in: areas
  out: directions
*/
{
  int x, y;
  double N_values[9];

for(x=0; x<x_dim; x++)
    for(y=0; y<y_dim; y++)
      {
        printf("[%d %d]: ", x, y);
        get_neighborhood_values(x, y, N_values);
        compute_direction(N_values, &(directions[x][y]),
                                  &(polarities[x][y]));
      }
} s255(v)
```

```
ax2/ax2.c              Thu Jul  2 18:27:57 1992              7 double v;
{
  return irint(v*255);
} compute_direction(N_values, direction_p, polarity_p)
double N_values[9];
int *direction_p, *polarity_p;
{
  double grads[4];
  int max_direction_code, polarity;

compute_4_gradients(N_values, grads);
  compute_max_quotient_direction(grads, &max_direction_code, &polarity);

printf(" %d %d %d %d %d %d %d %d %d \n",
         s255(N_values[0]),
         s255(N_values[1]),
         s255(N_values[2]),
         s255(N_values[3]),
         s255(N_values[4]),
         s255(N_values[5]),
         s255(N_values[6]),
         s255(N_values[7]),
         s255(N_values[8]));

printf("grads= %d %d %d %d   d= %d p=%ld\n ",
         s255(grads[0]),
         s255(grads[1]),
         s255(grads[2]),
         s255(grads[3]), max_direction_code, polarity);

*direction_p = max_direction_code;
  *polarity_p  = polarity;
} compute_4_gradients(N_values, grads)
double N_values[9], grads[4];
{
  int i;
  for(i=0; i<4; i++)
    grads[i] = compute_gradient(N_values[d_locations[i][0]],
                                N_values[d_locations[i][1]],
                                N_values[d_locations[i][2]]);

} double compute_gradient(v1, v2, v3)
     double v1, v2, v3;
{
  if (fabs(v1-v2) > fabs(v2-v3))
    return v1-v2;
  else
    return v2-v3;
} compute_max_quotient_direction(grads, max_direction_code_p, polarity_p)
     double grads[4];
     int *max_direction_code_p, *polarity_p;
{
  double ag[4];

int max_XY, min_XY, max_D1D2, min_D1D2, selected;
  double Q_XY, Q_D1D2;

ag[X_DIRECTION]  = fabs(grads[X_DIRECTION]);
  ag[Y_DIRECTION]  = fabs(grads[Y_DIRECTION]);
  ag[D1_DIRECTION] = fabs(grads[D1_DIRECTION]);
  ag[D2_DIRECTION] = fabs(grads[D2_DIRECTION]);

if (ag[X_DIRECTION] > ag[Y_DIRECTION])
    {
``` ax2/ax2.c          Thu Jul  2 18:27:57 1992                    8

```
         max_XY = X_DIRECTION;
         min_XY = Y_DIRECTION;
      }
   else
      {
         max_XY = Y_DIRECTION;
         min_XY = X_DIRECTION;
      } if (ag[D1_DIRECTION] > ag[D2_DIRECTION])
      {
         max_D1D2 = D1_DIRECTION;
         min_D1D2 = D2_DIRECTION;
      }
   else
      {
         max_D1D2 = D2_DIRECTION;
         min_D1D2 = D1_DIRECTION;
      }

Q_XY = divide(ag[max_XY], ag[min_XY]);
   Q_D1D2 = divide(ag[max_D1D2], ag[min_D1D2]);

if ( Q_XY < 1.2 && Q_XY > 0.8 && Q_XY > 0.5 * Q_D1D2)
      { if (grads[X_DIRECTION] * grads[Y_DIRECTION] > 0) /* same sign */
            {
               *max_direction_code_p = D1_DIRECTION;
               *polarity_p = grad_sign_to_polarity(grads[X_DIRECTION]);
            }
         else
            {
               *max_direction_code_p = D2_DIRECTION;
               *polarity_p = grad_sign_to_polarity(grads[Y_DIRECTION]);
            }

} else
    {
       if (Q_XY > Q_D1D2 && ag[max_XY] > ag[max_D1D2] / 4)
          selected = max_XY;

else if (Q_D1D2 > Q_XY && ag[max_D1D2] > ag[max_XY] / 4)
          selected = max_D1D2;

else if  (ag[max_XY] > ag[max_D1D2])
          selected = max_XY;

else
          selected = max_D1D2;

*max_direction_code_p = selected;
       *polarity_p = grad_sign_to_polarity(grads[selected]);
    }
}

/*------------------------------------------------------------------*/
/*          compute R                                               */
```

```
ax2/ax2.c            Thu Jul  2 18:27:57 1992                           9
/*       in: areas, directions                                          */
/*       out: R                                                         */
/*----------------------------------------------------------------------*/ compute_R()
{
  int x, y;
  for(x=0; x<x_dim; x++)
    for(y=0; y<y_dim; y++)
      R[x][y] = compute_r_value(areas[x][y], directions[x][y],
                                polarities[x][y]);
} double compute_r_value(area, direction, polarity)
       double area;
       int direction;
{
  double normalized_area;

normalized_area = normalize_area(area, polarity);
  return area_to_r_value(normalized_area, direction);
} double area_to_r_value(area, direction_code)
       double area;
       int direction_code;
{
  if (area < 0)
    return 0;

else if (area > 1)
    return 1;

else if (direction_code == X_DIRECTION ||
           direction_code == Y_DIRECTION)
    return area;
  else
    {
      /*
        (direction_code == D1_DIRECTION ||
         direction_code == D2_DIRECTION)
      */
      if (area<=0.5)
        return (sqrt(area)/SQ2);
      else
        return (1 - sqrt(1-area)/SQ2);
    }
}

/*----------------------------------------------------------------------*/
/*              compute areas_x2                                        */
/*       in: areas, directions                                          */
/*       out: R                                                         */
/*----------------------------------------------------------------------*/ compute_areas_x2()
{
  int x, y;
  double a_values[4];

for(x=0; x<x_dim; x++)
    for(y=0; y<y_dim; y++)
      {
        compute_area_values(areas[x][y], R[x][y], directions[x][y],
                            polarities[x][y], a_values);
/*    3  4
      1  2
*/
        areas_x2[2*x][2*y]     = a_values[0];    /* CHECK ORDER */
        areas_x2[2*x+1][2*y]   = a_values[1];
        areas_x2[2*x][2*y+1]   = a_values[2];
```

```
ax2/ax2.c          Thu Jul  2 18:27:57 1992              11
         /* (d_code == D1_DIRECTION ||
              d_code == D2_DIRECTION)
            */ if (r < 0.5)
           return (2 * r * r) ;
         else
           return (1 - 2 * (1-r) * (1-r));
     }
  } double normalize_area(area, polarity)
  double area;
  int polarity;
  {
    if (polarity == 1)
      return area;
    else
      return (1 - area);
  } double denormalize_area(area, polarity)
  double area;
  int polarity;
  {
    if (polarity == 1)
      return area;
    else
      return (1 - area);
  } direction_polarity(direction)
  {
    return (direction>0) ? 1 : 0;
  } polarity_to_sign(polarity)
  {
    return (polarity == 1) ? 1 : -1;
  }

/*  0  1  2
      3  4  5
      6  7  8  */
  get_neighborhood_values(x, y, N_values)
  int x, y;
  double N_values[9];
  {
    N_values[0] = areas[x-1][y-1];
    N_values[1] = areas[x  ][y-1];
    N_values[2] = areas[x+1][y-1];
    N_values[3] = areas[x-1][y  ];
    N_values[4] = areas[x  ][y  ];
    N_values[5] = areas[x+1][y  ];
    N_values[6] = areas[x-1][y+1];
    N_values[7] = areas[x  ][y+1];
    N_values[8] = areas[x+1][y+1];
  } grad_sign_to_polarity(grad)
  double grad;
  {
    return (grad>0);
  }
``` ax2/ax2.c          Thu Jul  2 18:27:57 1992          11

```c
        /* (d_code == D1_DIRECTION ||
           d_code == D2_DIRECTION)
          */ if (r < 0.5)
          return (2 * r * r) ;
        else
          return (1 -  2 * (1-r) * (1-r));
      }
   }
} double normalize_area(area, polarity)
double area;
int polarity;
{
  if (polarity == 1)
    return area;
  else
    return (1 - area);
} double denormalize_area(area, polarity)
double area;
int polarity;
{
  if (polarity == 1)
    return area;
  else
    return (1 - area);
} direction_polarity(direction)
{
  return (direction>0) ? 1 : 0;

} polarity_to_sign(polarity)
{
  return (polarity == 1) ? 1 : -1;
}

/* 0  1  2
   3  4  5
   6  7  8  */ get_neighborhood_values(x, y, N_values)
int x, y;
double N_values[9];
{
  N_values[0] = areas[x-1][y-1];
  N_values[1] = areas[x  ][y-1];
  N_values[2] = areas[x+1][y-1];
  N_values[3] = areas[x-1][y  ];
  N_values[4] = areas[x  ][y  ];
  N_values[5] = areas[x+1][y  ];
  N_values[6] = areas[x-1][y+1];
  N_values[7] = areas[x  ][y+1];
  N_values[8] = areas[x+1][y+1];
} grad_sign_to_polarity(grad)
double grad;
{
  return (grad>0);
}
``` ax2/ax2.c        Thu Jul  2 18:27:57 1992        12

```
double divide(x, y)
double x, y;
{
  if (y==0)
    return BIGNUM;
  else
    return x/y;
}
``` ax2/data.c        Thu Jul  2 18:27:57 1992        13

```c
#include "data.h"
#include "math.h"

/* images related data */ double_image areas, areas_x2, R;
int_image directions, polarities;

char areas_fname[200],
  areas_x2_fname[200];

/* limits and image sizes */ int x_dim, y_dim,
    fine_x_dim, fine_y_dim;

/*         ------>
              x

|      0  1
    | y    2  3
    v
*/ double r_offset_table[4][4] = {
/* X  */ {    0,   -1,     0,   -1},
/* Y  */ {    0,    0,    -1,   -1},
/* D1 */ {    0, -0.5,  -0.5,   -1},
/* D2 */ {-0.5,    0,    -1, -0.5}};

/*  0  1  2
    3  4  5
    6  7  8  */ int d_locations[4][3] = {
  {/* x  */    3,4,5},
  {/* y  */    1,4,7},
  {/* d1 */    0,4,8},
  {/* d2 */    2,4,6}};
``` ax2/data.h          Thu Jul  2 18:27:58 1992                    14

```c
#define MAX_IMAGE_DIM 210
define MAX_ARRAY_DIM 32 define BPP8 8
define UNSIGNED 0
define SIGNED 0
define BIGNUM 1e8 define HIGH_QP_VALUE 255.0
define SCALE_FACTOR 255.0 define X_DIRECTION 0
define Y_DIRECTION 1
#define D1_DIRECTION 2
#define D2_DIRECTION 3
#define SQ2_OVER_2 0.707106781186
#define SQ2 1.41421356237309

/* point related definitions */ typedef struct {
  int x;
  int y;
} point;

typedef struct {
  double x;
  double y;
} double_point;

double_point make_double_point();

/* images related definitions */ typedef double double_image[MAX_IMAGE_DIM][MAX_IMAGE_DIM];
typedef double_point double_point_image[MAX_IMAGE_DIM][MAX_IMAGE_DIM];

typedef double double_array[MAX_ARRAY_DIM][MAX_ARRAY_DIM];

typedef int int_image[MAX_IMAGE_DIM][MAX_IMAGE_DIM];

/* images related data */ extern double_image areas, areas_x2, R;
extern int_image directions, polarities;

extern char areas_fname[200],
  areas_x2_fname[200];

/* limits and image sizes */ extern int x_dim, y_dim,
    fine_x_dim, fine_y_dim;

extern double_point corner_coordinates[4];

extern double r_offset_table[4][4];
/*  0  1  2
    3  4  5
    6  7  8  */ extern int d_locations[4][3];
``` ax2/data.h          Thu Jul  2 18:27:58 1992          15

```
/* fucntion declarations */
double compute_r_value();
double area_to_r_value();
double normalize_area();
double divide();
double compute_gradient();
double r_and_direction_to_area_value();
double denormalize_area();
```

```
ax2/io.c            Thu Jul  2 18:27:58 1992                    16 include "data.h"
include <math.h>
include <stdio.h> print_double_image(I, x_dim, y_dim)
double_image I;
int x_dim, y_dim;
{
  int x, y;

printf("\n image values \n");

for(x=0; x<x_dim; x++)
    {
      for(y=0; y<y_dim; y++)
        printf("%3.0f ", I[x][y]);
      printf("\n");
    }
} read_double_image_from_ubc_file(I, dim_x_p, dim_y_p, file_name)
double_image I;
int *dim_x_p, *dim_y_p;
char file_name[];
{
  int x_physical_dim = MAX_IMAGE_DIM;

read_ubc_double_image_file(file_name,
                             I,
                             x_physical_dim,
                             dim_x_p,
                             dim_y_p);
} read_double_image_scaled_from_ubc_file(I, dim_x_p, dim_y_p, file_name,
                                       scale_factor)
double_image I;
int *dim_x_p, *dim_y_p;
char file_name[];
double scale_factor;

{
  int x_physical_dim = MAX_IMAGE_DIM;

read_ubc_double_image_scaled_file(file_name,
                                    I,
                                    x_physical_dim,
                                    dim_x_p,
                                    dim_y_p,
                                    scale_factor);

} double_image scaled_image;

write_double_image_scaled_to_ubc_file(I, dim_x, dim_y, file_name, scale_factor)
double_image I;
int dim_x, dim_y;
char file_name[];
double scale_factor;
{
  int x, y;
  for(x=0; x<dim_x; x++)
    for(y=0; y<dim_y; y++)
      scaled_image[x][y] = irint(scale_factor * I[x][y]);

write_double_image_to_ubc_file(scaled_image, dim_x, dim_y, file_name);
} write_double_image_scaled_to_signed_ubc_file(I,
                                             dim_x, dim_y,
                                             file_name, scale_factor)
double_image I;
int dim_x, dim_y;
``` ax2/io.c          Thu Jul  2 18:27:58 1992                    17

```
char file_name[];
double scale_factor;
{
  int x, y;
  for(x=0; x<dim_x; x++)
    for(y=0; y<dim_y; y++)
      scaled_image[x][y] = irint(scale_factor * I[x][y]);

write_double_image_to_signed_ubc_file(scaled_image, dim_x, dim_y, file_name);
} write_double_image_to_ubc_file(I, dim_x, dim_y, file_name)
double_image I;
int dim_x, dim_y;
char file_name[];
{
 int bpp = 8, signed_flag = 0, x_physical_dim = MAX_IMAGE_DIM;

write_ubc_double_image_file(file_name,
                       I,
                       x_physical_dim,
                       dim_x, dim_y,
                       bpp,
                       signed_flag);
} write_double_image_to_signed_ubc_file(I, dim_x, dim_y, file_name)
double_image I;
int dim_x, dim_y;
char file_name[];
{
 int bpp = 9, signed_flag = 1, x_physical_dim = MAX_IMAGE_DIM;

write_ubc_double_image_file(file_name,
                       I,
                       x_physical_dim,
                       dim_x, dim_y,
                       bpp,
                       signed_flag);
} write_int_image_to_ubc_file(I, dim_x, dim_y, file_name)
int_image I;
int dim_x, dim_y;
char file_name[];
{
 int bpp = 8, signed_flag = 0, x_physical_dim = MAX_IMAGE_DIM;

write_ubc_image_file(file_name,
                       I,
                       x_physical_dim,
                       dim_x, dim_y,
                       bpp,
                       signed_flag);
} write_int_image_to_signed_ubc_file(I, dim_x, dim_y, file_name)
int_image I;
int dim_x, dim_y;
char file_name[];
{
 int bpp = 8, signed_flag = 1, x_physical_dim = MAX_IMAGE_DIM;

write_ubc_image_file(file_name,
                       I,
                       x_physical_dim,
                       dim_x, dim_y,
                       bpp,
                       signed_flag);
}
``` ax2/io.c          Thu Jul  2 18:27:58 1992          18

```c
read_double_array_from_text_file(A, size_x_p, size_y_p, A_file_name)
double_array A;
int *size_x_p, *size_y_p;
char A_file_name[];
{
  int x, y;

FILE *fp;
  fp = fopen(A_file_name, "r");
  if (fp == NULL)
    {
       fprintf(stderr,"cannot read text file %s \n", A_file_name);
       exit(1);
    }
  fscanf(fp,"%d %d",size_x_p, size_y_p);

for(x=0; x<*size_x_p; x++)
    for(y=0; y<*size_y_p; y++)
      fscanf(fp,"%lf",&A[x][y]);
} output_double_array_as_text_file(A, size_x, size_y, A_file_name)
double_array A;
int size_x, size_y;
char A_file_name[];
{
  int x, y;

FILE *fp;
  fp = fopen(A_file_name, "w");

fprintf(fp,"%d %d \n",size_x, size_y);

for(x=0; x<size_x; x++)
    {
       for(y=0; y<size_y; y++)
         fprintf(fp,"%7.3f",A[x][y]);
       fprintf(fp,"\n");
    }
}
``` ax2/ubc_io.c          Thu Jul  2 18:27:58 1992

```
/***********************************************************************/
/*           independent ubc image read and write functions           */
/***********************************************************************/
#include "data.h"

include <stdio.h>
include <math.h>
include <ubc/image.h>
include <ubc/maclib.h> write_ubc_image_file(fname,image,x_physical_dim,x_dim,y_dim,bpp,signed_flag)
     char *fname;
     int *image;
     int x_physical_dim, x_dim, y_dim,bpp,signed_flag;

{
  IMAGE *ifp;
  int x,y;
  char annote[1024];

ifp = iopen(fname,W);
  check_ifp(ifp,fname);

ifp->nrows     = y_dim;
  ifp->ncols     = x_dim;
  ifp->bpp       = bpp;
  ifp->signed    = signed_flag;
  ifp->positive  = 1;
  putheader(ifp,annote);

for (y=0; y<y_dim; y++)
     for (x=0;x<x_dim;x++)
        putpix(ifp,image[x+y*x_physical_dim]);

iclose(ifp);
} check_ifp(ifp, file_name)
  IMAGE *ifp;
  char file_name[];
{
  char msg[200];

sprintf(msg, " cannot perform operation with file: %s \n", file_name);

require(ifp,msg);
} read_ubc_image_file(fname,image,x_physical_dim,x_dim_p,y_dim_p,bpp_p,signed_flag
_p)
     char *fname;
     int *image;
     int x_physical_dim,*x_dim_p, *y_dim_p,*bpp_p,*signed_flag_p;

{
  IMAGE *ifp;
  char annote[1024];

int x,y;

ifp = iopen(fname,R);
  check_ifp(ifp,fname);

getheader(ifp,annote);
  *y_dim_p       = ifp->nrows;
  *x_dim_p       = ifp->ncols;
  *bpp_p         = ifp->bpp+1;
  *signed_flag_p = ifp->signed;

/*..Get input image into its array */
for (y=0;y<*y_dim_p;y++)
``` ax2/ubc_io.c           Thu Jul  2 18:27:58 1992                    20

```
    for (x=0;x<*x_dim_p;x++)
      image[x+y*x_physical_dim] = getpix(ifp);

iclose(ifp);
}

/*------------------------------------------------------------*/ write_ubc_double_image_file(fname,
                       image,x_physical_dim,x_dim,y_dim,bpp,signed_flag)
    char *fname;
    double *image;
    int x_physical_dim, x_dim, y_dim,bpp,signed_flag;

{
  IMAGE *ifp;
  int x,y;
  char annote[1024];
  int value;

ifp = iopen(fname,W);
  check_ifp(ifp,fname);

ifp->nrows    = y_dim;
  ifp->ncols    = x_dim;
  ifp->bpp      = bpp;
  ifp->signed   = signed_flag;
  ifp->positive = 1;
  putheader(ifp,annote);

for (y=0; y<y_dim; y++)
     for (x=0;x<x_dim;x++)
       {
         value = irint(image[x+y*x_physical_dim]);
         if (signed_flag)
            {if (value < -254) value = -254;}
         else
            {if (value < 0) value = 0;} if (value > 255) value = 255;
         putpix(ifp,value);
       }
   iclose(ifp);
} read_ubc_double_image_file(fname,
                       image,x_physical_dim,x_dim_p,y_dim_p)
    char *fname;
    double *image;
    int x_physical_dim,*x_dim_p, *y_dim_p;
{
  IMAGE *ifp;
  char annote[1024];
  int x,y;
  int value;

ifp = iopen(fname,R);
  check_ifp(ifp,fname);

getheader(ifp,annote);
  *y_dim_p    = ifp->nrows;
  *x_dim_p    = ifp->ncols;

/*..Get input image into its array */
  for (y=0;y<*y_dim_p;y++)
    for (x=0;x<*x_dim_p;x++)
      {
        value = getpix(ifp);
        image[x+y*x_physical_dim] = value;
      }
``` ax2/ubc_io.c          Thu Jul  2 18:27:58 1992                    21

```c
  iclose(ifp);
} read_ubc_double_image_scaled_file(fname,
                        image,x_physical_dim,x_dim_p,y_dim_p, scale_factor)
     char *fname;
     double *image;
     int x_physical_dim,*x_dim_p, *y_dim_p;
     double scale_factor;
{
  IMAGE *ifp;
  char annote[1024];
  int x,y;
  double value;

ifp = iopen(fname,R);
  check_ifp(ifp,fname);

getheader(ifp,annote);
  *y_dim_p    = ifp->nrows;
  *x_dim_p    = ifp->ncols;

/*..Get input image into its array */
  for (y=0;y<*y_dim_p;y++)
    for (x=0;x<*x_dim_p;x++)
      {
        value = getpix(ifp) / (double) scale_factor;
        image[x+y*x_physical_dim] = value;
      } iclose(ifp);
}
```

```
ax2/ubc_main.c                Thu Jul  2 18:27:58 1992              22 include "data.h"

include <stdio.h>
include <math.h> include <ubc/image.h>
include <ubc/maclib.h>
include <ubc/imlib.h> include <strings.h> char *dfltab[] = {
    "-i","default_input",
    "-o","default_output",
    0 };

main(argc,argv)
     int argc;
     char *argv[];
{
  initargs(argc,argv,dfltab);

help_utility();

init_global_parameters();

ax2();

} help_utility()
{
  if  (flagp("-help"))
    {
       printf("usage: \n\
    ax2 \n\
    -i,    (default_input) \n\
    -o,    (default_output) \n");
       exit(1);
    }
} init_global_parameters()
{
  strcpy(areas_fname, keyarg("-i"));
  strcpy(areas_x2_fname, keyarg("-o"));
}
``` c2a/Makefile            Thu Jul  2 18:27:53 1992            23

```
CC = cc
OBJECTS = ubc_main.o c2a.o deriv.o area.o data.o io.o double_point.o \
          ubc_io.o util.o CFLAGS =  $(FLAGS) -I/usr/local/include c2a:    $(OBJECTS) ubc_io.o data.h double_point.h
        $(CC) $(FLAGS) -o c2a $(OBJECTS)   -lubc -lm $(OBJECTS):     data.h
``` c2a/area.c          Thu Jul  2 18:27:53 1992                    24

```c
#include "data.h"
include "double_point.h"

#include <math.h>
include <stdio.h> double uniform_QP_area();
double edge_QP_area();
double enclosed_area();
double triangle_area();
double polygon4_area();

/*------------------------------------------------------------------*/
/*         area computations                                        */
/*------------------------------------------------------------------*/
compute_QP_area(V)
double V[];
{
  if (uniform_QP_p(V))
    return irint(HIGH_QP_VALUE * uniform_QP_area(V));

else
    return irint(HIGH_QP_VALUE * edge_QP_area(V));
} uniform_QP_p(V)
double V[];
{
  return ! (different_sign(V[0],V[1]) ||
            different_sign(V[1],V[2]) ||
            different_sign(V[2],V[3]) ||
            different_sign(V[3],V[0]));
} double uniform_QP_area(V)
double V[];
{
  return (double) D_sign_to_polarity(V[0]);
} double edge_QP_area(V)
double V[];
{
  int edge1, edge2;
  double_point e_pt1, e_pt2, e_pt3, e_pt4;
  int reverse_flag;
  double area;

compute_QP_edge_endpoints(V,
                     &edge1, &edge2, &e_pt1, &e_pt2);

compute_additional_points(edge1, edge2,
                     &e_pt3, &e_pt4);

reverse_flag = compute_reverse_flag(e_pt1, e_pt2, e_pt3, e_pt4,
                                      V);
  /*
    printf("e1=%ld, e2=%ld, pts=[%4f, %4f] [%4f, %4f] [%4f, %4f] [%4f, %4f]\n",
    edge1, edge2,
    e_pt1.x, e_pt1.y,
    e_pt2.x, e_pt2.y,
    e_pt3.x, e_pt3.y,
    e_pt4.x, e_pt4.y);

*/
  area = enclosed_area(e_pt1, e_pt2, e_pt3, e_pt4, reverse_flag);

return area;
}
``` c2a/area.c          Thu Jul  2 18:27:53 1992                    25

```
double enclosed_area(e_pt1, e_pt2, e_pt3, e_pt4, reverse_flag)
double_point e_pt1, e_pt2, e_pt3, e_pt4;
int reverse_flag;
{
  double area;

if (null_double_point(e_pt4))
    area = triangle_area(e_pt1, e_pt2, e_pt3);
  else
    area = polygon4_area(e_pt1, e_pt3, e_pt4, e_pt2);

if (reverse_flag)
    area = 1 - area;

return area;
} compute_QP_edge_endpoints(V,
                         edge1_p, edge2_p, pt1_p, pt2_p)
double V[];
int *edge1_p, *edge2_p;
double_point *pt1_p, *pt2_p;
{
  int i, next_i, pt_index;

double_point pts[4];
  int pt_border_indexes[4];

pt_index = 0;

for(i=0; i<4; i++)
    {
      next_i = (i+1)%4;
      if (different_sign(V[i],V[next_i]))
        {
          find_one_segment_endpoint(i,next_i,
                                    V[i],V[next_i],
                                    &pts[pt_index]);
          pt_border_indexes[pt_index] = i;
          pt_index++;
        }
    } if (pt_index != 2)
    {
/*
      fprintf(stdout,
              " error: %d transitions for [%f %f %f %f] \n",
              pt_index,V[0],V[1],V[2],V[3]);
      *pt1_p = null_double_pt;
      *pt2_p = null_double_pt;
*/
      return;
    }

*edge1_p = pt_border_indexes[0];
  *edge2_p = pt_border_indexes[1];

*pt1_p = pts[0];
  *pt2_p = pts[1];
} find_one_segment_endpoint(i1,i2,
                          v1, v2,
                          pt_p)
int i1, i2;
double v1, v2;
double_point *pt_p;
{
  double abs_v1, abs_v2;
```

```
c2a/area.c          Thu Jul  2 18:27:53 1992                    26 double_point c_pt1, c_pt2;
  double s;

abs_v1 = fabs(v1);
  abs_v2 = fabs(v2);

c_pt1 = corner_coordinates[i1];
  c_pt2 = corner_coordinates[i2];

s = abs_v1 / (abs_v1 + abs_v2);

pt_p->x = (1-s) * c_pt1.x + s * c_pt2.x;
  pt_p->y = (1-s) * c_pt1.y + s * c_pt2.y;
}

/*------------------------------------------------------------------
                  notation / numbering 0                     0          1

3              1

2                 3          2 edges                 corners

------------------------------------------------------------------*/ compute_additional_points(edge1, edge2, e_pt3_p, e_pt4_p)
     int edge1, edge2;
     double_point *e_pt3_p, *e_pt4_p;
{
  double_point e_pt3, e_pt4;

e_pt3 = null_double_pt;
  e_pt4 = null_double_pt;

/* 3 epts cases */
  if (edge1 == 0 && edge2 == 1)
    {
      e_pt3 = corner_coordinates[1];
      e_pt4 = null_double_pt;
    } else if (edge1 == 1 && edge2 == 2)
    {
      e_pt3 = corner_coordinates[2];
      e_pt4 = null_double_pt;
    } else if (edge1 == 2 && edge2 == 3)
    {
      e_pt3 = corner_coordinates[3];
      e_pt4 = null_double_pt;
    } else if (edge1 == 0 && edge2 == 3)
    {
      e_pt3 = corner_coordinates[0];
      e_pt4 = null_double_pt;
    }

/* 4 epts cases */ else if (edge1 == 0 && edge2 == 2)
    {
      e_pt3 = corner_coordinates[1];
      e_pt4 = corner_coordinates[2];
    }
``` c2a/area.c        Thu Jul  2 18:27:53 1992        27

```c
      else if (edge1 == 1 && edge2 == 3)
        {
          e_pt3 = corner_coordinates[2];
          e_pt4 = corner_coordinates[3];
        }

*e_pt3_p = e_pt3;
      *e_pt4_p = e_pt4;
} compute_reverse_flag(e_pt1, e_pt2, e_pt3, e_pt4, V)
double_point e_pt1, e_pt2, e_pt3, e_pt4;
double V[4];
{ double_point check_pt;
  int n, p;
  int reverse_flag;

n = find_most_distant_corner_index(e_pt1, e_pt2);
  p = D_sign_to_polarity(V[n]);

check_pt = corner_coordinates[n];

if (double_point_equal(check_pt, e_pt3) ||
      double_point_equal(check_pt, e_pt4))
    /* corner inside polygon */
    reverse_flag = !p;

else
    /* corner outside polygon */
    reverse_flag = p;

/*
    printf ("chosen=[%4f %4f], n=%ld,  p =%ld, R=%ld \n",
    check_pt.x, check_pt.y, n, p, reverse_flag);
  */ return reverse_flag;

} find_most_distant_corner_index(e_pt1, e_pt2)
double_point e_pt1, e_pt2;
{
  int n;
  double d, d1, d2, max_d, max_d_index;

max_d = 0;

for(n=0; n<4; n++)
    {
      d1 = double_point_distance(e_pt1, corner_coordinates[n]);
      d2 = double_point_distance(e_pt2, corner_coordinates[n]);
      d = double_min(d1,d2);

if (d>max_d)
        {
          max_d = d;
          max_d_index = n;
        }
    } return max_d_index;
}

/*----------------------------------------------------------*/
/* The area of a triangle is                                */
/*   0.5*(x1*(y2-y3) + x2*(y3-y1) + x3*(y1-y2))             */
/* where  (x1,y1), (x2,y2), (x3,y3) are its endpoints       */
``` c2a/area.c          Thu Jul  2 18:27:53 1992                28
/*----------------------------------------------------*/

```
double triangle_area(pt1,pt2,pt3)
double_point pt1,pt2,pt3;
{
  return fabs(0.5*(pt1.x*(pt2.y-pt3.y) + pt2.x*(pt3.y-pt1.y)
                 + pt3.x*(pt1.y-pt2.y)));
} double polygon4_area(pt1,pt2,pt3,pt4)
double_point pt1,pt2,pt3,pt4;
{
  return
    triangle_area(pt1,pt2,pt3) + triangle_area(pt1,pt4,pt3);
}

D_sign_to_polarity(v)
double v;
{
  return v >=0;
} different_sign(x,y)
double x, y;
{
  return (x>=0 && y<0 || y>=0 && x<0);
}
``` c2a/c2a.c            Thu Jul  2 18:27:53 1992            29

```c
#include "data.h"
include <math.h> c2a()
{
  get_input_data();

perform_processing();

output_computed_data();
} perform_processing()
{
  interpolate_deriv_data();
  compute_areas();
} get_input_data()
{
  read_double_image_from_ubc_file(D,
                                  &D_x_dim,
                                  &D_y_dim,
                                  D_fname);
} output_computed_data()
{
  write_ubc_image_file(QP_areas_fname, QP_areas, MAX_IMAGE_DIM,
                       fine_D_x_dim, fine_D_x_dim, BPP8, UNSIGNED);
} compute_areas()
{
  int x, y;
  double V[4];

for (x=0; x<fine_D_x_dim-1; x++)
    for (y=0; y<fine_D_y_dim-1; y++)
      {
        V[0] = fine_D[x][y],
        V[1] = fine_D[x+1][y],
        V[2] = fine_D[x+1][y+1],
        V[3] = fine_D[x][y+1];
/*
        printf("%d %d] %4f %4f %4f %4f\n", x, y,
               V[0], V[1], V[2], V[3]);
*/
        QP_areas[x][y] =
          compute_QP_area(V);
      }
}
``` c2a/data.c          Thu Jul  2 18:27:54 1992          30

```c
#include "data.h"
#include "math.h"

/* images related data */ int_image QP_areas;
double_image D;
double_image fine_D;

char QP_areas_fname[200],
  D_fname[200];

/* limits and image sizes */ int D_x_dim, D_y_dim,
    fine_D_x_dim, fine_D_y_dim;

double_point corner_coordinates[4] = {{0,0},{1,0},{1,1},{0,1}};
```

```
c2a/data.h              Thu Jul  2 18:27:56 1992               31 define MAX_IMAGE_DIM 210
define MAX_ARRAY_DIM 32 define BPP8 8
define UNSIGNED 0
define SIGNED 0 define HIGH_QP_VALUE 255

/* point related definitions */ typedef struct {
  int x;
  int y;
} point;

typedef struct {
  double x;
  double y;
} double_point;

double_point make_double_point();

/* images related definitions */ typedef double double_image[MAX_IMAGE_DIM][MAX_IMAGE_DIM];
typedef double_point double_point_image[MAX_IMAGE_DIM][MAX_IMAGE_DIM];

typedef double double_array[MAX_ARRAY_DIM][MAX_ARRAY_DIM];

typedef int int_image[MAX_IMAGE_DIM][MAX_IMAGE_DIM];

/* images related data */
extern int_image QP_areas;
extern double_image D;
extern double_image fine_D;

extern char D_fname[], QP_areas_fname[];

/* limits and image sizes */ extern int D_x_dim, D_y_dim,
  fine_D_x_dim, fine_D_y_dim;

extern double_point corner_coordinates[4];
``` c2a/deriv.c          Thu Jul  2 18:27:54 1992          32

```c
#include "data.h"
include "double_point.h"
#include "sg_data.h"

#include <math.h>
include <stdio.h> interpolate_deriv_data()
{
  interpolate_x2(D, fine_D, D_x_dim, D_y_dim);
  fine_D_x_dim = D_y_dim * 2;
  fine_D_y_dim = D_x_dim * 2;
  shift_fine_D(1,1);
}

/*----------------------------------------------------------------------*/
/*        bilinear interpolation utility                                */
/*----------------------------------------------------------------------*/ interpolate_x2(coarse_image,fine_image,coarse_dim_x,coarse_dim_y)
int coarse_dim_x,coarse_dim_y;
double_image coarse_image;
double_image fine_image;
{
  int x,y,a,b,c,d;

int fine_offset = 1;

for (x=0; x<coarse_dim_x-1; x++)
    for (y=0; y<coarse_dim_y-1; y++)
      {
        /*       a    .    b  */
        /*       .    .    .  */
        /*       c    .    d  */ a = coarse_image[x][y];
        b = coarse_image[x+1][y];
        c = coarse_image[x][y+1];
        d = coarse_image[x+1][y+1];

fine_image[2*x][2*y]     = a;
        fine_image[2*x+1][2*y]   = (a+b)/2;
        fine_image[2*x][2*y+1]   = (a+c)/2;
        fine_image[2*x+1][2*y+1] = (a+b+c+d) / 4.0;
      }
} shift_fine_D(x_shift, y_shift)
     int x_shift, y_shift;
{
  int x, y;

for(x=fine_D_x_dim-1; x>=x_shift; x--)
    for(y=fine_D_y_dim-1; y>=y_shift; y--)
      fine_D[x][y] = fine_D[x-x_shift][y-y_shift];

}
```

```
c2a/double_point.c          Thu Jul  2 18:27:54 1992          33 include "data.h"
include "double_point.h"

#include "stdio.h"

include <math.h> define PI 3.14
define PI2 6.28 point make_point(x,y)
     int x, y;

{
  point temp;
  temp.x = x;
  temp.y = y;
  return temp;
} point_equal(pt1,pt2)
point pt1,pt2;
{
  return (pt1.x == pt2.x && pt1.y == pt2.y);
} point point_add(pt1,pt2)
point pt1,pt2;
{
  return make_point(pt1.x + pt2.x, pt1.y + pt2.y);
}
/*---------------------------------------------------------------*/
/* double_point.c                                                */
/*---------------------------------------------------------------*/ double_point make_double_point(x,y)
     double x, y;
{
  double_point temp;
  temp.x = x;
  temp.y = y;
  return temp;
} double_point double_point_add(pt1,pt2)
double_point pt1,pt2;
{
  return make_double_point(pt1.x + pt2.x, pt1.y + pt2.y);
} double_point double_point_average(pt1,pt2)
double_point pt1,pt2;
{
  return make_double_point((pt1.x + pt2.x)/2, (pt1.y + pt2.y)/2);
} double_point double_point_negate(pt)
double_point pt;
{
  return make_double_point(- pt.x, - pt.y);
} double_point double_point_sub(pt1,pt2)
double_point pt1,pt2;
{
  return make_double_point(pt1.x - pt2.x, pt1.y - pt2.y);
}
``` c2a/double_point.c          Thu Jul  2 18:27:54 1992          34

```c
double_point_dist2(pt1,pt2)
double_point pt1,pt2;
{
  int dx = pt1.x - pt2.x;
  int dy = pt1.y - pt2.y;

return (dx*dx+dy*dy);
} double_point null_double_pt = {-100.0,-100.0};

null_double_point(pt)
     double_point pt;
{
  return (pt.x == null_double_pt.x && pt.y == null_double_pt.y);
} define RESOLUTION_FACTOR 20.0
double_point double_point_limit_precision(pt)
     double_point pt;
{
  double rx, ry;
  rx = irint(pt.x * RESOLUTION_FACTOR) / RESOLUTION_FACTOR;
  ry = irint(pt.y * RESOLUTION_FACTOR) / RESOLUTION_FACTOR;

return make_double_point(rx, ry);
} double_point_equal(pt1,pt2)
double_point pt1,pt2;
{
  return (pt1.x == pt2.x && pt1.y == pt2.y ||
          fabs(pt1.x - pt2.x) + fabs(pt1.y-pt2.y) < 0.0001);
} double_vector_angle(v1,v2)
double_point v1, v2;
{
  double u1_x = v1.x, u1_y = v1.y, u2_x = v2.x, u2_y = v2.y;
  double vcross, vdot, rad;

vcross = u1_x * u2_y - u1_y * u2_x;
  vdot = u1_x * u2_x + u1_y * u2_y;

rad = atan(vcross / vdot);

if (vdot < 0)
    rad += PI;

if (rad > PI)
    rad -= PI2;

return irint(rad / PI * 180);
} double double_inner_product(v1, v2)
double_point v1, v2;
{
  return (v1.x * v2.x + v1.y * v2.y);
} double_point double_vector_normal(v)
double_point v;
{
  return double_vector_normalized(make_double_point(v.y, -v.x));
} double_point double_vector_normalized(v)
double_point v;
{
```

```
c2a/double_point.c          Thu Jul  2 18:27:54 1992              35
  double s;
  s = sqrt(v.x * v.x + v.y * v.y);
  if (s==0.0) s=1.0;
  return make_double_point(v.x/s, v.y/s);
} double double_point_distance(v1,v2)
double_point v1, v2;
{
  return sqrt((v1.x - v2.x) * (v1.x - v2.x) +
              (v1.y - v2.y) * (v1.y - v2.y));
} double_point double_point_scale(c,pt)
     double c;
     double_point pt;
{
  return make_double_point(pt.x * c, pt.y * c);
}
``` c2a/double_point.h          Thu Jul  2 18:27:56 1992                36

```
/*----------------------------------------------------------------*/
/* double_point.h                                                 */
/*----------------------------------------------------------------*/ point make_point();
point_equal();
point point_add();

double_point make_double_point();

double_point double_point_add();
double_point double_point_average();

double_point double_point_negate();

double_point double_point_sub();

double_point_dist2();

double_point null_double_pt;
double_point double_point_limit_precision();
null_double_point();

double_point_equal();

double_vector_angle();

double double_inner_product();

double double_point_distance();

double_point double_point_scale();

double_point double_vector_normal();
double_point double_vector_normalized();
```

```
c2a/io.c          Thu Jul  2 18:27:55 1992                    37
#include "data.h"
include <math.h>
include <stdio.h> print_double_image(I, x_dim, y_dim)
double_image I;
int x_dim, y_dim;
{
  int x, y;

printf("\n image values \n");

for(x=0; x<x_dim; x++)
    {
      for(y=0; y<y_dim; y++)
        printf("%3.0f ", I[x][y]);
      printf("\n");
    }
} read_double_image_from_ubc_file(I, dim_x_p, dim_y_p, file_name)
double_image I;
int *dim_x_p, *dim_y_p;
char file_name[];
{
  int x_physical_dim = MAX_IMAGE_DIM;

read_ubc_double_image_file(file_name,
                 I,
                 x_physical_dim,
                 dim_x_p,
                 dim_y_p);
} double_image scaled_image;

write_double_image_scaled_to_ubc_file(I, dim_x, dim_y, file_name, scale_factor)
double_image I;
int dim_x, dim_y;
char file_name[];
double scale_factor;
{
  int x, y;
  for(x=0; x<dim_x; x++)
    for(y=0; y<dim_y; y++)
      scaled_image[x][y] = irint(scale_factor * I[x][y]);

write_double_image_to_ubc_file(scaled_image, dim_x, dim_y, file_name);
} write_double_image_scaled_to_signed_ubc_file(I,
                                             dim_x, dim_y,
                                             file_name, scale_factor)
double_image I;
int dim_x, dim_y;
char file_name[];
double scale_factor;
{
  int x, y;
  for(x=0; x<dim_x; x++)
    for(y=0; y<dim_y; y++)
      scaled_image[x][y] = irint(scale_factor * I[x][y]);

write_double_image_to_signed_ubc_file(scaled_image, dim_x, dim_y, file_name);
} write_double_image_to_ubc_file(I, dim_x, dim_y, file_name)
double_image I;
int dim_x, dim_y;
char file_name[];
{
  int bpp = 8, signed_flag = 0, x_physical_dim = MAX_IMAGE_DIM;
``` c2a/io.c          Thu Jul  2 18:27:55 1992                    38

```c
    write_ubc_double_image_file(file_name,
                                I,
                                x_physical_dim,
                                dim_x, dim_y,
                                bpp,
                                signed_flag);
} write_double_image_to_signed_ubc_file(I, dim_x, dim_y, file_name)
double_image I;
int dim_x, dim_y;
char file_name[];
{
  int bpp = 9, signed_flag = 1, x_physical_dim = MAX_IMAGE_DIM;

write_ubc_double_image_file(file_name,
                              I,
                              x_physical_dim,
                              dim_x, dim_y,
                              bpp,
                              signed_flag);
} write_int_image_to_ubc_file(I, dim_x, dim_y, file_name)
int_image I;
int dim_x, dim_y;
char file_name[];
{
  int bpp = 8, signed_flag = 0, x_physical_dim = MAX_IMAGE_DIM;

write_ubc_image_file(file_name,
                       I,
                       x_physical_dim,
                       dim_x, dim_y,
                       bpp,
                       signed_flag);
} read_double_array_from_text_file(A, size_x_p, size_y_p, A_file_name)
double_array A;
int *size_x_p, *size_y_p;
char A_file_name[];
{
  int x, y;

FILE *fp;
  fp = fopen(A_file_name, "r");
  if (fp == NULL)
    {
      fprintf(stderr,"cannot read text file %s \n", A_file_name);
      exit(1);
    }
  fscanf(fp,"%d %d",size_x_p, size_y_p);

for(x=0; x<*size_x_p; x++)
    for(y=0; y<*size_y_p; y++)
      fscanf(fp,"%lf",&A[x][y]);
} output_double_array_as_text_file(A, size_x, size_y, A_file_name)
double_array A;
int size_x, size_y;
char A_file_name[];
{
  int x, y;

FILE *fp;
  fp = fopen(A_file_name, "w");

fprintf(fp,"%d %d \n",size_x, size_y);
``` c2a/io.c          Thu Jul  2 18:27:55 1992          39

```
  for(x=0; x<size_x; x++)
    {
      for(y=0; y<size_y; y++)
        fprintf(fp,"%7.3f",A[x][y]);
      fprintf(fp,"\n");
    }
}
```

```
c2a/ubc_io.c          Thu Jul  2 18:27:55 1992                    40

/***************************************************************/
/*          independent ubc image read and write functions     */
/***************************************************************/
#include "data.h"

include <stdio.h>
include <math.h>
include <ubc/image.h>
include <ubc/maclib.h> write_ubc_image_file(fname,image,x_physical_dim,x_dim,y_dim,bpp,signed_flag)
        char *fname;
        int *image;
        int x_physical_dim, x_dim, y_dim,bpp,signed_flag;

{
  IMAGE *ifp;
  int x,y;
  char annote[1024];

ifp = iopen(fname,W);
  check_ifp(ifp,fname);

ifp->nrows    = y_dim;
  ifp->ncols    = x_dim;
  ifp->bpp      = bpp;
  ifp->signed   = signed_flag;
  ifp->positive = 1;
  putheader(ifp,annote);

for (y=0; y<y_dim; y++)
     for (x=0;x<x_dim;x++)
        putpix(ifp,image[x+y*x_physical_dim]);

iclose(ifp);
} check_ifp(ifp, file_name)
   IMAGE *ifp;
   char file_name[];
{
  char msg[200];

sprintf(msg, " cannot perform operation with file: %s \n", file_name);

require(ifp,msg);
} read_ubc_image_file(fname,image,x_physical_dim,x_dim_p,y_dim_p,bpp_p,signed_flag
_p)
        char *fname;
        int *image;
        int x_physical_dim,*x_dim_p, *y_dim_p,*bpp_p,*signed_flag_p;

{
  IMAGE *ifp;
  char annote[1024];

int x,y;

ifp = iopen(fname,R);
  check_ifp(ifp,fname);

getheader(ifp,annote);
  *y_dim_p      = ifp->nrows;
  *x_dim_p      = ifp->ncols;
  *bpp_p        = ifp->bpp+1;
  *signed_flag_p = ifp->signed;

/*..Get input image into its array */
  for (y=0;y<*y_dim_p;y++)
```

```
c2a/ubc_io.c          Thu Jul  2 18:27:55 1992              41
        for (x=0;x<*x_dim_p;x++)
            image[x+y*x_physical_dim] = getpix(ifp);

iclose(ifp);
}

/*-----------------------------------------------------------*/ write_ubc_double_image_file(fname,
                    image,x_physical_dim,x_dim,y_dim,bpp,signed_flag)
    char *fname;
    double *image;
    int x_physical_dim, x_dim, y_dim,bpp,signed_flag;

{
  IMAGE *ifp;
  int x,y;
  char annote[1024];
  int value;

ifp = iopen(fname,W);
  check_ifp(ifp,fname);

ifp->nrows    = y_dim;
  ifp->ncols    = x_dim;
  ifp->bpp      = bpp;
  ifp->signed   = signed_flag;
  ifp->positive = 1;
  putheader(ifp,annote);

for (y=0; y<y_dim; y++)
      for (x=0;x<x_dim;x++)
        {
          value = irint(image[x+y*x_physical_dim]);
          if (signed_flag)
            {if (value < -254) value = -254;}
          else
            {if (value < 0) value = 0;} if (value > 255) value = 255;
          putpix(ifp,value);
        }
    iclose(ifp);
} read_ubc_double_image_file(fname,
                    image,x_physical_dim,x_dim_p,y_dim_p)
    char *fname;
    double *image;
    int x_physical_dim,*x_dim_p, *y_dim_p;

{
  IMAGE *ifp;
  char annote[1024];
  int x,y;
  int value;

ifp = iopen(fname,R);
  check_ifp(ifp,fname);

getheader(ifp,annote);
  *y_dim_p   = ifp->nrows;
  *x_dim_p   = ifp->ncols;

/*..Get input image into its array */
  for (y=0;y<*y_dim_p;y++)
      for (x=0;x<*x_dim_p;x++)
        {
          value = getpix(ifp);
          image[x+y*x_physical_dim] = value;
        }
``` c2a/ubc_io.c	Thu Jul  2 18:27:55 1992	42
```
    iclose(ifp);
}
```

```
c2a/ubc_main.c                Thu Jul  2 18:27:55 1992           43 include "data.h"

include <stdio.h>
include <math.h> include <ubc/image.h>
include <ubc/maclib.h>
include <ubc/imlib.h> include <strings.h> char *dfltab[] = {
    "-i","default_input",
    "-o","default_output",
    0 };

main(argc,argv)
     int argc;
     char *argv[];
{
  initargs(argc,argv,dfltab);

help_utility();

init_global_parameters();

c2a();

} help_utility()
{
  if  (flagp("-help"))
    { printf("usage: \n\
c2a \n\
-i,    (default_deriv) \n\
-o,    (default_QP_areas) \n");
      exit(1);
    }
} init_global_parameters()
{
  strcpy(D_fname, keyarg("-i"));
  strcpy(QP_areas_fname, keyarg("-o"));
}
```

```
c2a/util.c          Thu Jul  2 18:27:55 1992           44
#include "data.h"

double_sign(x)
double x;
{
  return (x>0) ? 1:0;
} double double_min(x,y)
double x, y;
{
return (x < y ? x : y);

} double double_max(x,y)
double x, y;
{
return (x > y ? x : y);
}
```

```
db2g/Makefile          Thu Jul  2 18:27:52 1992            45
CC = cc
OBJECTS = db2g_main.o db2g.o CFLAGS =  $(FLAGS) -I/usr/local/include db2g:   $(OBJECTS)
        $(CC)  $(FLAGS) -o db2g $(OBJECTS)   -lubc -lm
``` db2g/db2g.c          Thu Jul  2 18:27:52 1992                    46

```c
define DIM 150      /* Input and output image dimension */ typedef int max_image[DIM*6][DIM*6];

db2g_main(fine_bitmap,
          coarse_bitmap,
          fine_x_dim,
          fine_y_dim,
          fine_offset_x, fine_offset_y,
          factor)
     max_image fine_bitmap, coarse_bitmap;
     int fine_offset_x, fine_offset_y;
     int fine_x_dim, fine_y_dim;
     int factor;
{
  int x, y, x_dim,y_dim;
  int i,j,s;
  int fine_x_start, fine_y_start, fine_x, fine_y;

x_dim = fine_x_dim / factor;
  y_dim = fine_y_dim / factor;

for (x=0;x<x_dim;x++)
     for (y=0;y<y_dim;y++)
       { fine_x_start = x * factor + fine_offset_x;
         fine_y_start = y * factor + fine_offset_y;

s = 0;

for (i=0;i<factor;i++)
            for (j=0;j<factor;j++)
              {
                fine_x = fine_x_start + i;
                fine_y = fine_y_start + j;

if (fine_x >= 0 && fine_x < fine_x_dim &&
                    fine_y >= 0 && fine_y < fine_y_dim)
                  {
                    s += fine_bitmap[fine_x][fine_y];
                  }
              }
         coarse_bitmap[x][y] = s/(factor*factor);

}
}
``` ef/Makefile          Thu Jul  2 18:27:49 1992          47

```
CC = cc
OBJECTS = ef.o  data.o  io.o  ubc_main.o  point.o \
          ubc_io.o CFLAGS = $(FLAGS) -I/usr/local/include ef:     $(OBJECTS) ubc_io.o data.h point.h
        $(CC)  $(FLAGS) -o ef $(OBJECTS)    -lubc -lm $(OBJECTS):     data.h point.h
``` ef/data.c          Thu Jul  2 18:27:49 1992          48

```
#include "data.h"

/* images related data */
max_image MW_neighbors1, MW_neighbors2;
max_image MW_Qdiffs, bdata, results, accumulated_bdata;

int x_dim, y_dim , QP_x_dim, QP_y_dim;
int min_x, max_x, min_y, max_y;

char neighbors_fname[200], bdata_fname[200], results_fname[200];

/* other parameters */
int iterations, margin_x, margin_y;
``` ef/data.h          Thu Jul  2 18:27:51 1992                49

```c
#define DB_OFFSET_UNIT_FACTOR 6.0
define GEO_REGION_HALF_SIZE 1.5 define MAX_INT_ARRAY_DIM 32
define MAX_IMAGE_DIM 600 typedef int max_image[MAX_IMAGE_DIM][MAX_IMAGE_DIM];
typedef int max_int_array[MAX_INT_ARRAY_DIM][MAX_INT_ARRAY_DIM];
typedef char *str;

#define BPP8 8
define BPP1 1 define ONE_COMPONENT_MW 0
define MULTI_COMPONENT_MW 1 define UNSIGNED 0
define SIGNED 1 define LOW_VALUE 0
define HIGH_VALUE 255 define NO_NEIGHBOR 9
define NO_EDGE 8 define EMPTY_LP   1
define LEGAL_LP   2
define ILLEGAL_LP 3 include "point.h"

extern point neighbor_relative_pos[];
extern point neighbor_pos[];

/* images related data */
extern max_image MW_neighbors1, MW_neighbors2;
extern max_image  bdata, results, accumulated_bdata;

extern int x_dim, y_dim , QP_x_dim, QP_y_dim;
extern int min_x, max_x, min_y, max_y;

extern char neighbors_fname[200],
  bdata_fname[200], results_fname[200];

/* other parameters */
extern int iterations, margin_x, margin_y;
``` ef/ef.c          Thu Jul   2 18:27:50 1992              50

```c
#include "data.h"

ef()
{
  read_input_data();
  init_data();

perform_processing();
  output_results();
} init_data()
{
  int x, y;

min_x = margin_x;
  min_y = margin_y;
  max_x = x_dim - 2 - margin_x;
  max_y = y_dim - 2 - margin_y;

for(x=0; x<x_dim; x++)
    for(y=0; y<=y_dim; y++)
      {
        set_MW_result(make_point(x,y), 1);
      }

} perform_processing()
{
  int x, y;
  int result;
  point MW_loc;

for(x=min_x; x<=max_x; x++)
    for(y=min_y; y<=max_y; y++)
      {
        MW_loc = make_point(x,y);
        result = weight_values_along_edge(MW_loc, iterations);
        set_MW_result(MW_loc, result);
      }
} point neighbor_relative_pos[] = {{-1,-1},{0,-1},{1,-1},
                                 {1,0},
                                 {1,1}, {0,1}, {-1,1},
                                 {-1,0}};

point
get_neighbor1_loc(pt)
  point pt;
{
  int n_code;

n_code = MW_neighbors1[pt.x][pt.y];
  if (n_code != NO_NEIGHBOR)
    return point_add(pt,
                     neighbor_relative_pos[n_code]);
  else
    return NULL_POINT;
} point
get_neighbor2_loc(pt)
  point pt;
{
  int n_code;

n_code = MW_neighbors2[pt.x][pt.y];

if (n_code != NO_NEIGHBOR)
    return point_add(pt,
```

```
ef/ef.c            Thu Jul  2 18:27:50 1992            51
                       neighbor_relative_pos[n_code]);
  else
    return NULL_POINT;
} weight_values_along_edge(MW_loc, iterations)
    point MW_loc;
{
  return (bvalues_ANDed_with_neighbors(MW_loc, iterations));
} define DEFAULT_BVALUE 1 bvalues_ANDed_with_neighbors(MW_loc, iterations)
    point MW_loc;
{
  point n_p1, n_p2;

if (null_point(MW_loc))
    return DEFAULT_BVALUE;
  else if (iterations == 0)
    return get_MW_bvalue(MW_loc);
  else
    {
      n_p1 = get_neighbor1_loc(MW_loc);
      n_p2 = get_neighbor2_loc(MW_loc);

return
        (bvalues_ANDed_with_neighbors(MW_loc, iterations - 1) &&
         bvalues_ANDed_with_neighbors(n_p1, iterations - 1) &&
         bvalues_ANDed_with_neighbors(n_p2, iterations - 1));
    }
} get_MW_bvalue(MW_loc)
point MW_loc;
{
  if (legal_MW_loc(MW_loc))
    return bdata[MW_loc.x][MW_loc.y];
  else
    return DEFAULT_BVALUE;
} legal_MW_loc(MW_loc)
point MW_loc;
{
  return
    MW_loc.x >= min_x && MW_loc.x <= max_x &&
    MW_loc.y >= min_y && MW_loc.y <= max_y;
} get_MW_neighbor1(MW_loc)
point MW_loc;
{
  return MW_neighbors1[MW_loc.x][MW_loc.y];
} get_MW_neighbor2(MW_loc)
point MW_loc;
{
  return MW_neighbors2[MW_loc.x][MW_loc.y];
} set_MW_result(MW_loc, result)
point MW_loc;
int result;
{
``` ef/ef.c            Thu Jul  2 18:27:50 1992           52

```
  results[MW_loc.x][MW_loc.y] = result;
}
``` ef/io.c        Thu Jul  2 18:27:50 1992                53

```c
#include "data.h"

include <string.h> str add_suffix(s, suffix)
char s[], suffix[];
{
  char *result_s;
  result_s = (char*)malloc(200);
  strcpy(result_s, s);
  return strcat(result_s , suffix);
} read_input_data()
{
  int bpp, signed_flag;
  read_ubc_image_file(add_suffix(neighbors_fname,"1"), MW_neighbors1,
                      MAX_IMAGE_DIM, &x_dim, &y_dim,
                      &bpp, &signed_flag);

read_ubc_image_file(add_suffix(neighbors_fname,"2"), MW_neighbors2,
                      MAX_IMAGE_DIM, &x_dim, &y_dim,
                      &bpp, &signed_flag);

read_ubc_image_file(bdata_fname, bdata,
                      MAX_IMAGE_DIM, &x_dim, &y_dim,
                      &bpp, &signed_flag);
} output_results()
{
  write_ubc_image_file(results_fname,
                       results,MAX_IMAGE_DIM,
                       x_dim,y_dim,
                       BPP1, UNSIGNED);
}
```

```
ef/point.c          Thu Jul  2 18:27:50 1992                54
#include "data.h"
#include "stdio.h"

include <math.h>

/*--------------------------------------------------------------------*/
/* point.c                                                            */
/*--------------------------------------------------------------------*/
point make_point(x,y)
     int x, y;
{
  point temp;
  temp.x = x;
  temp.y = y;
  return temp;
} point point_add(pt1,pt2)
point pt1,pt2;
{
  return make_point(pt1.x + pt2.x, pt1.y + pt2.y);
} point point_negate(pt)
point pt;
{
  return make_point(- pt.x, - pt.y);
} point point_sub(pt1,pt2)
point pt1,pt2;
{
  return make_point(pt1.x - pt2.x, pt1.y - pt2.y);
} point_dist2(pt1,pt2)
point pt1,pt2;
{
  int dx = pt1.x - pt2.x;
  int dy = pt1.y - pt2.y;

return (dx*dx+dy*dy);
} null_point(pt)
     point pt;
{
  return (pt.x == -1);
} point_equal(pt1,pt2)
point pt1,pt2;
{
  return (pt1.x == pt2.x && pt1.y == pt2.y);
} point empty_point = {-1,-1};
```

```
ef/point.h            Thu Jul  2 18:27:51 1992            55
/*---------------------------------------------------------------*/
/* point.h                                                       */
/*---------------------------------------------------------------*/

/* points */ typedef struct {
  int x;
  int y;
} point;

extern point empty_point;
define NULL_POINT empty_point point make_point();
int point_equal();
point point_add();
``` ef/ubc_io.c          Thu Jul  2 18:27:51 1992                    56

```c
/****************************************************************/
/*          independent ubc image read and write functions      */
/****************************************************************/
#include "data.h"

include <stdio.h>
include <math.h>
include <ubc/image.h>
include <ubc/maclib.h> write_ubc_image_file(fname,image,x_physical_dim,x_dim,y_dim,bpp,signed_flag)
     char *fname;
     int *image;
     int x_physical_dim, x_dim, y_dim,bpp,signed_flag;

{
  IMAGE *ifp;
  int x,y;
  char annote[1024];

ifp = iopen(fname,W);
  check_ifp(ifp,fname);

ifp->nrows    = y_dim;
  ifp->ncols    = x_dim;
  ifp->bpp      = bpp;
  ifp->signed   = signed_flag;
  ifp->positive = 1;
  putheader(ifp,annote);

for (y=0; y<y_dim; y++)
     for (x=0;x<x_dim;x++)
        putpix(ifp,image[x+y*x_physical_dim]);

iclose(ifp);
} check_ifp(ifp, file_name)
  IMAGE *ifp;
  char file_name[];
{
  char msg[200];

sprintf(msg, " cannot perform operation with file: %s \n", file_name);

require(ifp,msg);
} read_ubc_image_file(fname,image,x_physical_dim,x_dim_p,y_dim_p,bpp_p,signed_flag
_p)
     char *fname;
     int *image;
     int x_physical_dim,*x_dim_p,  *y_dim_p,*bpp_p,*signed_flag_p;

{
  IMAGE *ifp;
  char annote[1024];

int x,y;

ifp = iopen(fname,R);
  check_ifp(ifp,fname);

getheader(ifp,annote);
  *y_dim_p      = ifp->nrows;
  *x_dim_p      = ifp->ncols;
  *bpp_p        = ifp->bpp+1;
  *signed_flag_p = ifp->signed;

/*..Get input image into its array */
  for (y=0;y<*y_dim_p;y++)
``` ef/ubc_io.c          Thu Jul  2 18:27:51 1992          57

```c
    for (x=0;x<*x_dim_p;x++)
      image[x+y*x_physical_dim] = getpix(ifp);
}

/*--------------------------------------------------------------*/ write_ubc_double_image_file(fname,
                           image,x_physical_dim,x_dim,y_dim,bpp,signed_flag)
     char *fname;
     double *image;
     int x_physical_dim, x_dim, y_dim,bpp,signed_flag;

{
  IMAGE *ifp;
  int x,y;
  char annote[1024];
  int value;

ifp = iopen(fname,W);
  check_ifp(ifp,fname);

ifp->nrows   = y_dim;
  ifp->ncols   = x_dim;
  ifp->bpp     = bpp;
  ifp->signed  = signed_flag;
  ifp->positive = 1;
  putheader(ifp,annote);

for (y=0; y<y_dim; y++)
    for (x=0;x<x_dim;x++)
      {
        value = irint(image[x+y*x_physical_dim]);
        if (signed_flag)
          {if (value < -254) value = -254;}
        else
          {if (value < 0) value = 0;} if (value > 255) value = 255;
        putpix(ifp,value);
      }
  iclose(ifp);
} read_ubc_double_image_file(fname,
                          image,x_physical_dim,x_dim_p,y_dim_p)
     char *fname;
     double *image;
     int x_physical_dim,*x_dim_p, *y_dim_p;

{
  IMAGE *ifp;
  char annote[1024];
  int x,y;
  int value;

ifp = iopen(fname,R);
  check_ifp(ifp,fname);

getheader(ifp,annote);
  *y_dim_p    = ifp->nrows;
  *x_dim_p    = ifp->ncols;

/*..Get input image into its array */
  for (y=0;y<*y_dim_p;y++)
    for (x=0;x<*x_dim_p;x++)
      {
        value = getpix(ifp);
        image[x+y*x_physical_dim] = value;
      }
}
``` ef/ubc_io.c          Thu Jul  2 18:27:51 1992          58

```
read_vector_from_text_file(V_file_name, V, length_p)
     int V[];
     int *length_p;
     char V_file_name[];
{
  int x;

FILE *fp;
  fp = fopen(V_file_name, "r");
  if (fp == NULL)
    {
       fprintf(stderr,"cannot read text file %s \n", V_file_name);
       exit(1);
    } fscanf(fp,"%d",length_p);

for(x=0; x < *length_p; x++)
    fscanf(fp,"%d",&V[x]);
}
``` ef/ubc_main.c          Thu Jul  2 18:27:51 1992          59

```c
#include "data.h"

include <stdio.h>
include <math.h> include <ubc/image.h>
include <ubc/maclib.h>
include <ubc/imlib.h> include <strings.h> char *dfltab[] = {
    "-neighbors","default_neighbors",
    "-bdata",    "default_bdata",
    "-results",  "default_results", "-iterations", "2", "-margin_x", "0",
    "-margin_y", "0",
     0 };

main(argc,argv)
     int argc;
     char *argv[];
{
  initargs(argc,argv,dfltab);

help_utility();

init_global_parameters();

ef();

}
help_utility()
{
  if (flagp("-help"))
    {
      printf("usage: \n\
ef \n\
-neighbors, (default_neighbors) \n\
-bdata,     (default_bdata) \n\
-results,   (default_results) \n\
-iterations,   (2), \n\
-margin_x,  0, \n\
-margin_y,  0, \n");

exit(1);
    }
}
init_global_parameters()
{
  strcpy(neighbors_fname, keyarg("-neighbors"));
  strcpy(bdata_fname, keyarg("-bdata"));
  strcpy(results_fname, keyarg("-results"));

iterations = atoi(keyarg("-iterations"));

margin_x = atoi(keyarg("-margin_x"));
  margin_y = atoi(keyarg("-margin_y"));
}
``` ge/Makefile          Thu Jul  2 18:27:59 1992          60

```
CC = cc
OBJECTS = main.o data.o db.o  point.o util.o ubc_main.o \
#         ditsnce.o filter.c region.o offset.o
CFLAGS =    $(FLAGS) -I/usr/local/include ge:     $(OBJECTS)
        $(CC)  $(FLAGS) -o ge $(OBJECTS)   -lubc -lm $(OBJECTS):     data.h
```

```
ge/data.c           Thu Jul  2 18:27:59 1992         61
#include "data.h"

/*----------*/
/* bitmaps */
/*----------*/ int x_dim, y_dim;
   int db_min_x, db_min_y, db_max_x, db_max_y;
   int db_analyzing_min_x, db_analyzing_min_y,
       db_analyzing_max_x, db_analyzing_max_y;
   int db_reporting_min_x, db_reporting_min_y,
       db_reporting_max_x, db_reporting_max_y;

max_image edge_pts;
   max_image regions;

/*-----------------*/
/* chains and pts */
/*-----------------*/ point empty_point = {-1,-1};

point zero_vector = {0,0};

chain_features chns_directions, chns_polarities,
      chns_distances, chns_m2f, chns_m2dat;

/*-----------------*/
/* some tables    */
/*-----------------*/ point neighbor_pos[] = {{-1,-1},{0,-1},{1,-1},
                           {-1,0}, {1,0},
                           {-1,1}, {0,1}, {1,1}};

point direction_step_vectors[4] = {
      /* 0  -- */ ( 0,-1),
      /* 1  /  */ {-1,-1},
      /* 2  |  */ {-1, 0},
      /* 3  \  */ {-1, 1}};

int chain_code_table[3][3] = {{3,0,1},{2,0,2},{1,0,3}};
/*++++++++++++++++++++++
              y -1  0  1
         -------
     -1 | 3  0  1
   x  0 | 2     2
      1 | 1  0  3
   ++++++++++++++++++++++*/ point global_offset_vector;

/* db processing rectangle borders */
   int db_min_x, db_min_y, db_max_x, db_max_y;
/*-----------------------------------------------------------------*/
```

```
ge/data.c           Thu Jul  2 18:27:59 1992                    62

/*-------------------------------*/
/* some access functions         */
/*-------------------------------*/
point get_point(pt_index)
int pt_index;
{
  return chns_pts->points[pt_index];
} point get_vertex_point(v_index)
int v_index;
{
  return v_chns_pts->points[v_index];
} point_distance(pt_index)
     int pt_index;
{
  return chns_distances[pt_index];
} point_polarity(pt_index)
     int pt_index;
{
  return chns_polarities[pt_index];
} point_direction(pt_index)
     int pt_index;
{
  return chns_directions[pt_index];
} point_m2f(pt_index)
     int pt_index;
{
  return chns_m2f[pt_index];
} set_point_m2f(pt_index,value)
     int pt_index, value;
{
  chns_m2f[pt_index] = value;
} point_m2dat(pt_index)
     int pt_index;
{
  return chns_m2dat[pt_index];
} set_point_m2dat(pt_index,value)
     int pt_index, value;
{
  chns_m2dat[pt_index] = value;
} set_point_distance(pt_index,value)
     int pt_index, value;
{
  chns_distances[pt_index] = value;
} set_unit_offset_vector(start_pt_index,offset_vector)
int start_pt_index;
point offset_vector;
{
  set_point_m2f(start_pt_index,offset_vector.x);
  set_point_m2f(start_pt_index+1,offset_vector.y);
}
``` ge/data.c          Thu Jul  2 18:27:59 1992          63

```
point unit_offset_vector(start_pt_index)
int start_pt_index;
{
  return make_point(point_m2f(start_pt_index),
                    point_m2f(start_pt_index+1));
} set_point_polarity(pt_index,value)
     int pt_index, value;
{
  chns_polarities[pt_index] = value;
} set_point_direction(pt_index,value)
     int pt_index, value;
{
  chns_directions[pt_index] = value;
} image_point_value(pt)
     point pt;
{
  return image_bitmap[pt.x][pt.y];
}
```

```
ge/data.h           Thu Jul  2 18:28:02 1992           64
define UNDEFINED_DIRECTION 8 define POSITIVE 1
define NEGATIVE 0 define LOCAL_MODE 0
define GLOBAL_MODE 1 define IMAGE_DB_PIXEL_RATIO 6
define PI    3.141592653589793238
#define PI2   6.28318530716
#define TRUE  1
#define FALSE 0
#define MAIN_CHAIN_LENGTH 5
#define UNDEFINED_LENGTH 100
define HALF_CUT_LENGTH 20 define CHAIN_PROCESSING_STEP_SIZE 6
define UNIT_SIZE CHAIN_PROCESSING_STEP_SIZE
#define ANALYZING_MARGIN_SIZE 12
#define REPORTING_MARGIN_SIZE 18
``` ge/data.h          Thu Jul  2 18:28:02 1992

```c
/*---------------------------------------------------------------*/
/*      m2d data structures                                      */
/*---------------------------------------------------------------*/

/* points */ typedef struct {
  int x;
  int y;
} point;

#define MAX_CHAIN_LENGTH  16000
define MAX_CHAIN_INDEXES 100 typedef struct {
  int length;
  point points[MAX_CHAIN_LENGTH];
} chain_element;

typedef chain_element *chain;

typedef struct {
  int length;
  int values[MAX_CHAIN_LENGTH];
} chain_indexes_element;

typedef chain_indexes_element *chain_indexes;

typedef int chain_features[MAX_CHAIN_LENGTH];

/* globals */
extern chain_element chn1_el,chn2_el,chn_el, chns_el;
extern chain_indexes_element chns_indexes_el;

extern chain chns_pts;
extern chain_indexes chns_indexes;
extern chain v_chns_pts;
extern chain_indexes v_chns_indexes;

#define for_each_chain(chn_index) for(chn_index=0; \
                              chn_index < chns_indexes->length; \
                              chn_index++)

#define for_each_point(chn_index,pt_index) \
   for(pt_index=chns_indexes->values[chn_index];\
       pt_index<chns_indexes->values[chn_index + 1]-1;\
       pt_index++)

#define for_each_v_chain(v_chn_index) for(v_chn_index=0; \
                              v_chn_index < v_chns_indexes->length; \
                              v_chn_index++)

#define for_each_vertex(v_chn_index,vertex_index) \
   for(vertex_index=v_chns_indexes->values[v_chn_index];\
       vertex_index<v_chns_indexes->values[v_chn_index + 1] - 1;\
       vertex_index++)

/*----------*/
/* bitmaps */
/*----------*/ extern int x_dim, y_dim;
extern int db_min_x, db_min_y, db_max_x, db_max_y;
extern int db_analyzing_min_x, db_analyzing_min_y,
    db_analyzing_max_x, db_analyzing_max_y;
extern int db_reporting_min_x, db_reporting_min_y,
    db_reporting_max_x, db_reporting_max_y;

#define  DIM  130      /* Input and output image dimension */
``` ge/data.h          Thu Jul  2 18:28:02 1992                  66

```
typedef int max_image[DIM*6][DIM*6];
typedef int min_image[DIM][DIM];

extern max_image edge_pts;
extern max_image regions;

#define EDGE_TYPE      1
#define C135_TYPE      2
#define C90_TYPE       3
#define C45_TYPE       4
#define D_C135_TYPE    5
#define D_C90_TYPE     6
#define D_OTHER_TYPE   7
define OTHER_TYPE     8 define is_D_angle_type(type) (type >= 4 && type <= 6)
/*--------------------*/
/*  chains and pts   */
/*--------------------*/ extern point empty_point;
define NULL_POINT empty_point extern point zero_vector;

define ZERO_VECTOR zero_vector extern chain_features chns_directions, chns_polarities,
   chns_distances, chns_m2f, chns_m2dat;

/*-----------------*/
/* some tables    */
/*-----------------*/ extern point neighbor_pos[];

extern point direction_step_vectors[4];

extern int chain_code_table[3][3];

/*--------------------------*/
/* and some functions       */
/*--------------------------*/ point make_point();

point point_add();
point point_negate();
point point_sub();
point first_chain_point();

double point_line_distance();

point get_point();
point get_vertex_point();
point choose_next_chain_point();
point one_neighbor_point();

point unit_offset_vector();
```

```
ge/data.h          Thu Jul  2 18:28:02 1992          67

/*----------------------------------------*/
/* parameter related global variables : */
/*----------------------------------------*/ extern max_image db_bitmap, image_bitmap;
extern int image_x_dim, image_y_dim,
  db_x_dim, db_y_dim;

extern int
  db_x,
  db_y,
  db_w,
  db_h,
  initial_offset_x,
  initial_offset_y,
  initial_alignment_flag,
  initial_alignment_step_size,
  initial_alignment_step_number,
  debug_flag,
  output_global_offset_flag,
  output_local_defects_flag,
  output_global_defects_flag,
  output_corrected_db_map_flag;

extern point global_offset_vector;

/* db processing rectangle borders */
extern int   db_min_x,  db_min_y,  db_max_x,  db_max_y;
``` ge/data.h          Thu Jul  2 18:28:02 1992                68

```
/*--------------------------------------------------------------------*/
/*   chain units processing definitions                              */
/*--------------------------------------------------------------------*/ point compute_unit_local_offset_vector();
point direction_to_x_y_vector ();

/*--------------------------------------------------------------------*/
/* chains units access functions                                     */
/*--------------------------------------------------------------------*/ define for_each_chains_unit(unit_start_pt_index, chn_index, chn_min_pt_index,ch
n_max_pt_index, chn_circular_flag)\
   for_each_chain (chn_index) \
      for(chn_min_pt_index = chain_start_point_index(chn_index), \
          chn_max_pt_index = chain_end_point_index(chn_index), \
          chn_circular_flag = is_circular_chain(chn_index), \
          unit_start_pt_index = chn_min_pt_index;\
          unit_start_pt_index < chn_max_pt_index - UNIT_SIZE;\
          unit_start_pt_index += UNIT_SIZE)

#define set_unit_local_offset_vector_x(unit_start_pt_index,value) \
   set_point_m2f(unit_start_pt_index, value);

#define set_unit_local_offset_vector_y(unit_start_pt_index,value) \
   set_point_m2f(unit_start_pt_index+1, value);

#define set_unit_abs_area(unit_start_pt_index,value) \
   set_point_m2f(unit_start_pt_index+3, value)

#define set_unit_max_cut(unit_start_pt_index,value) \
   set_point_m2f(unit_start_pt_index+4, value)

#define set_unit_geometrical_type(unit_start_pt_index,value) \
   set_point_m2f(unit_start_pt_index+5, value);

#define get_unit_local_offset_vector_x(unit_start_pt_index)\
   point_m2f(unit_start_pt_index)

#define get_unit_local_offset_vector_y(unit_start_pt_index)\
   point_m2f(unit_start_pt_index+1);

#define get_unit_abs_area(unit_start_pt_index) \
   point_m2f(unit_start_pt_index+3)

#define get_unit_max_cut(unit_start_pt_index) \
   point_m2f(unit_start_pt_index+4)

#define get_unit_geometrical_type(unit_start_pt_index) \
   point_m2f(unit_start_pt_index+5);
```

```
ge/db.c              Thu Jul  2 18:28:00 1992              69
#include "data.h"

include <math.h> define MIN_CHAIN_LENGTH 5
define MIN_DIRECTION_NEIGHBORHOOD 3
#define PT_DISTANCE_THRESHOLD 2
int direction_freqs[4], neighborhood_directions[4], neighborhood_polarities[4];

int fd_computation_radius = 12;
point X_VEC = {1,0};

init_db_processing()
{
  db_min_x = max(1,db_x);
  db_min_y = max(1,db_y);
  db_max_x = min(db_x+db_w, db_x_dim-1);
  db_max_y = min(db_y+db_h, db_y_dim-1);
}

/*---------------------------------------------------------------*/
/*            generate edge bitmap                              */
/*---------------------------------------------------------------*/ generate_edge_points()
{
  int x, y;

for (x = db_min_x; x < db_max_x; x++)
      for (y = db_min_y; y < db_max_y; y++)
        if (db_bitmap[x][y]) /* look for 1 in 4-neighborhood of 0 */
          if (! db_bitmap[x-1][y] ||
              ! db_bitmap[x+1][y] ||
              ! db_bitmap[x][y-1] ||
              ! db_bitmap[x][y+1] )
            edge_pts[x][y] = 1;
}
``` ge/db.c          Thu Jul  2 18:28:00 1992                70

```c
/*--------------------------------------------------------------------------*/
/*             generate a chain description                                 */
/*--------------------------------------------------------------------------*/ generate_chains()
{
  point start_pt;

chain chn;
  chn = &chn_el;

start_pt = make_point(db_min_x, db_min_y);
  advance_start_point(&start_pt);

while (! null_point(start_pt))
     {
        trace_containing_chain(start_pt,chn);
        if (chn->length > MIN_CHAIN_LENGTH)
          add_chain_to_chains(chn,chns_pts,chns_indexes);
        advance_start_point(&start_pt);
     }
}

/*----------------------------*/
/*  find start tracing pt     */
/*----------------------------*/ advance_start_point(start_pt_p)
  point *start_pt_p;
{
  int x, y;

/* search to end of current row */
  y = start_pt_p->y;
  for (x = start_pt_p->x; x < db_max_x; x++)
      if (valid_start_point(x,y))
         {
            *start_pt_p = make_point(x,y);
            return;
         }

/* search next rows */
  for (y = start_pt_p->y + 1; y < db_max_y ; y++)
     for (x = db_min_x; x < db_max_x; x++)
       if (valid_start_point(x,y))
          {
             *start_pt_p = make_point(x,y);
             return;
          }

/* no appropriate point found */
  *start_pt_p = NULL_POINT;
} valid_start_point(x,y)
int x,y;
{
  return edge_pts[x][y];
}

/*--------------------------------------------------------------------------*/
/*  trace a chain from a given point                                        */
/*--------------------------------------------------------------------------*/ trace_containing_chain(start_pt,chn)
     point start_pt;
     chain chn;
{
  chain chn1 = &chn1_el, chn2 = &chn2_el;
```

```
ge/db.c            Thu Jul  2 18:28:00 1992              71 clear_chain(chn1);
    clear_chain(chn2);

trace_chain(start_pt, chn1);
    trace_chain(start_pt, chn2);

unite_chains(chn1,chn2,chn);
} trace_chain(start_pt,result_chn)
        point start_pt;
        chain result_chn;
{ point pt;

for (pt = start_pt;
        ! null_point(pt);
        pt = choose_next_chain_point(pt))
    {
      add_chain_point(result_chn,pt);
      supress_point(pt);
    }
}

/*--------------------------------------*/
/*       choose continuation pt         */
/*--------------------------------------*/ point choose_next_chain_point(pt)
        point pt;
{
  return one_neighbor_point(pt);
} supress_point(pt)
        point pt;
{
  edge_pts[pt.x][pt.y] = 0;
} active_point(pt)
        point pt;
{
  return edge_pts[pt.x][pt.y];
}

/*--------------------------------*/
/* some utility functions       */
/*--------------------------------*/ point one_neighbor_point(pt)
        point pt;
{
  point neighbor_pt;
  int n;

for(n = 0; n < 8 ; n++)
    {
      neighbor_pt = point_add(neighbor_pos[n],pt);
      if (active_point(neighbor_pt))
        return neighbor_pt;
    } return NULL_POINT;
}
``` ge/db.c          Thu Jul  2 18:28:00 1992                72

```c
/*--------------------------------------------------------------*/
/*      find geometrical features                               */
/*--------------------------------------------------------------*/ find_chain_features()
{
  compute_chains_directions_and_polarities();
  smooth_chains_directions();  /* why needed? */ segment_chains();
  process_vertices();

find_chains_geometrical_features();
} compute_chains_directions_and_polarities()
{
  int chn_index;

for_each_chain (chn_index)
     compute_chain_directions_and_polarities(chn_index);
} compute_chain_directions_and_polarities(chn_index)
     int chn_index;
{
  int pt_index;
  point pt,prev_pt;
  int direction;
  prev_pt = first_chain_point(chn_index);

for_each_point(chn_index,pt_index)
    {
      pt = get_point(pt_index);
      direction = find_point_direction(pt,prev_pt);
      set_point_direction(pt_index,direction);
      set_point_polarity(pt_index, find_edge_point_polarity(pt, direction));
      prev_pt  = pt;
    }
} smooth_chains_directions()
{
  int polarity,direction,prev_polarity,prev_direction;
  int pt_index;
  int chn_index;
  int first_pt_index;

for_each_chain (chn_index)
    {
      first_pt_index = first_chain_point_index(chn_index);
      prev_polarity = point_polarity(first_pt_index);
      prev_direction = point_direction(first_pt_index);

for_each_point(chn_index,pt_index)
        {
           direction = point_direction(pt_index);
           polarity  = point_polarity(pt_index);

if (direction != prev_direction)
            {
              if (! pt_has_similar_direction_neighbors(pt_index,direction))
                {
                  set_point_direction(pt_index, prev_direction);
                  set_point_polarity(pt_index, prev_polarity);
                }
            } else /* direction is the same */
            if (polarity != prev_polarity)
              { printf("inconsistent polaritiy for pt=");
``` ge/db.c            Thu Jul  2 18:28:00 1992             73

```
            print_point(get_point(pt_index));
         } prev_direction = direction;
       prev_polarity = polarity;

}

}
} pt_has_similar_direction_neighbors(pt_index, direction)
int pt_index, direction;
{
  int n_pt_index, n_direction;

for (n_pt_index=pt_index+1; n_pt_index < pt_index + MIN_DIRECTION_NEIGHBORHOOD;
       n_pt_index++)
    {
      n_direction = point_direction(n_pt_index);
      if (n_direction != direction)
        return FALSE;
    }
  return TRUE;
} find_edge_point_polarity(pt,direction)
point pt;
{
  point check_point;
  check_point = point_add(pt,direction_step_vectors[direction]);
  if (db_bitmap[check_point.x][check_point.y])
    return POSITIVE;
  else return NEGATIVE;
} find_point_direction(pt1,pt2)
point pt1, pt2;
{
  point diff;
  diff = point_sub(pt1,pt2);
  return chain_code_table[diff.x + 1][diff.y + 1];
}
``` ge/db.c          Thu Jul  2 18:28:00 1992                    74

```
/*------------------------------------------------------------------------*/
/*              geometical feature detection                              */
/*------------------------------------------------------------------------*/ find_chains_geometrical_features()
{
  int type;
  int chn_index;

int min_pt_index, max_pt_index, circular_flag;
  int v_min_pt_index, v_max_pt_index;
  int next_v_index, pt_index;
  int unit_type;
  point pt, next_v_pt;
  int unit_start_pt_index;
  char type_name[50];

/* init unit types */
  for_each_chains_unit(unit_start_pt_index,
                       chn_index,
                       min_pt_index,
                       max_pt_index,
                       circular_flag)
    set_unit_geometrical_type(unit_start_pt_index, EDGE_TYPE);

/* change unit types near vertices */
  for_each_chain (chn_index)
    {
      min_pt_index = chain_start_point_index(chn_index);
      max_pt_index = chain_end_point_index(chn_index);
      v_min_pt_index = v_chain_start_point_index(chn_index);
      v_max_pt_index = v_chain_end_point_index(chn_index);

next_v_index = v_min_pt_index;
      next_v_pt = get_vertex_point(next_v_index);

for (unit_start_pt_index = min_pt_index;
           unit_start_pt_index <= max_pt_index - UNIT_SIZE;
           unit_start_pt_index += UNIT_SIZE)
        {
          for (pt_index = unit_start_pt_index; pt_index < unit_start_pt_index+UN
IT_SIZE;
               pt_index++)
            {
              pt = get_point(pt_index);
              if (point_equal(next_v_pt, pt))
                {
                  unit_type = get_vertex_type(next_v_index);
                  next_v_index ++;
                  next_v_pt = get_vertex_point(next_v_index);

if (unit_type != EDGE_TYPE)
                    {
                      set_unit_geometrical_type(unit_start_pt_index,
                                                unit_type);

if (unit_start_pt_index > min_pt_index)    /* add cyclic ca
se ? */
                        set_unit_geometrical_type(unit_start_pt_index-UNIT_SIZE,
 unit_type);
                      if (unit_start_pt_index <= max_pt_index - 2 * UNIT_SIZE)
                        set_unit_geometrical_type(unit_start_pt_index+UNIT_SIZE,
 unit_type);
                    }
                }
            }
        }
    }
}
``` ge/db.c         Thu Jul  2 18:28:00 1992                75

```
/****************************************************************/
/*           chains segmentation                                */
/****************************************************************/

/* global data structures */
chain_element v_chn_el;
chain_element v_chns_el;
chain_indexes_element v_chns_indexes_el;

chain v_chn = &v_chn_el;
chain v_chns_pts = &v_chns_el;
chain_indexes v_chns_indexes = &v_chns_indexes_el;
chain_features v_chns_f1, v_chns_f2, v_chns_f3;

/****************************************************/
set_vertex_corr_pt_index(v_index, pt_index)
{
  v_chns_f1[v_index] = pt_index;
} set_vertex_type(v_index, type)
{
  v_chns_f2[v_index] = type;
} set_vertex_polarity(v_index, polarity)
{
  v_chns_f3[v_index] = polarity;
} get_vertex_corr_pt_index(v_index)
{
  return v_chns_f1[v_index];
} get_vertex_type(v_index)
{
  return v_chns_f2[v_index];
} get_vertex_polarity(v_index)
{
  return v_chns_f3[v_index];
}

/****************************************************/
add_vertex(v_pt, v_chn)
point v_pt;
chain v_chn;
{
  add_chain_point(v_chn, v_pt);
} add_v_chain(v_chn, v_chns_pts, v_chns_indexes)
chain v_chn, v_chns_pts;
chain_indexes v_chns_indexes;
{
  add_chain_to_chains(v_chn, v_chns_pts, v_chns_indexes);
} clear_v_chain(v_chn)
chain v_chn;
{
  clear_chain(v_chn);
} clear_v_chains(v_chns_pts, v_chns_indexes)
chain v_chns_pts;
chain_indexes v_chns_indexes;
{
  v_chns_pts->length = 0;
  v_chns_indexes->length = 0;
}
```

```
vector_angle(v1,v2)
point v1, v2;
{
  double ul_x = v1.x, ul_y = v1.y, u2_x = v2.x, u2_y = v2.y;
  double vcross, vdot, rad;

vcross = ul_x * u2_y - ul_y * u2_x;
  vdot = ul_x * u2_x + ul_y * u2_y;

rad = atan(vcross / vdot);

if (vdot < 0)
    rad += PI;

if (rad > PI)
    rad -= PI2;

return irint(rad / PI * 180);
}

/*----------------------------------------------------------------*/ segment_chains()
{
  int chn_index;

clear_v_chains(v_chns_pts,v_chns_indexes);
  for_each_chain(chn_index)
    {
      segment_chain(chn_index,v_chn);
      add_v_chain(v_chn,v_chns_pts,v_chns_indexes);
    }
} segment_chain(chn_index,v_chn)
int chn_index;
chain v_chn;
{
  int chn_start_pt_index, last_vertex_index;
  int chn_end_pt_index;

int current_pt_index, end_of_chn_flag;
  int continue_flag;
  double distance;
  point current_pt, last_vertex_pt;
  int break_pt_index;
  double threshold = PT_DISTANCE_THRESHOLD;
  int delta;

clear_v_chain(v_chn);

chn_start_pt_index = chain_start_point_index(chn_index);
  chn_end_pt_index = chain_end_point_index(chn_index);

last_vertex_index = chn_start_pt_index;
  last_vertex_pt = get_point(last_vertex_index);

add_vertex(last_vertex_pt,v_chn);

current_pt_index = chn_start_pt_index + 4;

end_of_chn_flag = 0;
  while (! end_of_chn_flag)
    {
      current_pt = get_point(current_pt_index);

/* a different criterion may be applied here */
      delta = max(3, irint((current_pt_index - last_vertex_index)*0.4));
      distance = point_line_distance(current_pt,
                                     last_vertex_pt,
``` ge/db.c            Thu Jul  2 18:28:00 1992              77

```c
                                  get_point(last_vertex_index + delta));

if (fabs(distance) < threshold)
          continue_flag = 1;
        else continue_flag = 0;

if (continue_flag == 1)
           {
              current_pt_index++;
           }
        else /* set a break point */
           {
              break_pt_index = find_optimal_break_point(current_pt_index,
                                              last_vertex_index);
              add_vertex(get_point(break_pt_index),v_chn);

last_vertex_index = break_pt_index;
              last_vertex_pt = get_point(last_vertex_index);
              current_pt_index = break_pt_index+4;
           } if (current_pt_index >= chn_end_pt_index)
           {
              add_vertex(get_point(chn_end_pt_index),v_chn);
              end_of_chn_flag = 1;
           }
      }
} find_optimal_break_point(current_index, last_vertex_index)
int current_index, last_vertex_index;
{
  /* go backward until a direction change is observed */ int i;
  int current_index_search_distance = 3;
  i = current_index+1;
  while (i> current_index - current_index_search_distance &&
         i > last_vertex_index &&
         point_direction(i) == point_direction(i-1))
    i--;

return i-1;
}

/*----------------------------------------------------------------*/
point NULL_PT = {0,0};

process_vertices()
{
  int v_chn_index;
  int start_index, end_index;
  int v_index;
  int circular_flag;

int prev_d, next_d;
  int prev_v_dist;

int v_angle, prev_v_angle;
  int v_type;
  int segment_orientation;

char type_name[50];
  point v_pt, prev_v_pt, next_v_pt;

for_each_v_chain(v_chn_index)
    { start_index =  v_chain_start_point_index(v_chn_index);
      end_index = v_chain_end_point_index(v_chn_index);
      circular_flag = are_points_neighbors(get_vertex_point(start_index),
                                  get_vertex_point(end_index));

prev_v_angle = 0;
``` ge/db.c        Thu Jul  2 18:28:00 1992                    78

```
        for(v_index= start_index;
            v_index <= end_index;
            v_index++)
          {
            v_pt = get_vertex_point(v_index);

if (v_index == start_index)
               {
                 if (circular_flag)
                    prev_v_pt = get_vertex_point (end_index - 1);
                 else prev_v_pt = NULL_PT;
               }
            else
              prev_v_pt = get_vertex_point(v_index-1);

if (v_index == end_index)
               {
                 if (circular_flag)
                    next_v_pt = get_vertex_point(start_index + 1)  ;
                 else next_v_pt = NULL_PT;
               }
            else
              next_v_pt = get_vertex_point(v_index+1);

v_angle = find_vertex_angle(v_pt, prev_v_pt, next_v_pt);

prev_v_dist = sqrt((double) point_dist2(v_pt, prev_v_pt));

v_type = determine_vertex_geometrical_type(v_angle, prev_v_angle,
                                                      prev_v_dist);

set_vertex_type (v_index, v_type);
            if (is_D_angle_type(v_type))
               set_vertex_type(v_index-1, v_type);

prev_v_angle = v_angle;

}
      }
  } are_points_neighbors(pt1, pt2)
point pt1, pt2;
{
  return point_dist2(pt1,pt2) <= 4;
} is_null_point(pt)
point pt;
{
  return pt.x == 0 && pt.y == 0;
} find_vertex_angle(v_pt, prev_v_pt, next_v_pt)
point v_pt, prev_v_pt, next_v_pt;
{
  int vertex_angle=0;

if (! (is_null_point(next_v_pt) || is_null_point(prev_v_pt)))
     vertex_angle = rounded_angle(vector_angle(point_sub(next_v_pt,v_pt),
                                               point_sub(prev_v_pt,v_pt)));

return vertex_angle;
} define ROUNDING_UNITS 15
```

```
ge/db.c          Thu Jul  2 18:28:00 1992                    79
define VERTEX_PAIR_MAX_DISTANCE 30 rounded_angle(a)
int a;
{
   return ROUNDING_UNITS * irint((double) a / ROUNDING_UNITS);
} determine_vertex_geometrical_type(v_angle, prev_v_angle, prev_v_dist)
int v_angle, prev_v_angle, prev_v_dist;
{
   int type;
   int abs_v_angle, abs_prev_v_angle;

if (v_angle == 180)
      type = EDGE_TYPE;
   else if (v_angle == 0)
      type = OTHER_TYPE;
   else if (prev_v_angle == 180 || prev_v_dist > VERTEX_PAIR_MAX_DISTANCE)
      {
         abs_v_angle = abs(v_angle);

if (abs_v_angle >= 135)
            type = C135_TYPE;
         else if (abs_v_angle >= 90)
            type = C90_TYPE;
         else
            type = C45_TYPE;
      }
   else
      {
         abs_v_angle = abs(v_angle);
         abs_prev_v_angle = abs(prev_v_angle);

if (abs_v_angle == 90 || abs_prev_v_angle == 90)
            type = D_C90_TYPE;
         else if (abs_v_angle == 135 && abs_prev_v_angle == 135)
            type = D_C135_TYPE;
         else type = D_OTHER_TYPE;
      } return type;
}

/*----------------------------------------------------------
   find distance of pt0, from the line that
   connects pt1 and pt2
------------------------------------------------------------*/
double point_line_distance(pt0, pt1, pt2)
point pt0, pt1, pt2;
{
   double c0,c1,A,B,C,distance;

/*==========================================================
      The distance of point (x0, y0) from the line
         A*x + B*y + C = 0
      is given by:

abs( (A*x0 + b*y0 + C) / sqrt(A**2 + B**2))

Equation of the line from (x1,y1) to (x2,y2) :
            (y-y1)(x2-x1) - (x-x1)(y2-y1) = 0

==========================================================*/ c0 = pt2.x - pt1.x;
   c1 = pt2.y - pt1.y;

A = -c1;
   B = c0;
   C = - pt1.y * c0 + pt1.x * c1;

distance = fabs((A * pt0.x + B * pt0.y + C) / sqrt(A*A+B*B));
```

```
ge/db.c          Thu Jul  2 18:28:00 1992                    80 return(distance);
} set_geometry_data()
{
  set_geometry_data_from_chains_units();
} set_geometry_data_from_chains_units()
{
  int unit_start_pt_index, chn_index,
  chn_min_pt_index,
  chn_max_pt_index, chn_circular_flag;

for_each_chains_unit(unit_start_pt_index,
                       chn_index,
                       chn_min_pt_index,
                       chn_max_pt_index,
                       chn_circular_flag)
    set_geometry_data_from_chain_unit(unit_start_pt_index,
                              chn_min_pt_index, chn_max_pt_index);
} set_geometry_data_from_chain_unit(unit_start_pt_index, min_pt_index, max_pt_inde
x)
     int unit_start_pt_index, min_pt_index, max_pt_index;
{
  int geometrical_type, abs_area, max_cut;
  point local_offset_vector;
  int total_area;
  point pt;
  int pt_index;

geometrical_type = get_unit_geometrical_type(unit_start_pt_index);

for (pt_index = unit_start_pt_index; pt_index < unit_start_pt_index+UNIT_SIZE;
       pt_index++)
    {
      if (pt_index >= min_pt_index && pt_index < max_pt_index)
        {
          pt = get_point(pt_index);

set_pixel_geometrical_type(pt.x, pt.y, geometrical_type);
        }
    }
} set_pixel_geometrical_type(db_x, db_y, geometrical_type)
int db_x, db_y, geometrical_type;
{
  int image_x, image_y;

image_x = floor (db_x / (double) IMAGE_DB_PIXEL_RATIO);
  image_y = floor (db_y / (double) IMAGE_DB_PIXEL_RATIO);

image_bitmap[image_x][image_y] = geometrical_type;
}
```

```
ge/filter.c          Thu Jul  2 18:28:00 1992                    81 include "data.h"
include <stdio.h>
include <math.h>
#include <string.h>

/*--------------------------------------------------------------------*/
/*      filter chain units                                            */
/*--------------------------------------------------------------------*/

/* some data structures (may be moved to somewhere else) */ define GEOMETRICAL_TYPES_NUMBER 8
define MODES_NUMBER 2 define MAX_CUT 0
define ABS_AREA 1 int threshold_table[GEOMETRICAL_TYPES_NUMBER][2];
int modes_threshold_table[MODES_NUMBER][GEOMETRICAL_TYPES_NUMBER][2] = {
  {            /*       LOCAL_MODE       */    /* check values */
               /* max cut      max area  */
    /* EDGE    */ {   2,           20     },
    /* C135    */ {   4,           40     },
    /* C90     */ {   6,           60     },
    /* C45     */ {   6,           60     },
    /* D_C135  */ {   6,           60     },
    /* D_C90   */ {   6,           60     },
    /* D_OTHER */ {   6,           60     },
    /* OTHER   */ {   6,           60     }
               },
  {            /*       GLOBAL_MODE      */
               /* max cut      max area  */
    /* EDGE    */ {   4,           40     },
    /* C135    */ {   6,           60     },
    /* C90     */ {   6,           60     },
    /* C45     */ {   6,           60     },
    /* D_C135  */ {   6,           60     },
    /* D_C90   */ {   6,           60     },
    /* D_OTHER */ {   6,           60     },
    /* OTHER   */ {   6,           60     }
               }};

char* geometrical_type_names[] = {
  "edge",
  "135 degree corner",
  "90 degree corner",
  "45 degree corner",
  "double 135 corner",
  "double 90 corner",
  "other double corner",
  "other"
};

filter_defects(mode)
{ init_threshold_table(mode);

init_db_analyzing_region();
  init_defect_location_file(mode);

filter_chains_units();

close_defect_location_file();
} init_threshold_table (mode)
int mode;
{
  int i,j;
  for (i=0; i< GEOMETRICAL_TYPES_NUMBER; i++)
    for (j=0; j<2; j++)
      threshold_table[i][j] = modes_threshold_table[mode][i][j];
}
``` ge/filter.c          Thu Jul  2 18:28:00 1992                82

```c
filter_chains_units()
{
  int unit_start_pt_index,chn_index,
  chn_min_pt_index,
  chn_max_pt_index, chn_circular_flag;

for_each_chains_unit(unit_start_pt_index,
                       chn_index,
                       chn_min_pt_index,
                       chn_max_pt_index,
                       chn_circular_flag)
    filter_chain_unit(unit_start_pt_index, chn_min_pt_index, chn_max_pt_index);
} filter_chain_unit(unit_start_pt_index, min_pt_index, max_pt_index)
     int unit_start_pt_index, min_pt_index, max_pt_index;
{
   int  geometrical_type, abs_area, max_cut;
   point local_offset_vector;
   int total_area;
   point pt;

int prev_abs_area=0, next_abs_area = 0, prev_max_cut = 0, next_max_cut = 0;
   int unit_middle_index = unit_start_pt_index + UNIT_SIZE/2;

if (!legal_reporting_point(get_point(unit_middle_index)))
     return;

abs_area = get_unit_abs_area(unit_start_pt_index);
   max_cut = get_unit_max_cut(unit_start_pt_index);
   geometrical_type = get_unit_geometrical_type(unit_start_pt_index);

if (abs(max_cut) > threshold_table[geometrical_type][MAX_CUT])
     {
       if (unit_start_pt_index > min_pt_index + UNIT_SIZE &&
           unit_start_pt_index < max_pt_index - UNIT_SIZE)
         {
           prev_abs_area = get_unit_abs_area(unit_start_pt_index - UNIT_SIZE);
           next_abs_area = get_unit_abs_area(unit_start_pt_index + UNIT_SIZE);

prev_max_cut = get_unit_max_cut(unit_start_pt_index - UNIT_SIZE);
           next_max_cut = get_unit_max_cut(unit_start_pt_index + UNIT_SIZE);
         } total_area = abs_area + prev_abs_area + next_abs_area;

pt = get_point(unit_middle_index);

if (total_area > threshold_table[geometrical_type][ABS_AREA] &&
           /* unit is a local maximum */
           abs(max_cut) > abs(prev_max_cut) &&
           abs(max_cut) >= abs(next_max_cut) )
         {
           report_defect(pt.x,pt.y,geometrical_type,max_cut,total_area);
         }

}
} report_defect(pt_x,pt_y,geometrical_type,max_cut,total_area)
int pt_x,pt_y,geometrical_type,max_cut,total_area;
{
         output_defect_location(pt_x, pt_y);

printf ( "Location:(%3d,%3d)",pt_x,pt_y);
         printf (" Size: %2d,   Area: %3d,   Location Type :",
                 max_cut, total_area);
         printf("%s\n",geometrical_type_names[geometrical_type]);
} set_geometrical_type_name(type, name_string)
int type;
char* name_string;
{
  strcpy(name_string, geometrical_type_names[type]);
``` ge/filter.c          Thu Jul  2 18:28:00 1992                    83

```c
} init_db_analyzing_region()   /* xxx can use flag to avoid double computation */
{
  int x,y;
  int min_x, min_y, max_x, max_y;

/* x and y are the offset values of image up-left corner in db coordinates */
  x = global_offset_vector.x;
  y = global_offset_vector.y;

/* compute image-db intersection borders */
  min_x = max(db_min_x,x);
  min_y = max(db_min_y,y);

max_x = min(db_max_x,image_x_dim+x);
  max_y = min(db_max_y,image_y_dim+y);

/* compute analyzing region limits */
  db_analyzing_min_x = min_x + ANALYZING_MARGIN_SIZE;
  db_analyzing_min_y = min_y + ANALYZING_MARGIN_SIZE;
  db_analyzing_max_x = max_x - ANALYZING_MARGIN_SIZE;
  db_analyzing_max_y = max_y - ANALYZING_MARGIN_SIZE;

/* compute reporting region limits */
  db_reporting_min_x = min_x + REPORTING_MARGIN_SIZE;
  db_reporting_min_y = min_y + REPORTING_MARGIN_SIZE;
  db_reporting_max_x = max_x - REPORTING_MARGIN_SIZE;
  db_reporting_max_y = max_y - REPORTING_MARGIN_SIZE;
} legal_reporting_point(pt)
     point pt;
{
  if ( pt.x < db_reporting_min_x || pt.x > db_reporting_max_x ||
       pt.y < db_reporting_min_y || pt.y > db_reporting_max_y )
     return 0;
  else return 1;
}

/*--------------------------------------------------------------------*/
/* defect locations output                                            */
/*--------------------------------------------------------------------*/
FILE *defect_location_file;

init_defect_location_file(mode)
int mode;
{
  if (mode == GLOBAL_MODE)
    defect_location_file = fopen("G_defect_locations","w");
  else
    defect_location_file = fopen("L_defect_locations","w");
  output_defect_location(global_offset_vector.x*2, global_offset_vector.y*2);
} output_defect_location(x,y)
int x, y;
{
  fprintf(defect_location_file,"%d %d \n",x,y);
} close_defect_location_file()
{
  output_defect_location(0,0);
  fclose(defect_location_file);
}

/*--------------------------------------------------------------------*/
```

```
ge/main.c           Thu Jul  2 18:28:00 1992                84
#include "data.h"
/*--------------------------------------------------------------*/
/*        m a i n                                             */
/*--------------------------------------------------------------*/
process_image()
{
  generate_db_chain_description();
  set_geometry_data();
} generate_db_chain_description()
{
  init_db_processing();
  generate_edge_points();
  generate_chains();
  find_chain_features();
}
``` ge/point.c          Thu Jul  2 18:28:01 1992          85

```c
#include "data.h"
#include "stdio.h"

include <math.h>

/*--------------------------------------------------------------------*/
/* point.c                                                            */
/*--------------------------------------------------------------------*/ point make_point(x,y)
     int x, y;
{
  point temp;
  temp.x = x;
  temp.y = y;
  return temp;
} point point_add(pt1,pt2)
point pt1,pt2;
{
  return make_point(pt1.x + pt2.x, pt1.y + pt2.y);
} point point_negate(pt)
point pt;
{
  return make_point(- pt.x, - pt.y);
} point point_sub(pt1,pt2)
point pt1,pt2;
{
  return make_point(pt1.x - pt2.x, pt1.y - pt2.y);
} point_dist2(pt1,pt2)
point pt1,pt2;
{
  int dx = pt1.x - pt2.x;
  int dy = pt1.y - pt2.y;

return (dx*dx+dy*dy);
} null_point(pt)
     point pt;
{
  return (pt.x == -1);
} point_equal(pt1,pt2)
point pt1,pt2;
{
  return (pt1.x == pt2.x && pt1.y == pt2.y);
} assert_chain_length_limit(length)
int length;
{
  if (length > MAX_CHAIN_LENGTH)
    {
       fprintf(stderr, " chain pts overflow ! !\n");
       exit(1);
    }
} add_chain_point(chn,pt)
point pt;
chain chn;
{ chn->points[(chn->length)++] = pt;
``` ge/point.c          Thu Jul  2 18:28:01 1992                86
```
    assert_chain_length_limit(chn->length);
}

/* unite two chains with a common end */
unite_chains(chn1, chn2, chn3)
chain chn1, chn2, chn3;
{
  int n;
  chn3->length = 0;

for(n=0; n < chn1->length; n++)
    chn3->points[chn3->length++] = chn1->points[chn1->length - n - 1];

for(n=1; n < chn2->length; n++)
    chn3->points[chn3->length++] = chn2->points[n];

assert_chain_length_limit(chn3->length);
} chain_points_to_array(chn_pts,array, x_dim, y_dim)
chain chn_pts;
int x_dim, y_dim;
max_image array;
{
  int n;
  int x, y;
  point pt;

/* clear array */
  for(x=0; x<x_dim; x++)
    for(y=0; y<y_dim; y++)
      array[x][y] = 0;

for(n=0; n < chn_pts->length; n++)
    {
      pt = chn_pts->points[n];
      if (!null_point(pt))
        array[pt.x][pt.y] = 1;
    }
} add_chain_to_chains(chn,chns,indexes)
chain chn, chns;
chain_indexes indexes;
{ concat_chain_to_chains(chns, chn);
  add_chain_index(chn,indexes);
} add_chain_index(chn,indexes)
    chain chn;
    chain_indexes indexes;
{ if (indexes->length == 0)
      indexes->values[0] =  0;

indexes->length++;
  indexes->values[indexes->length] = indexes->values[indexes->length-1] +
                            chn->length + 1;
} concat_chain_to_chains(chns, chn)     /* CHECK END COUNT */
chain chn, chns;
``` ge/point.c          Thu Jul  2 18:28:01 1992                    87

```c
  {
    int n;
    for (n=0; n<=chn->length; n++)
      chns->points[(chns->length)++] = chn->points[n];
  } print_point(pt)
  point pt;
  {
    printf("[%3d %3d] ",pt.x,pt.y);
  } clear_chain(chn)
  chain chn;
  {
    chn->length = 0;
  } print_chain(chn)
  chain chn;
  {
    int n;
    point pt;

printf("\n[%d]:",chn->length);
    for (n=0; n<chn->length; n++)
      {
        pt = chn->points[n];
        if (null_point(pt))
          printf(" ;\n");
        else printf("%d-%d,",pt.x,pt.y);

if (n%10 == 9)
          printf("\n");
      }
    printf("\n");
  }

/*-----------------------------------------------------------------------*/
/* some more specific stuff                                              */
/*-----------------------------------------------------------------------*/
point get_point();
point get_vertex_point();

/* globals */
chain_element chn1_el,chn2_el,chn_el, chns_el;
chain_indexes_element chns_indexes_el;

chain chns_pts = & chns_el;
chain_indexes chns_indexes = & chns_indexes_el;

point first_chain_point(chn_index)
     int chn_index;
{
  return get_point(chns_indexes->values[chn_index]);
} first_chain_point_index(chn_index)
     int chn_index;
{
  return chns_indexes->values[chn_index];
} chain_start_point_index(chn_index)
     int chn_index;
{
  return chns_indexes->values[chn_index];
```

```
ge/point.c          Thu Jul  2 18:28:01 1992           88
chain_end_point_index(chn_index)
    int chn_index;
{
   return chns_indexes->values[chn_index + 1] - 2;
} v_chain_start_point_index(v_chn_index)
    int v_chn_index;
{
   return v_chns_indexes->values[v_chn_index];
} v_chain_end_point_index(v_chn_index)
    int v_chn_index;
{
   return v_chns_indexes->values[v_chn_index + 1] - 2;   /* was 1 */
}
``` ge/ubc_main.c          Thu Jul  2 18:28:01 1992          89

```c
#include "data.h"

include <stdio.h>
include <math.h>
include <ubc/image.h>
include <ubc/maclib.h> max_image db_bitmap, image_bitmap;

char *dfltab[] = {
            "-i_db", 0,
            "-o", 0,
            "-db_x","0",
            "-db_y","0",
            "-db_w","1000",
            "-db_h","1000",
            0 };

int
  db_x,
  db_y,
  db_w,
  db_h,
  initial_offset_x,
  initial_offset_y,
  initial_alignment_flag,
  initial_alignment_step_size,
  initial_alignment_step_number,
  debug_flag,
  output_global_offset_flag,
  output_local_defects_flag,
  output_global_defects_flag,
  output_corrected_db_map_flag;

int image_x_dim, image_y_dim;
int db_x_dim, db_y_dim;

main(argc,argv)
  int argc;
  char *argv[];
{
   char annote[1024];

IMAGE *ifp,*bifp;
   register i,j;

initargs(argc,argv,dfltab);

if  (flagp("-help"))
      {
        printf(
           "usage:\n\
        ge\n\
           -i_db [<file-name>],\n\
           -o    [<file-name>],\n\
           -db_x [0],\n\
           -db_y [0],\n\
           -db_w [1000],\n\
           -db_h [1000],\n");
        exit(1);
      }
/*-------------------------------------------------------------*/ db_x = atoi(keyarg("-db_x"));
  db_y = atoi(keyarg("-db_y"));
  db_w = atoi(keyarg("-db_w"));
  db_h = atoi(keyarg("-db_h"));

/*-------------------------------------------------------------*/
```

```
ge/ubc_main.c            Thu Jul  2 18:28:01 1992                90
    /*..Initialize input image files */ if (keyarg("-i_db"))
        ifp = iopen(keyarg("-i_db"),R);
    require(ifp,"can not open db file\n");
    getheader(ifp,annote);

/*..Initialize output image file */
    if (keyarg("-o"))
        bifp = iopen(keyarg("-o"),W);
    else
        bifp = idopen(OUTPUT,W);
    require(bifp,"can not open output image file\n");

bifp->nrows    = ifp->nrows/6;
    bifp->ncols    = ifp->ncols/6;
    bifp->bpp      = 8;
    bifp->signed   = 0;
    bifp->positive = ifp->positive;
    putheader(bifp,annote);

/* update global dim variables */ db_x_dim = ifp->ncols;
    db_y_dim = ifp->nrows;

/*..Get input images into their arrays */
    foreach (i,db_y_dim)
      foreach (j,db_x_dim)
        { db_bitmap[j][i] = getpix(ifp);
        }

/*.. use external routine to process image */ process_image();

/*..Output image to output file */
    foreach (i,bifp->nrows)
      foreach (j,bifp->ncols)
        putpix(bifp,image_bitmap[j][i]);

/*..Close files */
    iclose(ifp);
    iclose(bifp);

exit(0);

} write_ubc_image(fname,image,x_dim,y_dim,bpp,signed_flag)
    char *fname;
    max_image image;
    int x_dim, y_dim,bpp,signed_flag;
{
    IMAGE *ifp;
    int x,y;
    char annote[1024];

ifp = iopen(fname,W);

ifp->nrows    = y_dim;
    ifp->ncols    = x_dim;
    ifp->bpp      = bpp;
    ifp->signed   = signed_flag;
    ifp->positive = 1;
    putheader(ifp,annote);

for (y=0; y<y_dim; y++)
      for (x=0; x<x_dim; x++)
        putpix(ifp,image[x][y]);
``` ge/ubc_main.c          Thu Jul  2 18:28:01 1992                    91

```c
    iclose(ifp);
} read_ubc_image(fname,image,x_dim_p,y_dim_p,bpp_p,signed_flag_p)
    char *fname;
    min_image image;
    int *x_dim_p, *y_dim_p,*bpp_p,*signed_flag_p;
{
  IMAGE *ifp;
  char annote[1024];
  int x,y;
  ifp = iopen(fname,R);

getheader(ifp,annote);

*y_dim_p     = ifp->nrows;
  *x_dim_p     = ifp->ncols;
  *bpp_p       = ifp->bpp+1;
  *signed_flag_p = ifp->signed;

getheader(ifp,annote);

/*..Get input image into its array */
  for (y=0;y<*y_dim_p;y++)
    for (x=0;x<*x_dim_p;x++)
      image[x][y] = getpix(ifp);   /* reversed ? */
}
```

```
ge/util.c          Thu Jul  2 18:28:01 1992                92
#include "data.h"
include <math.h>

/*------------------------------------------------------------------*/
/*     general utilities                                            */
/*------------------------------------------------------------------*/ print_image(image,x_dim,y_dim,header_format,element_format,reverse_flag)
      max_image image;
      int x_dim, y_dim, reverse_flag;
      char *header_format, *element_format;
{ int x,y;

printf(header_format);
  printf("\n");

/* print horizontal indexes */
  printf (element_format,0);
  for (x=0; x<x_dim; x++)
    printf(element_format,x);
  printf("\n");

if (reverse_flag)
    for (x=0; x<x_dim; x++)
      { for (y=0; y<y_dim; y++)
          printf(element_format,image[x][y]);
        printf("\n");
      }
  else
    for (y=0; y<y_dim; y++)

{
        printf (element_format,y);
        for (x=0; x<x_dim; x++)
          printf(element_format,image[x][y]);
        /*
          if (image[x][y] == UNDEFINED_DIRECTION)
             printf("   ");
          else printf(element_format,image[x][y]);
        */
        printf("\n");
      }
} abs(a)
{
  return (a>0)?a:-a;
} min(a,b)
{
  return (a<b)?a:b;
} min_abs(a,b)
{
  return (abs(a)<abs(b))?a:b;
} max(a,b)
{
  return (a>b)?a:b;
} min4(a,b,c,d)
{
``` ge/util.c        Thu Jul  2 18:28:01 1992         93

```
  return min(min(a,b),min(c,d));
} is_circular_chain(chn_index)
int chn_index;
{
  return point_dist2(get_point(chain_end_point_index(chn_index)),
                     get_point(chain_start_point_index(chn_index)))
         <= 8;
}
``` mw/Makefile          Thu Jul  2 18:28:02 1992              94

```
CC = cc
OBJECTS = data.o  mw.o mw_main.o point.o \
          ubc_io.o

CFLAGS =  $(FLAGS) -g -I/usr/local/include c2a:     $(OBJECTS) ubc_io.o data.h  point.h
         $(CC)  $(FLAGS)  -o mw $(OBJECTS)   -lubc -lm $(OBJECTS):    data.h point.h
``` mw/data.c          Thu Jul  2 18:28:02 1992          95

```c
#include "data.h"

int image_x_dim, image_y_dim;
int x_dim, y_dim;
int coarse_x_dim, coarse_y_dim;

max_image in_image, out_image;
max_image QP_edge_pts, P_neighbors1, P_neighbors2;
max_image MW_props1, MW_props2, MW_props3, MW_props4;
max_image MW_neighbor1, MW_neighbor2;

/* order for tracing */
point neighbor_pos[] = {
  {0,-1},
  {-1,0},
  {1,0},
  {0,1},
  {-1,-1},
  {1,-1},
  {-1,1},
  {1,1}};

/* for other purposes */
point neighbor_relative_pos[] = {{-1,-1},{0,-1},{1,-1},
                                 {1,0},
                                 {1,1}, {0,1}, {-1,1},
                                 {-1,0}};
``` mw/data.h          Thu Jul  2 18:28:04 1992           96

```c
define DEBUG_FLAG 0 define MAX_IMAGE_DIM 600
typedef int max_image[MAX_IMAGE_DIM][MAX_IMAGE_DIM];
#define BPP8 8
define BPP1 1 define UNSIGNED 0
define SIGNED   1 define LOW_VALUE  0
define HIGH_VALUE 255 define NO_NEIGHBOR 9
define NO_EDGE     8 define EMPTY_LP   1
define LEGAL_LP   2
define ILLEGAL_LP 3 include "point.h"

extern point neighbor_relative_pos[];
extern point neighbor_pos[];

extern int image_x_dim, image_y_dim;
extern int x_dim, y_dim;
extern int coarse_x_dim, coarse_y_dim;

extern max_image in_image, out_image, edge_bitmap;
extern max_image QP_edge_pts, P_neighbors1, P_neighbors2;
extern max_image MW_props1, MW_props2, MW_props3, MW_props4;
extern max_image MW_neighbor1, MW_neighbor2;
``` mw/mw.c          Thu Jul  2 18:28:03 1992          97

```c
#include <math.h>
include <stdio.h>
#include "data.h"

point choose_start_point();
point choose_next_point();
point
  choose_legal_MW_point();

point QP_frame_positions[12] = {{0, 0}, {1, 0}, {2, 0}, {3, 0}, {3, 1},
 {3, 2}, {3, 3}, {2, 3}, {1, 3}, {0, 3}, {0, 2}, {0, 1},};

/* 0 1 2 7 3 6 5 4 */ int P_neighbor_table[12] =
{
  0, 1, 1, 2, 3, 3, 4, 5, 5, 6, 7, 7
};

mw()
{
  init_data();

mark_edge_QPs();

find_connectivity_information();

output_results();

} init_data()
{
  x_dim = image_x_dim;
  y_dim = image_y_dim;

coarse_x_dim = x_dim / 2;
  coarse_y_dim = y_dim / 2;
}

/*----------------------------------------------------*/
/* mark edge QPs */
/*----------------------------------------------------*/
mark_edge_QPs()
{
  int x, y;
  for (x = 0; x < x_dim; x++)
    for (y = 0; y < y_dim;
         y++)
      QP_edge_pts[x][y] = find_if_QP_contain_edge(x, y);
} find_if_QP_contain_edge(x, y)
  int x, y;
{
  int v0, v1, v2, v3;

v0 = QP_grey_value(x, y);

v1 = QP_grey_value(x - 1, y);
  v2 = QP_grey_value(x - 1, y - 1);
  v3 =
    QP_grey_value(x, y - 1);

if (v0 > LOW_VALUE && v0 < HIGH_VALUE)
    return 1;

if (v0 == LOW_VALUE && (v1 == HIGH_VALUE || v2 == HIGH_VALUE || v3
```

```
mw/mw.c            Thu Jul  2 18:28:03 1992                    98
                          == HIGH_VALUE))
        return 1;
    if (v0 == HIGH_VALUE && (v1 == LOW_VALUE ||
                             v2 == LOW_VALUE || v3 == LOW_VALUE))
        return 1;
    return 0;
}

QP_grey_value(x, y)
    int x, y;
{
    if (x >= 0 && x < x_dim && y >= 0 && y <
        y_dim)
        return in_image[x][y];
    else
        return 0;
}

/*------------------------------------------------------------*/
/* find connectivity information */
/*------------------------------------------------------------*/ find_connectivity_information()
{
    find_LP_connectivity_information();
    find_MW_connectivity_information();
}

/*------------------------------------------------------------*/
/* find LP connectivity information */

/*------------------------------------------------------------*/

/*------------------------------------------------------------*/
/* for each LP, find two LP neighbors, */
/* 4-connectedness is prefered to 8-conenctedness */
/*------------------------------------------------------------*/ int local_Q_values[4][4];

find_LP_connectivity_information()
{
    int coarse_x, coarse_y;
    int n1, n2;
    for (coarse_x = 0; coarse_x < coarse_x_dim; coarse_x++)
        for
            (coarse_y = 0; coarse_y < coarse_y_dim; coarse_y++)
        {
            if
                (LP_contains_edge_p(make_point(coarse_x, coarse_y)))
            {
                copy_local_Q_values(coarse_x, coarse_y);
                find_LP_neighbors(&n1, &n2);

if (n1 == n2)
                {
                    n1 = NO_NEIGHBOR;
                    n2 = NO_NEIGHBOR;

printf("[%3d, %3d],", coarse_x, coarse_y);
                    printf("canceled");
                    printf("\n");
                }

P_neighbors1[coarse_x][coarse_y] = n1;
                P_neighbors2[coarse_x][coarse_y] = n2;
            } else
            {
                P_neighbors1[coarse_x][coarse_y] = NO_NEIGHBOR;
                P_neighbors2[coarse_x][coarse_y] = NO_NEIGHBOR;
            }
        }
}
``` mw/mw.c          Thu Jul  2 18:28:03 1992                    99

```
find_LP_neighbors(n1_p, n2_p)
  int *n1_p, *n2_p;
{
  int n1, n2, n3;

point start_pt;

start_pt = choose_start_point();

/* develop chain in two directions from start pt */
  n1 = find_one_LP_neighbor(start_pt);
  n2 = find_one_LP_neighbor(start_pt);
  n3 = find_one_LP_neighbor(start_pt);

if (n1 == n2)
    n2 = n3;

*n1_p = n1;
  *n2_p = n2;
} point
choose_start_point()
{
  if (local_Q_values[1][1])
    return
      make_point(1, 1);
  else if (local_Q_values[1][2])
    return
      make_point(1, 2);
  else if (local_Q_values[2][1])
    return
      make_point(2, 1);
  else if (local_Q_values[2][2])
    return
      make_point(2, 2);
  else
    return NULL_POINT;
} point
choose_next_point(pt)
  point pt;
{
  point neighbor_pt;
  int n;

/* first, try to pick a 4 connected continuation */ for (n = 0; n < 4; n++)
  {
    neighbor_pt = point_add(neighbor_pos[n], pt);
    if (active_point(neighbor_pt))
      return neighbor_pt;
  }

/* if not found, try to pick a 8 connected continuation
     that is located out of the current LP
  */ for (n = 0; n < 8; n++) /* points outside LP get priority */
  {
    neighbor_pt = point_add(neighbor_pos[n], pt);
    if (active_point(neighbor_pt) && !inside_LP(neighbor_pt))
      return neighbor_pt;
  }

/* otherwise, take what you have */
```

```
mw/mw.c           Thu Jul  2 18:28:03 1992        100
    for (n = 0; n < 8; n++)
    {
      neighbor_pt = point_add(neighbor_pos[n], pt);
      if (active_point(neighbor_pt))
        return neighbor_pt;
    } return
      NULL_POINT;
} find_one_LP_neighbor(start_pt)
  point start_pt;
{
  point pt;

if (null_point(start_pt))
    return NO_NEIGHBOR;

pt = start_pt;

supress_point(pt);

while (!null_point(pt) && inside_LP(pt))
  {
    pt =
      choose_next_point(pt);
    supress_point(pt);
  } if (null_point(pt))
    return NO_NEIGHBOR;
  else
    return
      decode_LP_neighbor_number_from_QP_point(pt);
} copy_local_Q_values(coarse_x, coarse_y)
  int coarse_x, coarse_y;
{
  int
    i, j, x, y;

for (i = 0; i < 4; i++)
    for (j = 0; j < 4; j++)
    {
      x = coarse_x * 2 + i -
        1;
      y = coarse_y * 2 + j - 1;
      if (x >= 0 && x < x_dim
          && y >= 0 && y < y_dim)
        local_Q_values[i][j] = QP_edge_pts[x][y];
      else
        local_Q_values[i][j] = 0;
    }
} active_point(pt)
  point pt;
{
  return local_Q_values[pt.x][pt.y];
} supress_point(pt)
  point pt;
{
``` mw/mw.c          Thu Jul  2 18:28:03 1992          101

```
  local_Q_values[pt.x][pt.y] = 0;
} inside_LP(pt)
  point pt;
{
  return (pt.x >= 1 && pt.x <= 2 && pt.y
          >= 1 && pt.y <= 2);
} decode_LP_neighbor_number_from_QP_point(pt)
  point pt;
{
  int n;
  for (n = 0; n < 12; n++)
    if (point_equal(pt, QP_frame_positions[n]))
      return
        P_neighbor_table[n];
  printf("error \n");
}

/*-----------------------------------------------------------*/
/* find MW connectivity information */
/*-----------------------------------------------------------*/ find_MW_connectivity_information()
{
  find_MWs_characteristics();
  find_MWs_neighbors();
}

/*-----------------------------------------------------------*/
/* find MW characteristics */
/*-----------------------------------------------------------*/
find_MWs_characteristics()
{
  int coarse_x, coarse_y;

for (coarse_x = 0; coarse_x < coarse_x_dim - 1; coarse_x++)
    for (coarse_y = 0;
         coarse_y < coarse_y_dim - 1; coarse_y++)
      find_MW_characteristics(make_point(coarse_x, coarse_y));
} find_MW_characteristics(MW_location)
  point MW_location;
{
  int
    Gs[2][4], Ns[2];

find_connected_groups(MW_location, Gs, Ns);
  label_group_LPs(MW_location, Gs, Ns);
} point MW_relative_LP_locations[4] = {{0, 0}, {1, 0}, {0, 1}, {1, 1}};

find_connected_groups(MW_location, Gs, G_lengths)
    int Gs[2][4], G_lengths[2];
``` mw/mw.c          Thu Jul   2 18:28:03 1992          102

```
    point MW_location;
{
  int i, j;
  int current_group_n;
  int LP_active_flags[4];
  int LP_added_flag;
  int G_number;

point p[4];

for (i = 0; i < 4; i++)
    p[i] = point_add(MW_location,
                     MW_relative_LP_locations[i]);

for(i=0; i<4; i++)
    LP_active_flags[i] = LP_contains_edge_p(p[i]);

current_group_n = -1;

G_lengths[0] = 0;
  G_lengths[1] = 0;

for (i = 0; i < 4; i++)
    {
      if (LP_active_flags[i])
        {

/* start a new group */
          current_group_n ++;

if (current_group_n > 1)
            break;

G_lengths[current_group_n] = 0;

add_index_to_group(i, current_group_n, Gs, G_lengths);
          LP_active_flags[i] = 0;

/* find other pixels in connected group */
          LP_added_flag = 1;
          while (LP_added_flag)
            {
              LP_added_flag = 0;

for (j = i + 1; j < 4; j++)
                if (LP_active_flags[j])
                  if (group_connected_to_location(Gs[current_group_n],
                                                  G_lengths[current_group_n],
                                                  p,
                                                  j))
                    {
                      add_index_to_group(j, current_group_n, Gs, G_lengths);

LP_active_flags[j] = 0;
                      LP_added_flag = 1;
                    }

}
        } if (current_group_n > 1)
        printf("[%3d %3d]  more than two groups found \n",
               MW_location.x, MW_location.y);
    }
} add_index_to_group(i, current_group_n, Gs, Ns)
  int Gs[2][4], Ns[2];
int i, current_group_n;
``` mw/mw.c          Thu Jul  2 18:28:03 1992          103

```c
  {
    Gs[current_group_n][Ns[current_group_n]] =
      i;
    Ns[current_group_n]++;
  } group_connected_to_location(G, G_n, MW_pts, current_i)
  int G[];
/*
 * connected LPs indexes
 */ int G_n;
/* number of elements in G */ point
  MW_pts[];
/* location of four points in MW */ int current_i;
/*
 * current location index
 */
{
  int i;

if (G_n == 0)
    return 1;

for (i = 0; i < G_n; i++)
  {
    if (connected_points_p(MW_pts[G[i]],
                           MW_pts[current_i]))
      return 1;
  } return 0;
}
point
get_neighbor1_point(pt)
  point pt;
{
  int n_code;

n_code = P_neighbors1[pt.x][pt.y];
  return point_add(pt,
                   neighbor_relative_pos[n_code]);
}
point
get_neighbor2_point(pt)
  point pt;
{
  int n_code;

n_code = P_neighbors2[pt.x][pt.y];
  return point_add(pt,
                   neighbor_relative_pos[n_code]);
} connected_points_p(pt1, pt2)
  point pt1, pt2;
{
  point n1_pt1, n2_pt1, n1_pt2, n2_pt2;

n1_pt1 = get_neighbor1_point(pt1);
  n2_pt1 =
    get_neighbor2_point(pt1);

n1_pt2 = get_neighbor1_point(pt2);
  n2_pt2 =
    get_neighbor2_point(pt2);
  /*
   * printf("conncted:pts="); print_point(pt1); print_point(pt2);
   *
   * printf(" ns:"); print_point(n1_pt1); print_point(n1_pt2);
   * print_point(n2_pt1); print_point(n2_pt2);
   *
   * printf("==> %d\n", (point_equal(pt1, n1_pt2) || point_equal(pt1, n2_pt2) ||
   * point_equal(pt2, n1_pt1) || point_equal(pt2, n2_pt1)));
   *
``` mw/mw.c          Thu Jul  2 18:28:03 1992          104

```c
    */
    return (point_equal(pt1, n1_pt2) || point_equal(pt1, n2_pt2) ||
            point_equal(pt2, n1_pt1) || point_equal(pt2, n2_pt1));
}

LP_contains_edge_p(P_location)
    point P_location;
{
    /*
     * NOTE NOTE NOTE should be restated
     */ int QP_x, QP_y;

QP_x = P_location.x * 2;
    QP_y = P_location.y * 2;

return (QP_edge_pts[QP_x][QP_y] || QP_edge_pts[QP_x + 1][QP_y] ||
            QP_edge_pts[QP_x][QP_y + 1] || QP_edge_pts[QP_x + 1][QP_y + 1]);
    /*
     * return(P_neighbors1[P_location.x][P_location.y] != NO_NEIGHBOR ||
     * P_neighbors2[P_location.x][P_location.y] != NO_NEIGHBOR);
     */
} label_group_LPs(MW_location, Gs, Ns)
    point MW_location;
    int Gs[2][4], Ns[2];
{
    point p[4];
    int props[4];
    int i, j;
    int n0, n1;

print_point(MW_location);

for (i = 0; i < 4; i++)
        p[i] = point_add(MW_location,
                         MW_relative_LP_locations[i]);
    for (i = 0; i < 4; i++)
        props[i] = EMPTY_LP;

n0 = Ns[0];
    n1 = Ns[1];

printf("n0=%ld n1=%ld ", n0, n1);
    if (n0 > 0)
    {
        printf("G[0]=", n0,
               n1);
        for (i = 0; i < n0; i++)
            printf("%d ", Gs[0][i]);
    } if (n1 > 0)
    {
        printf
            ("G[1] =");
        for (i = 0; i < n1; i++)
            printf("%d ", Gs[1][i]);
    }
/*
 * NOTE NOTE NOTE NOTE NOTE NOTE
 *
 * criterion for choosing can be improved !! use centrality and not only
 * number of pixels occupied
 */ if (n0 == 0)
    /* no edge in MW */
{
```

```
mw/mw.c             Thu Jul  2 18:28:03 1992          105

} else if (n0 > n1)
      /* no edge in MW */
    {
      for (j = 0; j < n0; j++)
        props[Gs[0][j]] = LEGAL_LP;
      if (n1 > 0)
        for (j = 0; j < n1; j++)
          props[Gs[1][j]] = ILLEGAL_LP;
    } else
    {
      for (j = 0; j < n0; j++)
        props[Gs[0][j]] = ILLEGAL_LP;
      for (j = 0; j < n1; j++)
        props[Gs[1][j]] = LEGAL_LP;
    } MW_props1[MW_location.x][MW_location.y]
      = props[0];
    MW_props2[MW_location.x][MW_location.y] = props[1];
    MW_props3[MW_location.x][MW_location.y] = props[2];
    MW_props4[MW_location.x][MW_location.y] = props[3];

printf(" props= %ld%ld%ld%ld\n", props[0], props[1], props[2], props[3]);
  }

/*------------------------------------------------------------*/
/*
 * find MWs neighbors
 */

/*------------------------------------------------------------*/
find_MWs_neighbors()
{
  int coarse_x, coarse_y;
  for (coarse_x = 0; coarse_x < coarse_x_dim - 1; coarse_x++)
    for (coarse_y = 0; coarse_y < coarse_y_dim - 1; coarse_y++)
      find_MW_neighbors(make_point(coarse_x, coarse_y));
} find_MW_neighbors(MW_location)
  point MW_location;
{
  point p[4];
  int i;
  int n1, n2;

point side1_points[2], side2_points[2];
  point chosen_pt;

for (i = 0; i < 4; i++)
    p[i] = point_add(MW_location, MW_relative_LP_locations[i]);

chosen_pt = choose_legal_MW_point(MW_location);

if (null_point(chosen_pt))
  {
    MW_neighbor1[MW_location.x][MW_location.y] =
      NO_NEIGHBOR;
    MW_neighbor2[MW_location.x][MW_location.y] =
      NO_NEIGHBOR;
  }
  else
  {
    printf(" MW=");
    print_point(MW_location);

printf(" P=");
    print_point(chosen_pt);
```

```
    find_MW_one_point_neighbors(chosen_pt, side1_points, side2_points,
                                &n1, &n2);
    MW_neighbor1[MW_location.x][MW_location.y] =
      find_one_MW_neighbor(MW_location, side1_points, n1);
    MW_neighbor2[MW_location.x][MW_location.y] =
      find_one_MW_neighbor(MW_location, side2_points, n2);

printf(" MWn = [%d %d]\n",
           MW_neighbor1[MW_location.x][MW_location.y],
           MW_neighbor2[MW_location.x][MW_location.y]);

}

} point
choose_legal_MW_point(MW_location)
  point MW_location;
{
  point p[4];
  int i;

for (i = 0; i < 4; i++)
    p[i] = point_add(MW_location, MW_relative_LP_locations[i]);

if (MW_props1[MW_location.x][MW_location.y] == LEGAL_LP)
    return p[0];
  else if (MW_props2[MW_location.x][MW_location.y] == LEGAL_LP)
    return p[1];
  else if (MW_props3[MW_location.x][MW_location.y] == LEGAL_LP)
    return p[2];
  else if (MW_props4[MW_location.x][MW_location.y] == LEGAL_LP)
    return p[3];

else
    return NULL_POINT;
} find_MW_one_point_neighbors(p0, side1_points, side2_points, n1_p, n2_p)
  point p0;
  point side1_points[2], side2_points[2];
int *n1_p, *n2_p;
{
  int code1, code2;
  point n_pt1, n_pt2;

code1 = P_neighbors1[p0.x][p0.y];
  code2 = P_neighbors2[p0.x][p0.y];

n_pt1 = get_neighbor1_point(p0);
  n_pt2 = get_neighbor2_point(p0);

if (!null_point(n_pt1))
  {
    printf("Pn=[%d %d] ", code1, code2);
    *n1_p = 1;
    side1_points[0] = n_pt1;
  } else
  {
    *n1_p = 0;
  } if (!null_point(n_pt2))
  {
    *n2_p = 1;
    side2_points[0] = n_pt2;
  } else
  {
    *n2_p = 0;
  }
``` mw/mw.c          Thu Jul  2 18:28:03 1992          107

```c
  /*
   * NOTE NOTE NOTE : add another continuation in each side
   */
} find_one_MW_neighbor(MW_location, side_points, side_points_n)
  point MW_location, side_points[2];
int side_points_n;
{
  int n_rank;
  int i;
  int max_rank, max_rank_neighbor;
  point n_MW_location;

if (side_points_n == 0)
    return NO_NEIGHBOR;

max_rank = 0;
  max_rank_neighbor = NO_NEIGHBOR;

for (i = 0; i < 8; i++)
  {
    n_MW_location = point_add(MW_location, neighbor_relative_pos[i]);

n_rank = find_MW_neighbor_rank(n_MW_location,
                                   side_points, side_points_n);

if (n_rank > max_rank)
    {
      max_rank = n_rank;
      max_rank_neighbor = i;
    }
  } return max_rank_neighbor;
} find_MW_neighbor_rank(n_MW_location,
                      side_points, side_points_n)
  point n_MW_location, side_points[];
int side_points_n;
{
  int rank;
  int number_of_legal_cont_points, length_of_legal_component, centrality_rank;

number_of_legal_cont_points =
    compute_number_of_contained_points(n_MW_location, side_points,
                                       side_points_n);

length_of_legal_component = find_length_of_MW_legal_component(n_MW_location);

centrality_rank = find_centrality_rank_of_MW_legal_component(n_MW_location);

rank = number_of_legal_cont_points * 400 + length_of_legal_component * 0 +
    centrality_rank;

/*
   * NOTE NOTE NOTE should be refined
   */ return rank;

} compute_number_of_contained_points(n_MW_location, side_points,
                                   side_points_n)
  point n_MW_location, side_points[];
int side_points_n;
{
```

```
  int i;
  point p1;
  point n_pts[4];

/* NOTE NOTE : add handling of more than side point */ if (side_points_n == 0)
    return 0;

else
    p1 = side_points[0];

for (i = 0; i < 4; i++)
  {
    n_pts[i] = point_add(n_MW_location, MW_relative_LP_locations[i]);
  } return
    (point_equal(p1, n_pts[0]) &&
     MW_props1[n_MW_location.x][n_MW_location.y] == LEGAL_LP) +

(point_equal(p1, n_pts[1]) &&
     MW_props2[n_MW_location.x][n_MW_location.y] == LEGAL_LP) +

(point_equal(p1, n_pts[2]) &&
     MW_props3[n_MW_location.x][n_MW_location.y] == LEGAL_LP) +

(point_equal(p1, n_pts[3]) &&
     MW_props4[n_MW_location.x][n_MW_location.y] == LEGAL_LP);
} find_length_of_MW_legal_component(MW_location)
  point MW_location;
{
  return
    ((MW_props1[MW_location.x][MW_location.y] == LEGAL_LP) +
     (MW_props2[MW_location.x][MW_location.y] == LEGAL_LP) +
     (MW_props3[MW_location.x][MW_location.y] == LEGAL_LP) +
     (MW_props4[MW_location.x][MW_location.y] == LEGAL_LP));
} find_MW_QPs_grey_average(MW_location)
point MW_location;
{
  int QP_x, QP_y;
  int s, i, j;

QP_x = MW_location.x * 2;
  QP_y = MW_location.y * 2;

s = 0;
  for (i=0; i<4; i++)
    for (j=0; j<4; j++)
      s += QP_grey_value(QP_x+i, QP_y+j);

return irint(s/16.0);
} find_centrality_rank_of_MW_legal_component(MW_location)
  point MW_location;
{
  int a;

a = find_MW_QPs_grey_average(MW_location);
  return min(a, HIGH_VALUE - a);
/*
  return 0;
*/
}
``` mw/mw.c          Thu Jul  2 18:28:03 1992                     109

```c
min(a,b)
int a, b;
{
   return (a<b) ? a : b;
}

/*----------------------------------------------------------*/
/* output data                                   */
/*----------------------------------------------------------*/ output_results()
{ write_ubc_image_file("edge_pts", QP_edge_pts, MAX_IMAGE_DIM,
                  x_dim, y_dim, BPP8, UNSIGNED);
  write_ubc_image_file("P_neighbors1", P_neighbors1, MAX_IMAGE_DIM,
                  coarse_x_dim, coarse_y_dim, BPP8, UNSIGNED);
  write_ubc_image_file("P_neighbors2", P_neighbors2, MAX_IMAGE_DIM,
                  coarse_x_dim, coarse_y_dim, BPP8, UNSIGNED);

write_ubc_image_file("MW_props1", MW_props1, MAX_IMAGE_DIM,
                  coarse_x_dim, coarse_y_dim, BPP8, UNSIGNED);
  write_ubc_image_file("MW_props2", MW_props2, MAX_IMAGE_DIM,
                  coarse_x_dim, coarse_y_dim, BPP8, UNSIGNED);
  write_ubc_image_file("MW_props3", MW_props3, MAX_IMAGE_DIM,
                  coarse_x_dim, coarse_y_dim, BPP8, UNSIGNED);
  write_ubc_image_file("MW_props4", MW_props4, MAX_IMAGE_DIM,
                  coarse_x_dim, coarse_y_dim, BPP8, UNSIGNED);

write_ubc_image_file("MW_neighbor1", MW_neighbor1, MAX_IMAGE_DIM,
                  coarse_x_dim, coarse_y_dim, BPP8, UNSIGNED);
  write_ubc_image_file("MW_neighbor2", MW_neighbor2, MAX_IMAGE_DIM,
                  coarse_x_dim, coarse_y_dim, BPP8, UNSIGNED);

write_ubc_image_file("P_neighbors2", P_neighbors2, MAX_IMAGE_DIM,
                  coarse_x_dim, coarse_y_dim, BPP8, UNSIGNED);
  write_ubc_image_file("P_neighbors2", P_neighbors2, MAX_IMAGE_DIM,
                  coarse_x_dim, coarse_y_dim, BPP8, UNSIGNED);
  write_ubc_image_file("P_neighbors2", P_neighbors2, MAX_IMAGE_DIM,
                  coarse_x_dim, coarse_y_dim, BPP8, UNSIGNED);
}
``` mw/mw_main.c            Thu Jul  2 18:28:03 1992           110

```c
#include <stdio.h>
include <math.h>
include <ubc/image.h>
include <ubc/maclib.h> include "data.h"

char *dfltab[] = {
  "-i",0,
  "-o",0,
  "-low_level",   "10",
  "-high_level",  "205",
  "-low_thr",     "35",
  "-hi_thr",      "180",
  "-v_low_thr",   "28",
  "-v_hi_thr",    "195",
  0 };

main(argc,argv)
  int argc;
  char *argv[];
{
   char annote[1024];

IMAGE *ifp,*bifp;
   register i,j;

initargs(argc,argv,dfltab);

/*..IF help THEN */
     if  (flagp("-help"))
     {
       printf("usage: mw [-i input image [-o output image]]\
         \n");
       exit(1);
     }

/*..Initialize input image file */
   if (keyarg("-i"))
     ifp = iopen(keyarg("-i"),R);
   else
     ifp = idopen(INPUT,R);
   require(ifp,"can not open input image file\n");
   getheader(ifp,annote);

image_y_dim = ifp->nrows;
   image_x_dim = ifp->ncols;

/*..Initialize output image file */
   if (keyarg("-o"))
     bifp = iopen(keyarg("-o"),W);
   else
     bifp = idopen(OUTPUT,W);
   require(bifp,"can not open output image file\n");

bifp->nrows    = ifp->nrows;
   bifp->ncols    = ifp->ncols;
   bifp->bpp      = 8;
   bifp->signed   = 0;
   bifp->positive = ifp->positive;
   putheader(bifp,annote);

/*..Get input image into its array */
   foreach (i,ifp->nrows)
     foreach (j,ifp->ncols)
       in_image[i][j] = getpix(ifp);
``` mw/mw_main.c          Thu Jul  2 18:28:03 1992          111

```
    /*.. use external routine to process image */
    mw();

/*..Output image to output file */
    foreach (i,bifp->nrows)
      foreach (j,bifp->ncols)
        putpix(bifp,out_image[i][j]);

/*..Close files */
    iclose(ifp);
    iclose(bifp);

exit(0);

}
``` mw/point.c        Thu Jul  2 18:28:03 1992        112

```c
#include "data.h"
#include "stdio.h"

include <math.h>

/*--------------------------------------------------------------------*/
/* point.c                                                            */
/*--------------------------------------------------------------------*/
point make_point(x,y)
     int x, y;
{
  point temp;
  temp.x = x;
  temp.y = y;
  return temp;
} point empty_point = {-1,-1};

point point_add(pt1,pt2)
point pt1,pt2;
{
  return make_point(pt1.x + pt2.x, pt1.y + pt2.y);
} point point_negate(pt)
point pt;
{
  return make_point(- pt.x, - pt.y);
} point point_sub(pt1,pt2)
point pt1,pt2;
{
  return make_point(pt1.x - pt2.x, pt1.y - pt2.y);
} point_dist2(pt1,pt2)
point pt1,pt2;
{
  int dx = pt1.x - pt2.x;
  int dy = pt1.y - pt2.y;

return (dx*dx+dy*dy);
} null_point(pt)
     point pt;
{
  return (pt.x == -1);
} point_equal(pt1,pt2)
point pt1,pt2;
{
  return (pt1.x == pt2.x && pt1.y == pt2.y);
} print_point(pt)
point pt;
{
  printf("[%3d %3d] ",pt.x,pt.y);
}
``` mw/point.h          Thu Jul  2 18:28:04 1992          113

```
/*--------------------------------------------------------------*/
/* point.h                                                    */
/*--------------------------------------------------------------*/

/* points */ typedef struct {
  int x;
  int y;
} point;

extern point empty_point;
define NULL_POINT empty_point point make_point();
int point_equal();
point point_add();
``` mw/ubc_io.c          Thu Jul  2 18:28:04 1992          114

```
/****************************************************************/
/*          independent ubc image read and write functions      */
/****************************************************************/
#include "data.h"

include <stdio.h>
include <math.h>
include <ubc/image.h>
include <ubc/maclib.h> write_ubc_image_file(fname,image,x_physical_dim,x_dim,y_dim,bpp,signed_flag)
     char *fname;
     int *image;
     int x_physical_dim, x_dim, y_dim,bpp,signed_flag;

{
  IMAGE *ifp;
  int x,y;
  char annote[1024];

ifp = iopen(fname,W);
  check_ifp(ifp,fname);

ifp->nrows    = y_dim;
  ifp->ncols    = x_dim;
  ifp->bpp      = bpp;
  ifp->signed   = signed_flag;
  ifp->positive = 1;
  putheader(ifp,annote);

for (y=0; y<y_dim; y++)
     for (x=0;x<x_dim;x++)
        putpix(ifp,image[x+y*x_physical_dim]);

iclose(ifp);
} check_ifp(ifp, file_name)
   IMAGE *ifp;
   char file_name[];
{
  char msg[200];

sprintf(msg, " cannot perform operation with file: %s \n", file_name);

require(ifp,msg);
} read_ubc_image_file(fname,image,x_physical_dim,x_dim_p,y_dim_p,bpp_p,signed_flag
_p)
     char *fname;
     int *image;
     int x_physical_dim,*x_dim_p, *y_dim_p,*bpp_p,*signed_flag_p;

{
  IMAGE *ifp;
  char annote[1024];

int x,y;

ifp = iopen(fname,R);
  check_ifp(ifp,fname);

getheader(ifp,annote);
  *y_dim_p      = ifp->nrows;
  *x_dim_p      = ifp->ncols;
  *bpp_p        = ifp->bpp+1;
  *signed_flag_p = ifp->signed;

/*..Get input image into its array */
  for (y=0;y<*y_dim_p;y++)
``` mw/ubc_io.c          Thu Jul  2 18:28:04 1992          115

```c
      for (x=0;x<x_dim_p;x++)
        image[x+y*x_physical_dim] = getpix(ifp);
}

/*--------------------------------------------------------------*/ write_ubc_double_image_file(fname,
                        image,x_physical_dim,x_dim,y_dim,bpp,signed_flag)
        char *fname;
        double *image;
        int x_physical_dim, x_dim, y_dim,bpp,signed_flag;

{
  IMAGE *ifp;
  int x,y;
  char annote[1024];
  int value;

ifp = iopen(fname,W);
  check_ifp(ifp,fname);

ifp->nrows    = y_dim;
  ifp->ncols    = x_dim;
  ifp->bpp      = bpp;
  ifp->signed   = signed_flag;
  ifp->positive = 1;
  putheader(ifp,annote);

for (y=0; y<y_dim; y++)
     for (x=0;x<x_dim;x++)
       {
          value = irint(image[x+y*x_physical_dim]);
          if (signed_flag)
             {if (value < -254) value = -254;}
          else
             {if (value < 0) value = 0;} if (value > 255) value = 255;
          putpix(ifp,value);
       }
   iclose(ifp);
} read_ubc_double_image_file(fname,
                        image,x_physical_dim,x_dim_p,y_dim_p)
        char *fname;
        double *image;
        int x_physical_dim,*x_dim_p, *y_dim_p;

{
  IMAGE *ifp;
  char annote[1024];
  int x,y;
  int value;

ifp = iopen(fname,R);
  check_ifp(ifp,fname);

getheader(ifp,annote);
  *y_dim_p   = ifp->nrows;
  *x_dim_p   = ifp->ncols;

/*..Get input image into its array */
  for (y=0;y<*y_dim_p;y++)
    for (x=0;x<*x_dim_p;x++)
       {
          value = getpix(ifp);
          image[x+y*x_physical_dim] = value;
       }
}
``` mw/ubc_io.c       Thu Jul  2 18:28:04 1992       116 or/Makefile            Thu Jul  2 18:28:05 1992         117

```
CC = cc
OBJECTS = or.o data.o io.o ubc_main.o \
          ubc_io.o

CFLAGS =  $(FLAGS) -I/usr/local/include or:     $(OBJECTS) ubc_io.o data.h point.h
        $(CC)  $(FLAGS) -o or $(OBJECTS)   -lubc -lm $(OBJECTS):     data.h point.h
``` or/data.h          Thu Jul  2 18:28:06 1992           118

```c
#define DB_OFFSET_UNIT_FACTOR 6.0
define GEO_REGION_HALF_SIZE 1.5 define MAX_INT_ARRAY_DIM 32
define MAX_IMAGE_DIM 600 typedef int max_image[MAX_IMAGE_DIM][MAX_IMAGE_DIM];
typedef int max_int_array[MAX_INT_ARRAY_DIM][MAX_INT_ARRAY_DIM];
typedef char *str;

#define BPP8 8
define BPP1 1 define ONE_COMPONENT_MW 0
define MULTI_COMPONENT_MW 1 define UNSIGNED 0
define SIGNED 1 define LOW_VALUE 0
define HIGH_VALUE 255 define NO_NEIGHBOR 9
define NO_EDGE 8 define EMPTY_LP    1
define LEGAL_LP    2
define ILLEGAL_LP  3 include "point.h"

extern point neighbor_relative_pos[];
extern point neighbor_pos[];

/* images related data */
extern max_image  bdata, results, accumulated_bdata;

extern int x_dim, y_dim , QP_x_dim, QP_y_dim;
extern int min_x, max_x, min_y, max_y;

extern char bdata_fname[200], results_fname[200];

/* other parameters */
extern int start_x, start_y, end_x, end_y, step_x, step_y;
extern int  margin_x, margin_y;
```

```
or/io.c            Thu Jul  2 18:28:05 1992         119 include "data.h"

read_input_data()
{
  read_bdata_for_translation(start_x, start_y);
} output_results()
{
  write_ubc_image_file(results_fname,
                       results,MAX_IMAGE_DIM,
                       x_dim,y_dim,
                       BPP1, UNSIGNED);
}
``` or/or.c          Thu Jul  2 18:28:05 1992          120

```c
#include "data.h"
include <string.h> str make_file_name(s, n1,n2)
char s[];
int n1, n2;
{
  char suffix[20];
  char *result_s;
  result_s = (char*)malloc(200);

sprintf(suffix, ".%d.%d", n1, n2);

strcpy(result_s, s);
  return strcat(result_s , suffix);
} or()

{
  read_input_data();
  init_data();

perform_processing();
  output_results();
} init_data()
{
  int x, y;

min_x = margin_x;
  min_y = margin_y;
  max_x = x_dim - 2 - margin_x;
  max_y = y_dim - 2 - margin_y;

} perform_processing()
{
  int x, y;
  int result;
  int t_x, t_y;

int start_t_x = start_x;
  int start_t_y = start_y;
  int end_t_x = end_x;
  int end_t_y = end_y;
  int step_t_x = step_x;
  int step_t_y = step_y;

init_accumalated_bdata();

for (t_x=start_t_x; t_x<=end_t_x; t_x+=step_t_x)
    for (t_y=start_t_y; t_y<=end_t_y; t_y+=step_t_y)
      {
        read_bdata_for_translation(t_x, t_y);
        or_bdata_with_results();
      } process_results();
} read_bdata_for_translation(t_x, t_y)
int t_x, t_y;
{
  int bpp, signed_flag;
  read_ubc_image_file((make_file_name(bdata_fname,t_x, t_y)),
                       bdata,
```

```
or/or.c            Thu Jul  2 18:28:05 1992            121
                        MAX_IMAGE_DIM, &x_dim, &y_dim,
                        &bpp, &signed_flag);
} init_accumalated_bdata()
{
  int x, y;

/* put 1's in margins */
  for(x=0; x<x_dim; x++)
    for(y=0; y<=y_dim; y++)
      results[x][y] = 1;

/* and 0's in the processed region */
  for(x=min_x; x<=max_x; x++)
    for(y=min_y; y<=max_y; y++)
      results[x][y] = 0;
} or_bdata_with_results()
{ int x, y;

for(x=min_x; x<=max_x; x++)
    for(y=min_y; y<=max_y; y++)
      results[x][y] |= bdata[x][y];
} define MAX_DEFECTS 50 point defect_component_lower_left[MAX_DEFECTS] ;
point defect_component_upper_right[MAX_DEFECTS] ;

int last_defect_number = 0 ;

point_contained_in_defect(x, y, i)
int x,y,i ;
{
  int in_x_range, in_y_range ;

in_x_range = ((defect_component_lower_left[i].x - 1 <= x) &&
                (defect_component_upper_right[i].x + 1 >= x)) ;
  in_y_range = ((defect_component_lower_left[i].y - 1 <= y) &&
                (defect_component_upper_right[i].y + 1 >= y)) ;

return (in_x_range && in_y_range) ;
} add_point_to_defect(x, y, i)
int x,y,i ;
{
  if (x < defect_component_lower_left[i].x)
    defect_component_lower_left[i].x = x ;
  if (x > defect_component_lower_left[i].x)
    defect_component_upper_right[i].x = x ;
  if (y < defect_component_lower_left[i].y)
    defect_component_lower_left[i].y = y ;
  if (y > defect_component_upper_right[i].y)
    defect_component_upper_right[i].y = y ;
} add_new_defect(x,y)
int x,y ;
{ defect_component_upper_right[last_defect_number].y = y ;
``` or/or.c          Thu Jul  2 18:28:05 1992          122

```c
    defect_component_lower_left[last_defect_number].y = y ;
    defect_component_upper_right[last_defect_number].x = x ;
    defect_component_lower_left[last_defect_number].x = x ;

last_defect_number++ ;
} add_defected_point(x, y)
int x,y ;
{
  int added = 0 ;
  int i ;

for (i = 0; i < last_defect_number; i++) {
    if (point_contained_in_defect(x, y, i))
      add_point_to_defect(x, y, i) ;
    added++ ;
    }
  if (!added) add_new_defect(x,y) ;
} print_defects()
{
  int i ;
  int width, hight ;

for (i = 0; i < last_defect_number; i++) {
    hight =  defect_component_upper_right[i].y -
      defect_component_lower_left[i].y ;
    width =  defect_component_upper_right[i].x -
      defect_component_lower_left[i].x ;
    printf(" %d  %d  %d  %d\n",
      defect_component_lower_left[i].x,
      defect_component_lower_left[i].y,
      width, hight) ;
  }
} process_results()
{
  int x, y;

/* print illegal locations */
  for(x=min_x; x<=max_x; x++)
    for(y=min_y; y<=max_y; y++)
      if (results[x][y] == 0)
        add_defected_point(x,y) ;

print_defects() ;

/*       printf("%3d %3d 1 1 \n", x, y); */
}
```

```
or/point.h            Thu Jul  2 18:28:06 1992           123
/*---------------------------------------------------------------------*/
/* point.h                                                             */
/*---------------------------------------------------------------------*/

/* points */ typedef struct {
  int x;
  int y;
} point;

extern point empty_point;
define NULL_POINT empty_point point make_point();
int point_equal();
point point_add();
```

```
or/ubc_io.c          Thu Jul  2 18:28:05 1992          124

/**********************************************************************/
/*          independent ubc image read and write functions           */
/**********************************************************************/
#include "data.h"

include <stdio.h>
include <math.h>
include <ubc/image.h>
include <ubc/maclib.h> write_ubc_image_file(fname,image,x_physical_dim,x_dim,y_dim,bpp,signed_flag)
     char *fname;
     int *image;
     int x_physical_dim, x_dim, y_dim,bpp,signed_flag;

{
  IMAGE *ifp;
  int x,y;
  char annote[1024];

ifp = iopen(fname,W);
  check_ifp(ifp,fname);

ifp->nrows    = y_dim;
  ifp->ncols    = x_dim;
  ifp->bpp      = bpp;
  ifp->signed   = signed_flag;
  ifp->positive = 1;
  putheader(ifp,annote);

for (y=0; y<y_dim; y++)
     for (x=0;x<x_dim;x++)
        putpix(ifp,image[x+y*x_physical_dim]);

iclose(ifp);
} check_ifp(ifp, file_name)
  IMAGE *ifp;
  char file_name[];
{
  char msg[200];

sprintf(msg, " cannot perform operation with file: %s \n", file_name);

require(ifp,msg);
} read_ubc_image_file(fname,image,x_physical_dim,x_dim_p,y_dim_p,bpp_p,signed_flag
_p)
     char *fname;
     int *image;
     int x_physical_dim,*x_dim_p, *y_dim_p,*bpp_p,*signed_flag_p;

{
  IMAGE *ifp;
  char annote[1024];

int x,y;

ifp = iopen(fname,R);
  check_ifp(ifp,fname);

getheader(ifp,annote);
  *y_dim_p      = ifp->nrows;
  *x_dim_p      = ifp->ncols;
  *bpp_p        = ifp->bpp+1;
  *signed_flag_p = ifp->signed;

/*..Get input image into its array */
  for (y=0;y<*y_dim_p;y++)
``` or/ubc_io.c          Thu Jul  2 18:28:05 1992          125

```
      for (x=0;x<*x_dim_p;x++)
        image[x+y*x_physical_dim] = getpix(ifp);

iclose(ifp);
 }

/*------------------------------------------------------------*/ write_ubc_double_image_file(fname,
                           image,x_physical_dim,x_dim,y_dim,bpp,signed_flag)
     char *fname;
     double *image;
     int x_physical_dim, x_dim, y_dim,bpp,signed_flag;

{
  IMAGE *ifp;
  int x,y;
  char annote[1024];
  int value;

ifp = iopen(fname,W);
  check_ifp(ifp,fname);

ifp->nrows   = y_dim;
  ifp->ncols   = x_dim;
  ifp->bpp     = bpp;
  ifp->signed  = signed_flag;
  ifp->positive = 1;
  putheader(ifp,annote);

for (y=0; y<y_dim; y++)
     for (x=0;x<x_dim;x++)
        {
          value = irint(image[x+y*x_physical_dim]);
          if (signed_flag)
             {if (value < -254) value = -254;}
          else
             {if (value < 0) value = 0;} if (value > 255) value = 255;
          putpix(ifp,value);
        }
   iclose(ifp);
} read_ubc_double_image_file(fname,
                          image,x_physical_dim,x_dim_p,y_dim_p)
     char *fname;
     double *image;
     int x_physical_dim,*x_dim_p, *y_dim_p;

{
  IMAGE *ifp;
  char annote[1024];
  int x,y;
  int value;

ifp = iopen(fname,R);
  check_ifp(ifp,fname);

getheader(ifp,annote);
  *y_dim_p   = ifp->nrows;
  *x_dim_p   = ifp->ncols;

/*..Get input image into its array */
  for (y=0;y<*y_dim_p;y++)
    for (x=0;x<*x_dim_p;x++)
       {
         value = getpix(ifp);
         image[x+y*x_physical_dim] = value;
       } iclose(ifp);
``` or/ubc_io.c          Thu Jul  2 18:28:05 1992          126
}

```c
read_vector_from_text_file(V_file_name, V, length_p)
     int V[];
     int *length_p;
     char V_file_name[];
{
  int x;

FILE *fp;
  fp = fopen(V_file_name, "r");
  if (fp == NULL)
    {
      fprintf(stderr,"cannot read text file %s \n", V_file_name);
      exit(1);
    } fscanf(fp,"%d",length_p);

for(x=0; x < *length_p; x++)
    fscanf(fp,"%d",&V[x]);
}
``` or/ubc_main.c            Thu Jul  2 18:28:06 1992            127

```c
#include "data.h"

include <stdio.h>
include <math.h> include <ubc/image.h>
include <ubc/maclib.h>
include <ubc/imlib.h> include <strings.h> char *dfltab[] = {
    "-bdata",      "default_bdata",
    "-results",    "default_results", "-start_x",    "0",
    "-start_y",    "0",
    "-end_x",      "3",
    "-end_y",      "3",
    "-step_x",     "1",
    "-step_y",     "1", "-margin_x",   "0",
    "-margin_y",   "0",
    0 };

main(argc,argv)
     int argc;
     char *argv[];
{
  initargs(argc,argv,dfltab);

help_utility();

init_global_parameters();

or();

}
help_utility()
{
  if (flagp("-help"))
    {
      printf("usage: \n\
or \n\
(file names)\n\
-bdata,     (default_bdata) \n\
-results,   (default_results) \n\
(translation parameters:) \n\
-start_x,   (0), \n\
-start_y,   (0), \n\
-end_x,     (3), \n\
-end_y,     (3), \n\
-step_x,    (3), \n\
-step_y,    (3), \n\
(image margin parameters:)\n\
-margin_x,  0, \n\
-margin_y,  0, \n");

exit(1);
    }
} init_global_parameters()
{
  strcpy(bdata_fname, keyarg("-bdata"));
  strcpy(results_fname, keyarg("-results"));

start_x = atoi(keyarg("-start_x"));
  start_y = atoi(keyarg("-start_y"));
``` or/ubc_main.c        Thu Jul  2 18:28:06 1992        128

```
    end_x = atoi(keyarg("-end_x"));
    end_y = atoi(keyarg("-end_y"));
    step_x = atoi(keyarg("-step_x"));
    step_y = atoi(keyarg("-step_y"));

margin_x = atoi(keyarg("-margin_x"));
    margin_y = atoi(keyarg("-margin_y"));
}
``` rf/Makefile          Thu Jul  2 18:28:07 1992          129

```
CC = cc
OBJECTS = rf.o data.o io.o ubc_main.o point.o \
          ubc_io.o

CFLAGS = $(FLAGS) -I/usr/local/include rf:     $(OBJECTS) ubc_io.o data.h point.h
        $(CC) $(FLAGS) -o rf $(OBJECTS)   -lubc -lm $(OBJECTS):   data.h point.h
``` rf/data.c        Thu Jul  2 18:28:07 1992        130

```c
#include "data.h"

/* images related data */
max_image  bdata, results;

int x_dim, y_dim , QP_x_dim, QP_y_dim;
int min_x, max_x, min_y, max_y;

char bdata_fname[200], results_fname[200];

/* other parameters */ int r_size_x;
int r_size_y;
int r_step_x;
int r_step_y;
int t_start_x;
int t_start_y;
int t_n_x;
int t_n_y;
int t_step_x;
int t_step_y;

int  margin_x, margin_y;
``` rf/data.h          Thu Jul   2 18:28:09 1992          131

```c
#define DB_OFFSET_UNIT_FACTOR 6.0
define GEO_REGION_HALF_SIZE 1.5 define MAX_INT_ARRAY_DIM 32
define MAX_IMAGE_DIM 600 typedef int max_image[MAX_IMAGE_DIM][MAX_IMAGE_DIM];
typedef int max_int_array[MAX_INT_ARRAY_DIM][MAX_INT_ARRAY_DIM];
typedef char *str;

#define BPP3 3
define BPP1 1 define UNSIGNED 0
define SIGNED 1 define LOW_VALUE 0
define HIGH_VALUE 255 include "point.h"

/* images related data */
extern max_image  bdata, results;

extern int x_dim, y_dim , QP_x_dim, QP_y_dim;
extern int min_x, max_x, min_y, max_y;

extern char bdata_fname[200], results_fname[200];

/* other parameters */ extern int r_size_x;
extern int r_size_y;
extern int r_step_x;
extern int r_step_y;
extern int t_start_x;
extern int t_start_y;
extern int t_n_x;
extern int t_n_y;
extern int t_step_x;
extern int t_step_y;

extern int  margin_x, margin_y;
```

```
rf/io.c           Thu Jul  2 18:28:07 1992         132 include "data.h"

/* fix dimensions */ read_input_data()
{
  read_bdata_for_translation(t_start_x, t_start_y);
} output_results()
{
  write_ubc_image_file(results_fname,
                       results,MAX_IMAGE_DIM,
                       x_dim,y_dim,
                       BPP1, UNSIGNED);
}
``` rf/point.c          Thu Jul  2 18:28:08 1992          133

```c
#include "data.h"
#include "stdio.h"

include <math.h>

/*--------------------------------------------------------------------*/
/* point.c                                                            */
/*--------------------------------------------------------------------*/ point make_point(x,y)
     int x, y;
{
  point temp;
  temp.x = x;
  temp.y = y;
  return temp;
} point point_add(pt1,pt2)
point pt1,pt2;
{
  return make_point(pt1.x + pt2.x, pt1.y + pt2.y);
} point point_negate(pt)
point pt;
{
  return make_point(- pt.x, - pt.y);
} point point_sub(pt1,pt2)
point pt1,pt2;
{
  return make_point(pt1.x - pt2.x, pt1.y - pt2.y);
} point_dist2(pt1,pt2)
point pt1,pt2;
{
  int dx = pt1.x - pt2.x;
  int dy = pt1.y - pt2.y;

return (dx*dx+dy*dy);
} null_point(pt)
     point pt;
{
  return (pt.x == -1);
} point_equal(pt1,pt2)
point pt1,pt2;
{
  return (pt1.x == pt2.x && pt1.y == pt2.y);
}
```

```
rf/point.h              Thu Jul  2 18:28:10 1992            134
/*---------------------------------------------------------------*/
/* point.h                                                       */
/*---------------------------------------------------------------*/

/* points */ typedef struct {
  int x;
  int y;
} point;

extern point empty_point;
define NULL_POINT empty_point point make_point();
int point_equal();
point point_add();
```

```
rf/rf.c              Thu Jul  2 18:28:08 1992        135
#include "data.h"
include <string.h>
#include <math.h>
include <stdio.h> str make_file_name();

define MAX_REGIONS 100
#define BIGNUM 32000
#define MIN_SUFFIENT_REGION_WIDTH  15
#define MIN_SUFFIENT_REGION_HEIGHT 15
define MAX_TRANSLATIONS 20 include "cod_reg.h"

int best_region_rank[MAX_REGIONS][MAX_REGIONS];
int best_region_t_x[MAX_REGIONS][MAX_REGIONS];
int best_region_t_y[MAX_REGIONS][MAX_REGIONS];

char translations_map[MAX_REGIONS][MAX_REGIONS]
                    [MAX_TRANSLATIONS]
                    [MAX_TRANSLATIONS] ;
int translations_and [MAX_TRANSLATIONS]
                    [MAX_TRANSLATIONS] ;
int translations_sum [MAX_TRANSLATIONS]
                    [MAX_TRANSLATIONS] ;

int min_r_i, max_r_i, min_r_j, max_r_j;

rf()
{
  read_input_data();
  init_data();

perform_processing();
  output_results();
} init_data()
{
  min_x = margin_x;
  min_y = margin_y;
  max_x = x_dim - 2 - margin_x;
  max_y = y_dim - 2 - margin_y;

init_translations_sum() ;
  init_translations_and() ;
  min_r_i = 0;
  max_r_i = ceil((max_x - min_x + 1) / (double) r_step_x);
  min_r_j = 0;
  max_r_j = ceil((max_y - min_y + 1) / (double) r_step_y);
} perform_processing()
{
  perform_first_stage();
  perform_second_stage();
}

/*-------------------------------------------------*/
/* first processing step                           */
/*-------------------------------------------------*/
perform_first_stage()
{
  int t_x, t_y, t_strength, max_strength, best_t_x, best_t_y;
  int best_n ;
  int trans_c_x = 0, trans_c_y = 0;
``` rf/rf.c          Thu Jul  2 18:28:08 1992          136

```
   max_strength = 0;

init_rank_data();

for (t_x=t_start_x; t_x<t_start_x+t_n_x*t_step_x; t_x+=t_step_x) {
      for (t_y=t_start_y; t_y<t_start_y+t_n_y*t_step_y; t_y+=t_step_y)
         {
            read_bdata_for_translation(t_x, t_y);
            compute_regions_ranks(t_x, t_y, &t_strength, trans_c_x, trans_c_y);
            if (t_strength > max_strength)
               {
                  max_strength = t_strength;
                  best_t_x = t_x;
                  best_t_y = t_y;
                  best_n = 1;
               }
            else if (t_strength == max_strength)
               {
                  best_t_x += t_x;
                  best_t_y += t_y;
                  best_n ++;
               }
            trans_c_y++ ;
         }
      trans_c_x++ ; trans_c_y = 0 ;
   } if (best_n > 0)
      printf("#best translation: %4.1f %4.1f\n",
             best_t_x / (double) best_n,
             best_t_y / (double) best_n);
   else
      printf("#best translation: -%4.1f -%4.1f\n", 0,0);

print_rank_data();
   print_translation_map() ;
} compute_regions_ranks(t_x, t_y, t_strength_p, trans_n_x, trans_n_y)
     int t_x, t_y, *t_strength_p;
     int trans_n_x, trans_n_y ;
{
  int r_i, r_j;
  int value;
  int t_strength;

t_strength = 0;

for(r_i = min_r_i; r_i < max_r_i; r_i ++)
    for(r_j = min_r_j; r_j < max_r_j; r_j ++)
       {
         value = compute_region_rank(r_i, r_j) ;

translations_sum[trans_n_x][trans_n_y] +=
            (translations_map[r_i][r_j][trans_n_x][trans_n_y]==0 && value==0) ;

translations_map[r_i][r_j][trans_n_x][trans_n_y] |= (value == 0) ;

/* 4-connected neighbors dilation */
/*
         if (trans_n_x+1<MAX_TRANSLATIONS)
            {
              translations_sum[trans_n_x+1][trans_n_y] +=
              (translations_map[r_i][r_j][trans_n_x+1][trans_n_y]==0 && value==0);
              translations_map[r_i][r_j][trans_n_x+1][trans_n_y] |= (value == 0);
            }
         if (trans_n_x-1>=0)
            {
              translations_sum[trans_n_x-1][trans_n_y] +=
              (translations_map[r_i][r_j][trans_n_x-1][trans_n_y]==0 && value==0);
              translations_map[r_i][r_j][trans_n_x-1][trans_n_y] |= (value == 0);
            }
```

```
rf/rf.c          Thu Jul  2 18:28:08 1992                137 if (trans_n_y+1<MAX_TRANSLATIONS)
              {
                translations_sum[trans_n_x][trans_n_y+1] +=
                (translations_map[r_i][r_j][trans_n_x][trans_n_y+1]==0 && value==0);
                translations_map[r_i][r_j][trans_n_x][trans_n_y+1] |= (value == 0);
              }
           if (trans_n_y-1>=0)
              {
                translations_sum[trans_n_x][trans_n_y-1] +=
                (translations_map[r_i][r_j][trans_n_x][trans_n_y-1]==0 && value==0);
                translations_map[r_i][r_j][trans_n_x][trans_n_y-1] |= (value == 0);
              }
 */
           translations_and[trans_n_x][trans_n_y] &= (value==0) ;

if (value < best_region_rank[r_i][r_j])
              {
                best_region_rank[r_i][r_j] = value;
                best_region_t_x  [r_i][r_j] = t_x;
                best_region_t_y  [r_i][r_j] = t_y;
              } if (sufficiently_large_region(r_i, r_j))
                t_strength += (value == 0); /* value reflects number of violations */
         }
 /*  printf("#[%3d %3d]=%4d\n", t_x, t_y, t_strength); */

*t_strength_p = t_strength;
 } sufficiently_large_region(r_i, r_j)
      int r_i, r_j;
 { int w, h;
   w = region_end_x(r_i, r_j) - region_start_x(r_i, r_j) + 1;
   h = region_end_y(r_i, r_j) - region_start_y(r_i, r_j) + 1;

return (w >= MIN_SUFFIENT_REGION_WIDTH  &&
           h >= MIN_SUFFIENT_REGION_HEIGHT);
 } compute_region_rank(r_i, r_j)
 /*
   rank is proportional to number of violations,
    that is, number of 0's in region
 */
 int r_i, r_j;
 {
  int sum;
   int x0, x1, y0, y1;
   int x, y;

x0 = region_start_x(r_i,r_j);
   x1 = region_end_x(r_i,r_j);
   y0 = region_start_y(r_i,r_j);
   y1 = region_end_y(r_i,r_j);

sum = 0;
   for(x=x0; x<x1; x++)
     for(y=y0; y<y1; y++)
        sum += ! bdata[x][y];

return sum;
 }

/*--------------------------------------------------------*/
 /* second processing step                                 */
 /*--------------------------------------------------------*/

Perform_second_stage()
 {
```

```
rf/rf.c          Thu Jul  2 18:28:08 1992           138 int t_x, t_y;
  init_result_data();

for (t_x=t_start_x; t_x<t_start_x+t_n_x*t_step_x; t_x+=t_step_x)
    for (t_y=t_start_y; t_y<t_start_y+t_n_y*t_step_y; t_y+=t_step_y)
      {
        read_bdata_for_translation(t_x, t_y);
        copy_winning_regions_data(t_x,t_y);
      }
} copy_winning_regions_data(t_x, t_y)
{
  int r_i, r_j;

for(r_i = min_r_i; r_i < max_r_i; r_i ++)
    for(r_j = min_r_j; r_j < max_r_j; r_j ++)
      {
        if (t_x == best_region_t_x[r_i][r_j] &&
            t_y == best_region_t_y[r_i][r_j])
          copy_current_region_data(r_i, r_j);
      }
} copy_current_region_data(r_i, r_j)
int r_i, r_j;
{
  int x0, x1, y0, y1;
  int x, y;

x0 = region_start_x(r_i,r_j);
  x1 = region_end_x(r_i,r_j);
  y0 = region_start_y(r_i,r_j);
  y1 = region_end_y(r_i,r_j);

for(x=x0; x<x1; x++)
    for(y=y0; y<y1; y++)
      results[x][y] &= bdata[x][y];
}

/*------------------------------------------------------------*/
/*                                                            */
/*------------------------------------------------------------*/
read_bdata_for_translation(t_x, t_y)
int t_x, t_y;
{
  int bpp, signed_flag;
  read_ubc_image_file((make_file_name(bdata_fname,t_x, t_y)),
                      bdata,
                      MAX_IMAGE_DIM, &x_dim, &y_dim,
                      &bpp, &signed_flag);
} init_result_data()
{
  int x, y;

for(x=0; x<x_dim; x++)
    for(y=0; y<y_dim; y++)
      results[x][y] = 1;
} str make_file_name(s, n1,n2)
char s[];
int n1, n2;
{
  char suffix[20];
  char *result_s;
  result_s = (char*)malloc(200);
```

```
rf/rf.c          Thu Jul   2 18:28:08 1992             139 sprintf(suffix, ".%d.%d", n1, n2);

strcpy(result_s, s);
    return strcat(result_s , suffix);
  }

/*---------------------------------------------------------*/
  /*      data access functions                           */
  /*---------------------------------------------------------*/ region_start_x(r_i,r_j)
  int r_i, r_j;
  {
    return min(max_x, min_x + r_i * r_step_x);
  } region_start_y(r_i,r_j)
  int r_i, r_j;
  {
    return min(max_y, min_y + r_j * r_step_y);
  } region_end_x(r_i,r_j)
  int r_i, r_j;
  {
    return min(max_x+1, min_x + r_i * r_step_x + r_size_x);
  } region_end_y(r_i,r_j)
      int r_i, r_j;
  {
    return min(max_y+1, min_y + r_j * r_step_y + r_size_y);
  } init_translations_sum() {
    int tran_c_x, tran_c_y ;

for (tran_c_x = 0 ; tran_c_x < t_n_x ; tran_c_x++)
      for (tran_c_y = 0 ; tran_c_y < t_n_y ; tran_c_y++)
        translations_sum[tran_c_x][tran_c_y] = 0 ;
  } init_translations_and() {
    int tran_c_x, tran_c_y ;

for (tran_c_x = 0 ; tran_c_x < t_n_x ; tran_c_x++)
      for (tran_c_y = 0 ; tran_c_y < t_n_y ; tran_c_y++)
        translations_and[tran_c_x][tran_c_y] = 1 ;
  } init_rank_data()
  {
  int r_i, r_j;

for(r_i = min_r_i; r_i <  max_r_i; r_i ++)
    for(r_j = min_r_j; r_j <  max_r_j; r_j ++)
      {
          best_region_rank[r_i][r_j] = BIGNUM;
          best_region_t_x [r_i][r_j] = 0;
          best_region_t_y [r_i][r_j] = 0;
      }
  } print_rank_data()
  { int r_i, r_j;
    int x0, x1, y0, y1;
```

```
rf/rf.c          Thu Jul  2 18:28:08 1992                         140
     printf("#regions data\n");
     for(r_i = min_r_i; r_i <  max_r_i; r_i ++)
       for(r_j = min_r_j; r_j <  max_r_j; r_j ++)
         { x0 = region_start_x(r_i,r_j);
           x1 = region_end_x(r_i,r_j);
           y0 = region_start_y(r_i,r_j);
           y1 = region_end_y(r_i,r_j);

printf("#[%3d %3d] x=[%3d..%3d] y=[%3d..%3d] #=%5d best=[%4d %4d]\n ",
                  r_i, r_j,
                  x0, x1, y0, y1,
                  best_region_rank[r_i][r_j],
                  best_region_t_x [r_i][r_j],
                  best_region_t_y [r_i][r_j]);
           /* data for compare */
           if (best_region_rank[r_i][r_j] > 0)
             printf("%d %d %d %d\n", x0, y0, x1-x0, y1-y0) ;

}
} print_translation_map()
{
  int r_i, r_j, t_i, t_j ;
  int tran_c_x = 0, tran_c_y = 0 ;
  int x0, x1, y0, y1 ;
  float cmass_x,cmass_y;
  int delta_x,delta_y;
  int index_x,index_y;
  FILE *tF,*sh_x_F,*sh_y_F ;

tF = fopen("translations_map", "w") ;
  sh_x_F = fopen("shift.x", "w") ;
  sh_y_F = fopen("shift.y", "w") ;
  fprintf(tF," r_size_x  %d   r_size_y %d \n r_step_x  %d   r_step_y %d \n t_start
_x %d t_start_y %d \n t_step_x %d t_step_y %d \n",
          r_size_x, r_size_y,
          r_step_x, r_step_y,
          t_start_x, t_start_y,
          t_step_x, t_step_y) ;

for(r_i = min_r_i; r_i <  max_r_i; r_i ++)
    for(r_j = min_r_j; r_j <  max_r_j; r_j ++) { x0 = region_start_x(r_i,r_j);
      x1 = region_end_x(r_i,r_j);
      y0 = region_start_y(r_i,r_j);
      y1 = region_end_y(r_i,r_j);

fprintf(tF, "\nregion : [%d, %d] x : [%d, %d] y : [%d, %d]\n\n",
              r_i, r_j, x0, x1, y0, y1) ;

for (tran_c_y = 0 ; tran_c_y < t_n_y ; tran_c_y++) {
        for (tran_c_x = 0 ; tran_c_x < t_n_x ; tran_c_x++)
          fprintf (tF," %d ", translations_map[r_i][r_j][tran_c_x][tran_c_y]) ;
        fprintf(tF, " \n") ;
      }
    } cod_reg(translations_sum,t_n_x,t_n_y,&cmass_x,&cmass_y);

index_x = floor(cmass_x + 0.5);
  index_y = floor(cmass_y + 0.5);
  delta_x = floor(cmass_x*t_step_x + 0.5)-(t_n_x-1)*t_step_x/2;
  delta_y = floor(cmass_y*t_step_y + 0.5)-(t_n_y-1)*t_step_x/2;

fprintf(tF,"\n sum : \n") ;
  for (tran_c_y = 0 ; tran_c_y < t_n_y ; tran_c_y++) {
    for (tran_c_x = 0 ; tran_c_x < t_n_x ; tran_c_x++)
      {
        if (tran_c_x==index_x && tran_c_y==index_y)
          fprintf (tF," [%3d]", translations_sum[tran_c_x][tran_c_y]) ;
        else
          fprintf (tF," %4d ", translations_sum[tran_c_x][tran_c_y]) ;
```

```
rf/rf.c          Thu Jul  2 18:28:08 1992              141
    }
      fprintf(tF, " \n") ;
   }
      fprintf(tF,"\n -and- (without dilation) : \n") ;
    for (tran_c_y = 0 ; tran_c_y < t_n_y ; tran_c_y++) {
      for (tran_c_x = 0 ; tran_c_x < t_n_x ; tran_c_x++)

fprintf (tF," %d ", translations_and[tran_c_x][tran_c_y]) ;
      fprintf(tF, " \n") ;
    } fprintf(tF,"\nDelta_X = %d  ,    Delta_Y = %d\n", delta_x,delta_y);

fprintf(sh_x_F , "%d" , delta_x) ;
    fprintf(sh_y_F , "%d" , delta_y) ;

for(r_i = min_r_i; r_i <  max_r_i; r_i ++)
      for(r_j = min_r_j; r_j <  max_r_j; r_j ++) { x0 = region_start_x(r_i,r_j);
        x1 = region_end_x(r_i,r_j);
        y0 = region_start_y(r_i,r_j);
        y1 = region_end_y(r_i,r_j);

if (translations_map[r_i][r_j][index_x][index_y]==0)
          fprintf(tF, "\nRegistration defect : [%d , %d]   %d X %d \n\n",
                  x0, y0, x1-x0, y1-y0) ;
      } fclose(tF);
  fclose(sh_x_F);
  fclose(sh_y_F);

} min(x,y)
{
  return (x < y) ? x : y;
}
``` rf/ubc_io.c        Thu Jul  2 18:28:09 1992        142

```c
/****************************************************************/
/*           independent ubc image read and write functions     */
/****************************************************************/
#include "data.h"

include <stdio.h>
include <math.h>
include <ubc/image.h>
include <ubc/maclib.h> write_ubc_image_file(fname,image,x_physical_dim,x_dim,y_dim,bpp,signed_flag)
     char *fname;
     int *image;
     int x_physical_dim, x_dim, y_dim,bpp,signed_flag;

{
  IMAGE *ifp;
  int x,y;
  char annote[1024];

ifp = iopen(fname,W);
  check_ifp(ifp,fname);

ifp->nrows    = y_dim;
  ifp->ncols    = x_dim;
  ifp->bpp      = bpp;
  ifp->signed   = signed_flag;
  ifp->positive = 1;
  putheader(ifp,annote);

for (y=0; y<y_dim; y++)
     for (x=0;x<x_dim;x++)
        putpix(ifp,image[x+y*x_physical_dim]);

iclose(ifp);
} check_ifp(ifp, file_name)
   IMAGE *ifp;
   char file_name[];
{
  char msg[200];

sprintf(msg, " cannot perform operation with file: %s \n", file_name);

require(ifp,msg);
} read_ubc_image_file(fname,image,x_physical_dim,x_dim_p,y_dim_p,bpp_p,signed_flag
_p)
     char *fname;
     int *image;
     int x_physical_dim,*x_dim_p, *y_dim_p,*bpp_p,*signed_flag_p;

{
  IMAGE *ifp;
  char annote[1024];

int x,y;

ifp = iopen(fname,R);
  check_ifp(ifp,fname);

getheader(ifp,annote);
  *y_dim_p       = ifp->nrows;
  *x_dim_p       = ifp->ncols;
  *bpp_p         = ifp->bpp+1;
  *signed_flag_p = ifp->signed;

/*..Get input image into its array */
for (y=0;y<*y_dim_p;y++)
```

```
rf/ubc_io.c           Thu Jul  2 18:28:09 1992          143
       for (x=0;x<*x_dim_p;x++)
          image[x+y*x_physical_dim] = getpix(ifp);
     iclose(ifp);
  }

/*-----------------------------------------------------------*/ write_ubc_double_image_file(fname,
                              image,x_physical_dim,x_dim,y_dim,bpp,signed_flag)
         char *fname;
         double *image;
         int x_physical_dim, x_dim, y_dim,bpp,signed_flag;
  {
    IMAGE *ifp;
    int x,y;
    char annote[1024];
    int value;

ifp = iopen(fname,W);
    check_ifp(ifp,fname);

ifp->nrows    = y_dim;
    ifp->ncols    = x_dim;
    ifp->bpp      = bpp;
    ifp->signed   = signed_flag;
    ifp->positive = 1;
    putheader(ifp,annote);

for (y=0; y<y_dim; y++)
       for (x=0;x<x_dim;x++)
         {
           value = irint(image[x+y*x_physical_dim]);
           if (signed_flag)
              {if (value < -254) value = -254;}
           else
              {if (value < 0) value = 0;} if (value > 255) value = 255;
           putpix(ifp,value);
         }
     iclose(ifp);
  } read_ubc_double_image_file(fname,
                             image,x_physical_dim,x_dim_p,y_dim_p)
         char *fname;
         double *image;
         int x_physical_dim, *x_dim_p, *y_dim_p;
  {
    IMAGE *ifp;
    char annote[1024];
    int x,y;
    int value;

ifp = iopen(fname,R);
    check_ifp(ifp,fname);

getheader(ifp,annote);
    *y_dim_p   = ifp->nrows;
    *x_dim_p   = ifp->ncols;

/*..Get input image into its array */
    for (y=0;y<*y_dim_p;y++)
      for (x=0;x<*x_dim_p;x++)
        {
          value = getpix(ifp);
          image[x+y*x_physical_dim] = value;
        } iclose(ifp);
``` rf/ubc_io.c          Thu Jul  2 18:28:09 1992          144
}

```c
read_vector_from_text_file(V_file_name, V, length_p)
     int V[];
     int *length_p;
     char V_file_name[];
{
  int x;

FILE *fp;
  fp = fopen(V_file_name, "r");
  if (fp == NULL)
     {
        fprintf(stderr,"cannot read text file %s \n", V_file_name);
        exit(1);
     } fscanf(fp,"%d",length_p);

for(x=0; x < *length_p; x++)
    fscanf(fp,"%d",&V[x]);
}
```

```
rf/ubc_main.c                Thu Jul  2 18:28:09 1992 include "data.h"

include <stdio.h>
include <math.h> include <ubc/image.h>
include <ubc/maclib.h>
include <ubc/imlib.h> include <strings.h> char *dfltab[] = {
      "-bdata",      "default_bdata",
      "-results",    "default_results", "-r_size_x",   "20",
      "-r_size_y",   "20", "-r_step_x",   "10",
      "-r_step_y",   "10", "-t_start_x",  "-3",
      "-t_start_y",  "-3", "-t_step_x",   "1",
      "-t_step_y",   "1", "-t_n_x",      "1",
      "-t_n_y",      "1", "-margin_x",   "0",
      "-margin_y",   "0",
      0 };

main(argc,argv)
     int argc;
     char *argv[];
{
  initargs(argc,argv,dfltab);

help_utility();

init_global_parameters();

rf();

} help_utility()
{
  if (flagp("-help"))
    {
      printf("usage: \n\
rf \n\
 -bdata,      (default_bdata) \n\
 -results,    (default_results) \n\
 -r_size_x,      (20), \n\
 -r_size_y,      (20), \n\
 -r_step_x,      (10), \n\
 -r_step_y,      (10), \n\
 -t_start_x,     (-3), \n\
 -t_start_y,     (-3), \n\
 -t_step_x,      (1), \n\
 -t_step_y,      (1), \n\
 -t_n_x,         (1), \n\
 -t_n_y,         (1), \n\
 -margin_x,   0, \n\
 -margin_y,   0, \n");

exit(1);
    }
}
``` rf/ubc_main.c          Thu Jul  2 18:28:09 1992          146
}

```c
init_global_parameters()
{
  strcpy(bdata_fname, keyarg("-bdata"));
  strcpy(results_fname, keyarg("-results"));

r_size_x = atoi(keyarg("-r_size_x"));
  r_size_y = atoi(keyarg("-r_size_y"));
  r_step_x = atoi(keyarg("-r_step_x"));
  r_step_y = atoi(keyarg("-r_step_y"));
  t_start_x = atoi(keyarg("-t_start_x"));
  t_start_y = atoi(keyarg("-t_start_y"));
  t_step_x = atoi(keyarg("-t_step_x"));
  t_step_y = atoi(keyarg("-t_step_y"));
  t_n_x = atoi(keyarg("-t_n_x"));
  t_n_y = atoi(keyarg("-t_n_y"));

margin_x = atoi(keyarg("-margin_x"));
  margin_y = atoi(keyarg("-margin_y"));
}
```

```
th/Makefile          Thu Jul  2 18:28:10 1992         147

CC = cc
OBJECTS = th.c deci.o data.o io.o ubc_main.o point.o \
          ubc_io.o CFLAGS = $(FLAGS) -I/usr/local/include th:     $(OBJECTS) ubc_io.o data.h point.h
        $(CC)  $(FLAGS) -o th $(OBJECTS)    -lubc -lm $(OBJECTS):    data.h point.h
``` th/data.c          Thu Jul  2 18:28:10 1992          148

```c
#include "data.h"

/* images related data */
max_image MW_props1, MW_props2, MW_props3, MW_props4;
max_image MW_Qdiffs, geos, results;

int x_dim, y_dim , QP_x_dim, QP_y_dim;
int min_x, max_x, min_y, max_y;

char props_fname[200], MW_Qdiffs_fname[200], geos_fname[200], results_fname[200]
;

/* thresholds related data */
max_int_array thresholds_table;
int thresholds_table_dim_x, thresholds_table_dim_y;
char thresholds_fname[200];

/* other parameters */
int offset_x, offset_y, margin_x, margin_y, max_flag;
double ge_radius;
```

```
th/data.h              Thu Jul  2 18:28:13 1992           149 define DB_OFFSET_UNIT_FACTOR 6.0 define MAX_INT_ARRAY_DIM 32
define MAX_IMAGE_DIM 600 typedef int max_image[MAX_IMAGE_DIM][MAX_IMAGE_DIM];
typedef int max_int_array[MAX_INT_ARRAY_DIM][MAX_INT_ARRAY_DIM];
typedef char *str;

#define BPP8 8
define BPP1 1 define ONE_COMPONENT_MW 0
define MULTI_COMPONENT_MW 1 define UNSIGNED 0
define SIGNED 1 define LOW_VALUE 0
define HIGH_VALUE 255 define NO_NEIGHBOR 9
define NO_EDGE 8 define EMPTY_LP   1
define LEGAL_LP   2
define ILLEGAL_LP 3 include "point.h"

extern point neighbor_relative_pos[];
extern point neighbor_pos[];

/* images related data */
extern max_image MW_props1, MW_props2, MW_props3, MW_props4;
extern max_image MW_Qdiffs, geos, results;

extern int x_dim, y_dim , QP_x_dim, QP_y_dim;
extern int min_x, max_x, min_y, max_y;

extern char props_fname[200], MW_Qdiffs_fname[200], geos_fname[200], results_fna
me[200];

/* thresholds related data */
extern max_int_array thresholds_table;
extern int thresholds_table_dim_x, thresholds_table_dim_y;
extern char thresholds_fname[200];

/* other parameters */
extern int offset_x, offset_y, margin_x, margin_y, max_flag;
extern double ge_radius;
```

```
th/deci.c                    Thu Jul  2 18:28:11 1992         150 include "data.h"
include <math.h>

/*
--     A  C
--     B  D

--   1 2    9 10
--   3 4   11 12
--
--   5 6   13 14
--   7 8   15 16
*/ define A 0
define B 1
#define C 2
#define D 3

MW_decision_function(MW_loc, geo, I_props, Q_diffs)
point MW_loc;
int geo;
int I_props[4];
int Q_diffs[4][4];

{
  int threshold;
  int components[4][4], component_areas[4] ;
  int i ;

threshold = compute_threshold(geo);
  compute_components_and_components_area(Q_diffs, components, component_areas);

/*
printf("Q_diffs: \n") ;
print_4_4_array(Q_diffs) ;
printf("components: \n") ;
print_4_4_array(components) ;
printf("components_areas: \n");
for (i=0; i < 4; i++)  printf(" %d", component_areas[i]) ;
  printf("\n") ;
*/ if (max_flag) return Reginal_decision_logic(component_areas, threshold) ;
    else return local_decision_login(components, component_areas,
                                    I_props, threshold) ;

}

Reginal_decision_logic(component_area, threshold)
int component_area[4], threshold ;
{
  return ( (component_area[A] < threshold) &&
           (component_area[B] < threshold) &&
           (component_area[C] < threshold) &&
           (component_area[D] < threshold) ) ;
} local_decision_login(components, component_area,
                                 I_props, threshold)
int components[4][4], component_area[4] ;
int I_props[4] ;
int threshold ;
{
  int sel[4], nsel[4] ;
  int relevant[4] ;
  int i ;
  int L_results[4] ;
```

```
th/deci.c              Thu Jul  2 18:28:11 1992          151
    for (i = 0; i < 4 ; i++) {
        sel[i] = (I_props[i] == LEGAL_LP) ;
        nsel[i] = (I_props[i] == ILLEGAL_LP) ;
    }

/*
    printf("I_props: \n");
    for (i=0; i < 4; i++)  printf(" %d", I_props[i]) ;
        printf("\n") ;
    */ relevant[A]= (((components[A][0] && sel[0]) ||
                   (components[A][1] && sel[1]) ||
                   (components[A][2] && sel[2]) ||
                   (components[A][3] && sel[3]))
                  &&
                  !((components[A][0] && nsel[0]) ||
                    (components[A][1] && nsel[1]) ||
                    (components[A][2] && nsel[2]) ||
                    (components[A][3] && nsel[3])));
    relevant[B]= (((components[B][1] && sel[1]) ||
                   (components[B][2] && sel[2]) ||
                   (components[B][3] && sel[3]))
                  &&
                  !((components[B][1] && nsel[1]) ||
                    (components[B][2] && nsel[2]) ||
                    (components[B][3] && nsel[3])));
    relevant[C]= (((components[C][2] && sel[2]) ||
                   (components[C][3] && sel[3]))
                  &&
                  !((components[C][2] && nsel[2]) ||
                    (components[C][3] && nsel[3])));
    relevant[D]= (((components[D][3] && sel[3]))
                  && !((components[D][3] && nsel[3])));

/*
    printf("relevant: \n");
    for (i=0; i < 4; i++)  printf(" %d", relevant[i]) ;
        printf("\n") ;
    */

L_results[A] = (component_area[A] < threshold);
    L_results[B] = (component_area[B] < threshold);
    L_results[C] = (component_area[C] < threshold);
    L_results[D] = (component_area[D] < threshold);

return ((relevant[A] && L_results[A]) ||
            (relevant[B] && L_results[B]) ||
            (relevant[C] && L_results[C]) ||
            (relevant[D] && L_results[D]) ||
            !(relevant[A] || relevant[B] || relevant[C] || relevant[D]));
} compute_threshold(geo)
int geo;
{
    return thresholds_table[0][geo];
} compute_components_and_components_area(Q_diffs,
                                       components,
                                       component_area)
int Q_diffs[4][4] ;
int components[4][4] ;
int component_area[4] ;
```

```
th/deci.c          Thu Jul  2 18:28:11 1992            152

{
    int q[17] ;
    int c0[4], c1[4][4], c2[4][4], c3[4][4] ;
    int P_diffs[4] ;
    int B_in_component_A, C_in_component_AB, D_in_component_ABC ;
    int i ;

binarize_components(Q_diffs,q) ;
    compute_P_diffs(Q_diffs, P_diffs) ;
/*
printf("P_diffs: \n");
for (i=0; i < 4; i++)  printf(" %d", P_diffs[i]) ;
   printf("\n") ;
*/
    compute_rank_0_connectivity(q, c0) ;
    compute_rank_1_connectivity(q, c1) ;
    compute_rank_2_connectivity(c1, c2) ;
    compute_rank_3_connectivity(c2, c3) ;

B_in_component_A   = c3[A][B];
    C_in_component_AB  = c3[A][C] || c2[B][C];
    D_in_component_ABC = c3[A][D] || c2[B][D] || c1[C][D];

components[A][0] = c0[A] ;
    components[A][1] = c3[A][B] ;
    components[A][2] = c3[A][C] ;
    components[A][3] = c3[A][D] ;

components[B][0] = 0 ;
    components[B][1] = c0[B]     && !B_in_component_A ;
    components[B][2] = c2[B][C]  && !B_in_component_A ;
    components[B][3] = c2[B][D]  && !B_in_component_A;

components[C][0]= 0 ;
    components[C][1]= 0 ;
    components[C][2]=   c0[C]    && !C_in_component_AB,
    components[C][3]=   c1[C][D] && !C_in_component_AB ;

components[D][0] = 0 ;
    components[D][1] = 0 ;
    components[D][2] = 0 ;
    components[D][3] = c0[D] && !D_in_component_ABC ;

compute_component_area(components, P_diffs, component_area) ;
} compute_rank_0_connectivity(q, c0)
int q[17] ;
int c0[4] ;
{
    c0[A] = q[1] || q[2] || q[3] || q[4];
    c0[B] = q[5] || q[6] || q[7] || q[8];
    c0[C] = q[9] || q[10] || q[11] || q[12];
    c0[D] = q[13] || q[14] || q[15] || q[16];
} compute_rank_1_connectivity(q, c1)
int q[17] ;
int c1[4][4] ;
{
    c1[A][B] = (q[3] || q[4]) && (q[5] || q[6]);
    c1[A][C] = (q[2] || q[4]) && (q[9] || q[11]);
    c1[A][D] = q[4] && q[13];
    c1[B][C] = q[6] && q[11];
    c1[B][D] = (q[6] || q[8]) && (q[13] || q[15]);
    c1[C][D] = (q[11] || q[12]) && (q[13] || q[14]);
} compute_rank_2_connectivity(c1, c2)
```

```
th/deci.c              Thu Jul  2 18:28:11 1992                    153
    int c1[4][4] ;
    int c2[4][4] ;
    {
        c2[A][B] = c1[A][B] || (c1[A][C] && c1[B][C]) || (c1[A][D] && c1[B][D]);
        c2[A][C] = c1[A][C] || (c1[A][B] && c1[B][C]) || (c1[A][D] && c1[C][D]);
        c2[A][D] = c1[A][D] || (c1[A][B] && c1[B][D]) || (c1[A][C] && c1[C][D]);
        c2[B][C] = c1[B][C] || (c1[A][B] && c1[A][C]) || (c1[B][D] && c1[C][D]);
        c2[B][D] = c1[B][D] || (c1[A][B] && c1[A][D]) || (c1[B][C] && c1[C][D]);
        c2[C][D] = c1[C][D] || (c1[A][C] && c1[A][D]) || (c1[B][C] && c1[B][D]);
    } compute_rank_3_connectivity(c2, c3)
    int c2[4][4] ;
    int c3[4][4] ;
    {
        c3[A][B] = c2[A][B] || (c2[A][C] && c2[B][C]) || (c2[A][D] && c2[B][D]);
        c3[A][C] = c2[A][C] || (c2[A][B] && c2[B][C]) || (c2[A][D] && c2[B][D]);
        c3[A][D] = c2[A][D] || (c2[A][B] && c2[B][D]) || (c2[A][C] && c2[C][D]);
    } binarize_components(Q_diffs, q)
    int Q_diffs[4][4] ;
    int q[17] ;
    {
        q[1]  = (Q_diffs[0][0] != 0) ;
        q[2]  = (Q_diffs[0][1] != 0) ;
        q[3]  = (Q_diffs[1][0] != 0) ;
        q[4]  = (Q_diffs[1][1] != 0) ;
        q[5]  = (Q_diffs[2][0] != 0) ;
        q[6]  = (Q_diffs[2][1] != 0) ;
        q[7]  = (Q_diffs[3][0] != 0) ;
        q[8]  = (Q_diffs[3][1] != 0) ;
        q[9]  = (Q_diffs[0][2] != 0) ;
        q[10] = (Q_diffs[0][3] != 0) ;
        q[11] = (Q_diffs[1][2] != 0) ;
        q[12] = (Q_diffs[1][3] != 0) ;
        q[13] = (Q_diffs[2][2] != 0) ;
        q[14] = (Q_diffs[2][3] != 0) ;
        q[15] = (Q_diffs[3][2] != 0) ;
        q[16] = (Q_diffs[3][3] != 0) ;
    } compute_P_diffs(Q_diffs, P_diffs)
    int Q_diffs[4][4];
    int P_diffs[4] ;
    {
        int i ;

P_diffs[0] = Q_diffs[0][0] + Q_diffs[0][1] + Q_diffs[1][0] + Q_diffs[1][1] ;
        P_diffs[1] = Q_diffs[2][0] + Q_diffs[2][1] + Q_diffs[3][0] + Q_diffs[3][1] ;
        P_diffs[2] = Q_diffs[0][2] + Q_diffs[0][3] + Q_diffs[1][2] + Q_diffs[1][3] ;
        P_diffs[3] = Q_diffs[2][2] + Q_diffs[2][3] + Q_diffs[3][2] + Q_diffs[3][3] ;
        for (i=0; i<4; i++) {
            P_diffs[i] = P_diffs[i]/4.0 ;
            P_diffs[i] = abs(P_diffs[i]) ;
        }
    } compute_component_area(components, P_diffs, component_area)
    int components[4][4] ;
    int P_diffs[4] ;
    int component_area[4] ;
    {
        int c,i ;

for (c=A; c <= D; c++) {
            component_area[c] = 0 ;
            for (i=0 ; i<4; i++) {
                component_area[c] += (components[c][i] * P_diffs[i]) ;
            }
        }
    }
``` th/deci.c          Thu Jul  2 18:28:11 1992          154

```c
/*--------------------------------------------------------*/
/*    other stuff                                         */
/*--------------------------------------------------------*/
min(a,b)
     int a, b;
{
  if (a<b)
    return a;
  else
    return b;
} abs(x)
{
  if (x>0)
    return x;
  else
    return -x;

} print_4_4_array(t)
int t[4][4] ;
{
  int i,j ;

for (i=0 ; i < 4; i++) {
    for (j=0; j < 4 ; j++) {
      printf (" %d", t[i][j]) ;
    }
    printf("\n") ;
  }
}
```

```
th/io.c          Thu Jul  2 18:28:11 1992         155
#include "data.h"
include <string.h> str add_suffix(s, suffix)
char s[], suffix[];
{
  char *result_s;
  result_s = (char*)malloc(200);
  strcpy(result_s, s);
  return strcat(result_s , suffix);
} read_input_data()
{
  int bpp, signed;
  read_ubc_image_file(add_suffix(props_fname,"1"),
                  MW_props1,
                  MAX_IMAGE_DIM, &x_dim, &y_dim,
                  &bpp, &signed);
  read_ubc_image_file(add_suffix(props_fname,"2"),
                  MW_props2,
                  MAX_IMAGE_DIM, &x_dim, &y_dim,
                  &bpp, &signed);
  read_ubc_image_file(add_suffix(props_fname,"3"),
                  MW_props3,
                  MAX_IMAGE_DIM, &x_dim, &y_dim,
                  &bpp, &signed);
  read_ubc_image_file(add_suffix(props_fname,"4"),
                  MW_props4,
                  MAX_IMAGE_DIM, &x_dim, &y_dim,
                  &bpp, &signed);
  read_ubc_image_file(geos_fname, geos,
                  MAX_IMAGE_DIM, &x_dim, &y_dim,
                  &bpp, &signed);
  read_ubc_image_file(MW_Qdiffs_fname, MW_Qdiffs,
                  MAX_IMAGE_DIM, &QP_x_dim, &QP_y_dim,
                  &bpp, &signed);
  if (QP_x_dim != 2 * x_dim ||
      QP_y_dim != 2 * y_dim)
    {
      printf("error in MW_Qdiffs file relative dimension\n");
      exit(1);
    } read_int_array_from_text_file(thresholds_table,
                  &thresholds_table_dim_x,
                  &thresholds_table_dim_y,
                  thresholds_fname);
} output_results()
{
  write_ubc_image_file(results_fname,
                  results,MAX_IMAGE_DIM,
                  x_dim,y_dim,
                  BPP1, UNSIGNED);
}
```

```
th/point.c          Thu Jul  2 18:28:11 1992         156
#include "data.h"
#include "stdio.h"

include <math.h>

/*----------------------------------------------------------------*/
/* point.c                                                       */
/*----------------------------------------------------------------*/ point make_point(x,y)
     int x, y;
{
  point temp;
  temp.x = x;
  temp.y = y;
  return temp;
} point point_add(pt1,pt2)
point pt1,pt2;
{
  return make_point(pt1.x + pt2.x, pt1.y + pt2.y);
} point point_negate(pt)
point pt;
{
  return make_point(- pt.x, - pt.y);
} point point_sub(pt1,pt2)
point pt1,pt2;
{
  return make_point(pt1.x - pt2.x, pt1.y - pt2.y);
} point_dist2(pt1,pt2)
point pt1,pt2;
{
  int dx = pt1.x - pt2.x;
  int dy = pt1.y - pt2.y;

return (dx*dx+dy*dy);
} null_point(pt)
     point pt;
{
  return (pt.x == -1);
} point_equal(pt1,pt2)
point pt1,pt2;
{
  return (pt1.x == pt2.x && pt1.y == pt2.y);
}
``` th/point.h           Thu Jul  2 18:28:13 1992           157

```
/*---------------------------------------------------------------*/
/* point.h                                                       */
/*---------------------------------------------------------------*/

/* points */ typedef struct {
  int x;
  int y;
} point;

extern point empty_point;
define NULL_POINT empty_point point make_point();
int point_equal();
point point_add();
``` th/th.c          Thu Jul  2 18:28:12 1992          158

```c
#include "data.h"
include <math.h> th()
{
  read_input_data();
  init_data();

perform_processing();
  output_results();
} init_data()
{
  min_x = margin_x;
  min_y = margin_y;
  max_x = x_dim - 2 - margin_x;
  max_y = y_dim - 2 - margin_y;

} perform_processing()
{
  int I_props[4], Qdiffs[4][4], result;
  point MW_loc;

int x, y;
  int geo;

for(x=min_x; x<=max_x; x++)
    for(y=min_y; y<=max_y; y++)
      {
        MW_loc = make_point(x, y);

printf ("[%d, %d]\n", x, y) ;

compute_MW_geo_value(MW_loc, &geo);

get_MW_I_props_value(MW_loc, I_props);

get_MW_Qdiffs_values(MW_loc, Qdiffs);

compute_MW_result(MW_loc, geo, I_props,
                  Qdiffs, &result);

set_MW_result(MW_loc, result);
      }
}
compute_MW_geo_value(MW_loc, geo_p)
point MW_loc;
int *geo_p;
{ double center_x, center_y;
  int x0, x1, y0, y1;
  int g, max_g;
  int x, y;

center_x = MW_loc.x + 1.0 + offset_x / DB_OFFSET_UNIT_FACTOR;
  center_y = MW_loc.y + 1.0 + offset_y / DB_OFFSET_UNIT_FACTOR;

/* set searching region limits */
  x0 = irint(center_x - ge_radius);
  x1 = irint(center_x + ge_radius);

y0 = irint(center_y - ge_radius);
  y1 = irint(center_y + ge_radius);

/* find max in region */
  max_g = 0;
  for(x=x0; x<=x1; x++)
    for(y=y0; y<=y1; y++)
      {
        g = geo_value(x,y);
```

```
th/th.c          Thu Jul  2 18:28:12 1992              159
            if (g > max_g)
              max_g = g;
        }

*geo_p = max_g;
 } geo_value(x,y)
int x,y;
{
   if (x>=0 && x<x_dim && y>=0 && y<y_dim)
      return geos[x][y];
   else return 0;
} get_MW_I_props_value(MW_loc, I_props)
point MW_loc;
int I_props[4];
{
   I_props[0] = MW_props1[MW_loc.x][MW_loc.y];
   I_props[1] = MW_props2[MW_loc.x][MW_loc.y];
   I_props[2] = MW_props3[MW_loc.x][MW_loc.y];
   I_props[3] = MW_props4[MW_loc.x][MW_loc.y];
} point P_to_QP_loc(MW_loc)
point MW_loc;
{
    return make_point (2*MW_loc.x, 2*MW_loc.y);
} get_MW_Qdiffs_values(MW_loc, Qdiffs)
point MW_loc;
int Qdiffs[4][4];
{
    point QP_loc;
    int i, j, QP_x, QP_y;

QP_loc = P_to_QP_loc(MW_loc);

for(i=0; i<4; i++)
      for(j=0; j<4; j++)
         {
            QP_x = QP_loc.x + i;
            QP_y = QP_loc.y + j;
            Qdiffs[i][j] = MW_Qdiffs[QP_x][QP_y];
         }
} compute_MW_result(MW_loc,  geo, I_props,
                   Qdiffs, result_p)
point MW_loc;
int geo;
int I_props[4];
int *result_p;
int Qdiffs[4][4];
{
   *result_p = MW_decision_function(MW_loc,  geo, I_props,
                                    Qdiffs);
} set_MW_result(MW_loc, result)
point MW_loc;
int result;
{
   results[MW_loc.x][MW_loc.y] = result;
}
```

```
/************************************************************/
/*       independent ubc image read and write functions     */
/************************************************************/
#include "data.h"

include <stdio.h>
include <math.h>
include <ubc/image.h>
include <ubc/maclib.h> write_ubc_image_file(fname,image,x_physical_dim,x_dim,y_dim,bpp,signed_flag)
     char *fname;
     int *image;
     int x_physical_dim, x_dim, y_dim,bpp,signed_flag;

{
  IMAGE *ifp;
  int x,y;
  char annote[1024];

ifp = iopen(fname,W);
  check_ifp(ifp,fname);

ifp->nrows   = y_dim;
  ifp->ncols   = x_dim;
  ifp->bpp     = bpp;
  ifp->signed  = signed_flag;
  ifp->positive = 1;
  putheader(ifp,annote);

for (y=0; y<y_dim; y++)
     for (x=0;x<x_dim;x++)
        putpix(ifp,image[x+y*x_physical_dim]);

iclose(ifp);
} check_ifp(ifp, file_name)
  IMAGE *ifp;
  char file_name[];
{
  char msg[200];

sprintf(msg," cannot perform operation with file: %s \n", file_name);

require(ifp,msg);
} read_ubc_image_file(fname,image,x_physical_dim,x_dim_p,y_dim_p,bpp_p,signed_flag
_p)
     char *fname;
     int *image;
     int x_physical_dim,*x_dim_p, *y_dim_p, *bpp_p, *signed_flag_p;

{
  IMAGE *ifp;
  char annote[1024];

int x,y;

ifp = iopen(fname,R);
  check_ifp(ifp,fname);

getheader(ifp,annote);
  *y_dim_p     = ifp->nrows;
  *x_dim_p     = ifp->ncols;
  *bpp_p       = ifp->bpp+1;
  *signed_flag_p = ifp->signed;

/*..Get input image into its array */
  for (y=0;y<*y_dim_p;y++)
``` th/ubc_io.c          Thu Jul  2 18:28:12 1992          161

```c
      for (x=0;x<*x_dim_p;x++)
         image[x+y*x_physical_dim] = getpix(ifp);
}

/*--------------------------------------------------------------*/ write_ubc_double_image_file(fname,
                    image,x_physical_dim,x_dim,y_dim,bpp,signed_flag)
      char *fname;
      double *image;
      int x_physical_dim, x_dim, y_dim,bpp,signed_flag;

{
  IMAGE *ifp;
  int x,y;
  char annote[1024];
  int value;

ifp = iopen(fname,W);
  check_ifp(ifp,fname);

ifp->nrows    = y_dim;
  ifp->ncols    = x_dim;
  ifp->bpp      = bpp;
  ifp->signed   = signed_flag;
  ifp->positive = 1;
  putheader(ifp,annote);

for (y=0; y<y_dim; y++)
     for (x=0;x<x_dim;x++)
        {
          value = irint(image[x+y*x_physical_dim]);
          if (signed_flag)
             {if (value < -254) value = -254;}
          else
             {if (value < 0) value = 0;} if (value > 255) value = 255;
          putpix(ifp,value);
        }
   iclose(ifp);
} read_ubc_double_image_file(fname,
                    image,x_physical_dim,x_dim_p,y_dim_p)
      char *fname;
      double *image;
      int x_physical_dim,*x_dim_p, *y_dim_p;

{
  IMAGE *ifp;
  char annote[1024];
  int x,y;
  int value;

ifp = iopen(fname,R);
  check_ifp(ifp,fname);

getheader(ifp,annote);
  *y_dim_p    = ifp->nrows;
  *x_dim_p    = ifp->ncols;

/*..Get input image into its array */
  for (y=0;y<*y_dim_p;y++)
     for (x=0;x<*x_dim_p;x++)
        {
          value = getpix(ifp);
          image[x+y*x_physical_dim] = value;
        }
}
``` th/ubc_io.c          Thu Jul  2 18:28:12 1992          162

```
read_int_array_from_text_file(A, size_x_p, size_y_p, A_file_name)
max_int_array A;
int *size_x_p, *size_y_p;
char A_file_name[];
{
  int x, y;

FILE *fp;
  fp = fopen(A_file_name, "r");
  if (fp == NULL)
    {
       fprintf(stderr,"cannot read text file %s \n", A_file_name);
       exit(1);
    }
  fscanf(fp,"%d %d",size_x_p, size_y_p);

for(y=0; y<*size_y_p; y++)
    for(x=0; x<*size_x_p; x++)
       fscanf(fp,"%d",&A[x][y]);
} output_int_array_as_text_file(A, size_x, size_y, A_file_name)
max_int_array A;
int size_x, size_y;
char A_file_name[];
{
  int x, y;

FILE *fp;
  fp = fopen(A_file_name, "w");

fprintf(fp,"%d %d \n",size_x, size_y);

for(y=0; y<size_y; y++)
    {
       for(x=0; x<size_x; x++)
         fprintf(fp,"%d",A[x][y]);
       fprintf(fp,"\n");
    }
} read_vector_from_text_file(V_file_name, V, length_p)
     int V[];
     int *length_p;
     char V_file_name[];
{
  int x;

FILE *fp;
  fp = fopen(V_file_name, "r");
  if (fp == NULL)
    {
       fprintf(stderr,"cannot read text file %s \n", V_file_name);
       exit(1);
    } fscanf(fp,"%d",length_p);

for(x=0; x < *length_p; x++)
    fscanf(fp,"%d",&V[x]);
}
```

```
th/ubc_main.c          Thu Jul  2 18:28:12 1992          163
#include "data.h"

include <stdio.h>
include <math.h> include <ubc/image.h>
include <ubc/maclib.h>
include <ubc/imlib.h> include <strings.h> char *dfltab[] = {
     "-thresholds","default_thresholds",
     "-props",     "default_props",
     "-geos",      "default_geo",
     "-Qdiffs",    "default_Qdiff",
     "-results",   "default_results",
     "-ge_radius", "1.666",
     "-offset_x",  "0",
     "-offset_y",  "0",
     "-margin_x",  "0",
     "-margin_y",  "0",
     "-max_flag",  "0",
     0 };

main(argc,argv)
     int argc;
     char *argv[];
{
  initargs(argc,argv,dfltab);

help_utility();

init_global_parameters();

th();

} help_utility()
{
  if (flagp("-help"))
    {
      printf("usage: \n\
th \n\
-thresholds (default_thresholds) \n\
-props,     (default_props) \n\
-geos,      (default_geos) \n\
-Qdiffs,    (default_Qdiffs), \n\
-results,   (default_results), \n\
-ge_radius, (1.666), \n\
-offset_x,  (0), \n\
-offset_y,  0, \n\
-margin_x,  0, \n\
-margin_y,  0, \n\
-max_flag,  0, \n");

exit(1);
    }
} init_global_parameters()
{
  strcpy(thresholds_fname, keyarg("-thresholds"));
  strcpy(props_fname, keyarg("-props"));
  strcpy(geos_fname, keyarg("-geos"));
  strcpy(MW_Qdiffs_fname, keyarg("-Qdiffs"));
  strcpy(results_fname, keyarg("-results"));

ge_radius = atof(keyarg("-ge_radius"));
```

```
th/ubc_main.c          Thu Jul  2 18:28:12 1992         164
    offset_x = atoi(keyarg("-offset_x"));
    offset_y = atoi(keyarg("-offset_y"));

margin_x = atoi(keyarg("-margin_x"));
    margin_y = atoi(keyarg("-margin_y"));

max_flag = atoi(keyarg("-max_flag"));
}
``` run/run_R_at        Tue Jul  7 10:16:14 1992        165

```
#!/bin/csh -f

# arg[1] image
# arg[2] db
# arg[3] start_x
# arg[4] start_y
# arg[5] n_x
# arg[6] n_y
# arg[5] step_x
arg[6] step_y run_at_I $1
run_at_D $2
run_R_at_DI $*
``` run/run_R_at_DI            Tue Jul  7 10:17:09 1992           166

```csh
#!/bin/csh -f

# arg[1] image
# arg[2] db
# arg[3] start_x
# arg[4] start_y
# arg[5] n_x
# arg[6] n_y
# arg[7] step_x
arg[8] step_y set image = $1
set db = $2
set start_x = $3
set start_y = $4
set n_x = $5
set n_y = $6
set step_x = $7
set step_y = $8

@ end_x = $start_x + $n_x - 1
@ end_y = $start_y + $n_y - 1

@ k_x = 1
@ x = $start_x while ($k_x <= $n_x)
  @ k_y = 1
  @ y = $start_y
  while ($k_y <= $n_y)
    echo .. $x, $y

#-----------------------------------------------------------
#  apply processing steps for each translation
----------------------------------------------------------- db2g -i $db -o $db.QA.$x.$y  -factor 3 \
             -start_x $x -start_y $y adiff -i1  $image.QA \
          -i2  $db.QA.$x.$y \
          -o  $image.Qdf.$x.$y \
          -abs_flag 0   # was 1 offsets should be checked
    th -thresholds R_thr_values -props MW_props -geos $db.ge \
        -Qdiffs $image.Qdf.$x.$y  -results $image.th.$x.$y \
        -offset_x $x -offset_y $y -max_flag 1 \
        -margin_x 2 -margin_y 2 > tmp.th

#-----------------------------------------------------------
#-----------------------------------------------------------
  @ k_y += 1
  @ y += $step_y
 end @ k_x += 1
@ x += $step_x
end

#-----------------------------------------------------------
# perform an OR on the results
----------------------------------------------------------- rf -bdata $image.th -results $image.rf \
      -t_start_x $start_x -t_start_y $start_y \
      -t_n_x $n_x -t_n_y $n_y -t_step_x $step_x -t_step_y $step_y \
      -r_size_y 60 -r_step_y 60 -r_size_x 20 -r_step_x 10\
      -margin_x 4 -margin_y 4 \
         > $image.rf_text
``` run/run_at_D            Tue Jul  7 10:16:50 1992         167

```
#!/bin/csh -f

arg[1] data_base_file ge -i_db $1 -o $1.ge
``` run/run_at_I           Tue Jul  7 10:16:37 1992        168

```
#!/bin/csh -f

arg[1] input_image_file run_c2a $1
run_mw $1
```

APPENDIX B

```
---------------------------------------------------------------------
--           image location comparator (unit 448 of Fig. 21)       --
--------------------------------------------------------------------- use work.defs; use defs.all;
entity window_comparator is
  port( input_channel_data : in data_channel_type;
        E_position: in E_position_type;
        regional_result, local_result: out boolean);

end window_comparator;

architecture window_comparator of window_comparator is component connected_components_unit
  port( q: in neq_flags_type;
        components: out components_type);
end component;

component component_summing_unit
  port( components: in components_type;
        P_diffs : in p_diffs_type;
        p_sums : out p_sums_type
      );
end component;

component regional_decision_logic
  port( p_sums : in p_sums_type;
        R_thr : in thr_type;
        R_result : out comparison_result_type);
end component;

component local_decision_logic
  port( p_sums : in p_sums_type;
        components: in components_type;
        E_position: in E_position_type;
        L_thr : in thr_type;
        L_result : out comparison_result_type);
end component;

signal c_components : components_type;
signal components_p_sums : p_sums_type;
```

```
begin

C1 : connected_components_unit port map(input_channel_data.neq_flags,
                                c_components);

C2 : component_summing_unit port map(c_components,
                                input_channel_data.p_diffs,
                                components_p_sums);

C3 : regional_decision_logic port map(components_p_sums,
                                input_channel_data.thrs.regional,
                                regional_result);

C4 : local_decision_logic port map(components_p_sums,
                                c_components,
                                E_position,
                                input_channel_data.thrs.local,
                                local_result);

end window_comparator;

-----------------------------------------------------------------------
--              connected_components_unit   (unit 460 of Fig. 23)     --
-----------------------------------------------------------------------

--    notation:
--       A  B
--       C  D

--    1 2    9 10
--    3 4   11 12
--
--    5 6   13 14
--    7 8   15 16 use work.defs;
use defs.all;
entity connected_components_unit is
  port( q: in neq_flags_type;
        components: out components_type);

end connected_components_unit;

architecture connected_component_unit of connected_components_unit is
```

```
begin
  process (q)
    variable
      B_in_component_A,
      C_in_component_AB,
      D_in_component_ABC : boolean;

type t1 is  array (p_notation) of boolean;
      type t2 is  array(p_notation, p_notation) of boolean;

variable c0 : t1;
    variable c1, c2, c3 : t2;

begin
    c0(A) :=  q(1) or  q(2) or  q(3) or  q(4);
    c0(B) :=  q(5) or  q(6) or  q(7) or  q(8);
    c0(C) :=  q(9) or q(10) or q(11) or q(12);
    c0(D) := q(13) or q(14) or q(15) or q(16);

c1(A,B) := (q(3) or q(4)) and (q(5) or q(6));
    c1(A,C) := (q(2) or q(4)) and (q(9) or q(11));
    c1(A,D) := q(4) and q(13);
    c1(B,C) := q(6) and q(11);
    c1(B,D) := (q(6) or q(8))   and (q(13) or q(15));
    c1(C,D) := (q(11) or q(12)) and (q(13) or q(14));

c2(A,B) := c1(A,B) or (c1(A,C) and c1(B,C)) or (c1(A,D) and c1(B,D));
    c2(A,C) := c1(A,C) or (c1(A,B) and c1(B,C)) or (c1(A,D) and c1(C,D));
    c2(A,D) := c1(A,D) or (c1(A,B) and c1(B,D)) or (c1(A,C) and c1(C,D));
    c2(B,C) := c1(B,C) or (c1(A,B) and c1(A,C)) or (c1(B,D) and c1(C,D));
    c2(B,D) := c1(B,D) or (c1(A,B) and c1(B,D)) or (c1(B,C) and c1(C,D));
    c2(C,D) := c1(C,D) or (c1(A,C) and c1(A,D)) or (c1(B,C) and c1(B,D));

c3(A,B) := c2(A,B) or (c2(A,C) and c2(B,C)) or (c2(A,D) and c2(B,D));
    c3(A,C) := c2(A,C) or (c2(A,B) and c2(B,C)) or (c2(A,D) and c2(C,D));
    c3(A,D) := c2(A,D) or (c2(A,B) and c2(B,D)) or (c2(A,C) and c2(C,D));

B_in_component_A    := c3(A,B);
    C_in_component_AB   := c3(A,C) or c2(B,C);
    D_in_component_ABC  := c3(A,D) or c2(B,D) or c1(C,D);

components(A) <= ( c0(A),
                       c3(A,B),
                       c3(A,C),
                       c3(A,D));
```

```
        components(B) <= ( false,
                           c0(B)   and not B_in_component_A,
                           c2(B,C) and not B_in_component_A,
                           c2(B,D) and not B_in_component_A);

components(C) <= ( false,
                           false,
                           c0(C)   and not C_in_component_AB,
                           c1(C,D) and not C_in_component_AB );

components(D) <= ( false,
                           false,
                           false,
                           c0(D) and not D_in_component_ABC );

end process;

end connected_component_unit;

-----------------------------------------------------------------------
--            component_summing_unit (unit 462 of Fig. 23)           --
----------------------------------------------------------------------- use work.defs; use defs.all;
entity component_summing_unit is port( components: in components_type;
        P_diffs : in p_diffs_type;
        p_sums : out p_sums_type
      );

end component_summing_unit;

architecture component_summing_unit of component_summing_unit is begin
  process(components, p_diffs)

variable s1,s2, s3, s4 : int8;

function cond_value(B: boolean; I: int6) return int6 is
           begin
              if B then return I;
              else return 0;
              end if;
        end cond_value;
```

```
     begin

-- check : s1 should actually be int8 s1 := cond_value(components(A)(1), P_diffs(1)) +
           cond_value(components(A)(2), P_diffs(2)) +
           cond_value(components(A)(3), P_diffs(3)) +
           cond_value(components(A)(4), P_diffs(4));

s2 := cond_value(components(B)(2), P_diffs(2)) +
           cond_value(components(B)(3), P_diffs(3)) +
           cond_value(components(B)(4), P_diffs(4));

s3 := cond_value(components(C)(3), P_diffs(3)) +
           cond_value(components(C)(4), P_diffs(4));

s4 := cond_value(components(D)(4), P_diffs(4));

p_sums <= (s1, s2, s3, s4);

end process;

end component_summing_unit;

-------------------------------------------------------------------
--            regional decision logic   (unit 464 of Fig. 23)    --
------------------------------------------------------------------- use work.defs; use defs.all;
entity regional_decision_logic is
  port( p_sums : in p_sums_type;
        R_thr  : in thr_type;
        R_result : out comparison_result_type);

end regional_decision_logic;

architecture regional_decision_logic of regional_decision_logic is begin process (p_sums, R_thr)
       type R_results_type is array (p_notation) of boolean;
       variable R_results : R_results_type;
```

```
begin

R_results(A) := p_sums(A) < R_thr;
  R_results(B) := p_sums(B) < R_thr;
  R_results(C) := p_sums(C) < R_thr;
  R_results(D) := p_sums(D) < R_thr;

R_result <= R_results(A) and R_results(B) and R_results(C) and R_results(D);

end process;

end regional_decision_logic;

-----------------------------------------------------------------------
--            local_decision_logic (unit 466 of Fig. 23)             --
----------------------------------------------------------------------- use work.defs; use defs.all;
entity local_decision_logic is
  port( p_sums : in p_sums_type;
        components: in components_type;
        E_position: in E_position_type;
        L_thr : in thr_type;
        L_result : out comparison_result_type);

end local_decision_logic;

architecture local_decision_logic  of local_decision_logic is begin process(p_sums, components, E_position, L_thr)

type B4 is array (p_notation) of boolean;
        variable L_results, relevant : B4;
        variable rel, nrel : boolean4;

begin

L_results(A) := p_sums(A) < L_thr;
   L_results(B) := p_sums(B) < L_thr;
   L_results(C) := p_sums(C) < L_thr;
   L_results(D) := p_sums(D) < L_thr;
```

```
    rel := e_position.rel;
    nrel := e_position.nrel;

relevant(A):= ((components(A)(1) and rel(1)) or
                      (components(A)(2) and rel(2)) or
                      (components(A)(3) and rel(3)) or
                      (components(A)(4) and rel(4)))
                  and
                    not((components(A)(1) and nrel(1)) or
                        (components(A)(2) and nrel(2)) or
                        (components(A)(3) and nrel(3)) or
                        (components(A)(4) and nrel(4)));

relevant(B):= ((components(B)(2) and rel(2)) or
                      (components(B)(3) and rel(3)) or
                      (components(B)(4) and rel(4)))
                    and not
                      ((components(B)(2) and nrel(2)) or
                       (components(B)(3) and nrel(3)) or
                       (components(B)(4) and nrel(4)));

relevant(C):=((components(C)(3) and rel(3)) or
                     (components(C)(4) and rel(4)))
                and not
                    ((components(C)(3) and nrel(3)) or
                     (components(C)(4) and nrel(4)));

relevant(D):=  ((components(D)(4) and rel(4)))
                  and not((components(D)(4) and nrel(4)));

L_result <= (relevant(A) and L_results(A)) or
                   (relevant(B) and L_results(B)) or
                   (relevant(C) and L_results(C)) or
                   (relevant(D) and L_results(D)) or
                   not(relevant(A) or relevant(B) or relevant(C) or relevant(D));

end process;

end local_decision_logic;

----------------------------------------------------------------------
--              data type definition package                        --
```

```
package defs is subtype int6 is integer range 0 to (2**6-1);
  subtype int8 is integer range 0 to (2**8-1);

type boolean4 is array (1 to 4) of boolean;

type p_notation is (A, B, C, D);

type p_diffs_type is array (1 to 4) of int6;

type E_position_type is record
    rel : boolean4;
    nrel : boolean4;
  end record;

type components_type is array (p_notation) of boolean4;

type Neq_flags_type is array (1 to 16) of boolean;

type p_sums_type is array (p_notation) of int8;

subtype comparison_result_type is boolean;

type R_results_type is array (1 to UNIT_CAPACITY) of boolean;
  type L_results_type is array (1 to UNIT_CAPACITY) of boolean;

type data_channel_type is record
    p_diffs : p_diffs_type;
    neq_flags: neq_flags_type;
    thrs: thrs_type;
  end record;

end defs;

package body defs is end defs;
```

We claim:

1. A method for comparing first and second digital representations of an image, the method comprising:

for each individual translation from among a plurality of translations from the first digital representation to the second digital representation:

for each individual image location from among a plurality of image locations within a comparison entity within the first digital representation:

comparing the individual image location to a location in the second digital representation defined by operating the individual translation on the individual image location;

evaluating the geometrical complexity of the vicinity of the location in the second digital representation; and determining the legitimacy of the individual translation for the individual image location in accordance with the results of the comparing and the evaluating; and combining the legitimacies of all image locations within the comparison entity, thereby defining the legitimacy of the individual translation for the comparison entity; and announcing a defect for the comparison entity if none of the translations thereof are legitimate.

2. A method according to claim 1 wherein the evaluating is performed once for all image locations within an individual comparison entity.

3. Apparatus for comparing first and second digital representations of an image, the apparatus comprising an image location comparison unit and a geometrical complexity evaluator, wherein, for each individual translation from among a plurality of translations from the first digital representation to the second digital representation and for each individual image location from among a plurality of image locations within a comparison entity within the first digital representation:

the image location comparison unit is operative to compare the individual image location to a location in the second digital representation defined by operating the individual translation on the individual image location and to provide a suitable output, and the geometrical complexity evaluator is operative to evaluate the geometrical complexity of the vicinity of the location in the second digital representation and to provide a suitable output;

a per-image location translation legitimacy determining unit operative to determine the legitimacy of an individual translation for an individual image location in accordance with the outputs of the image location comparison unit and of the geometrical complexity evaluator for the individual translation and for the individual image location;

a per-comparison entity translation legitimacy determining unit operative to combine the legitimacies of all image locations within an individual comparison entity, thereby defining the legitimacy of the individual translation for the comparison entity; and a defective comparison entity announcer operative to announce a defect for the comparison entity if none of the translations thereof are legitimate.

4. Apparatus according to claim 3 wherein the geometrical complexity evaluator provides uniform output for all image locations within an individual comparison entity.

5. A method according to claim 1 wherein said legitimacy of said individual translation for said individual image location is represented by a binary value.

6. Apparatus according to claim 3 wherein the legitimacy of each said individual translation for each said individual image location is represented by a binary value.

7. A method for comparing first and second digital representations of an image, the method comprising:

for each individual translation from among a plurality of translations from the first digital representation to the second digital representation:

for each individual image location from among a plurality of image locations within a comparison entity within the first digital representation, determining a binary legitimacy value of the individual translation for the individual image location by comparing the individual image location to a location in the second digital representation defined by operating the individual translation on the individual image location; and combining the binary legitimacy values of image locations within the comparison entity, thereby to generate a comparison entity legitimacy value determining whether the individual translation is legitimate for the comparison entity; and announcing a defect for the comparison entity if none of the plurality of translations are legitimate therefor, wherein the determining combining and announcing are repeated for each of a plurality of comparison entities defined in the first digital reprsentation, and wherein the plurality of comparison entities comprises:

a plurality of regional comparison entities which are each large enough such that more than one edge falls therewithin; and a plurality of local comparison entities each arranged to cover a portion of a single image edge.

8. Apparatus for comparing first and second digital representations of an image, the apparatus comprising:

a per-image location translation legitimacy determining unit operative to generate, for each individual translation from among a plurality of translations from the first digital representation to the second digital representation and for each individual image location from among a plurality of image locations within a comparison entity within the first digital representation, a binary legitimacy value of the individual translation for the individual image location;

a per-comparison entity translation legitimacy determining unit operative to combine the binary legitimacy values of image locations within the comparison entity, thereby to generate a comparison entity legitimacy value determining whether the individual translation is legitimate for the comparison entity; and a defective comparison entity announcing unit operative to announce a defect for the comparison entity if none of the plurality of translations are legitimate therefor, wherein the legitimacy determining units and the defect comparison entity announcing unit are operative for each of a plurality of comparison entities defined in the first digital representation, and wherein the plurality of comparison entities comprises:

a plurality of regional comparison entities which are each large enough such that more than one edge falls therewithin; and a plurality of local comparison entities each arranged to cover a portion of a single image edge.

* * * * *